(12) United States Patent
Ohno et al.

(10) Patent No.: US 6,570,350 B2
(45) Date of Patent: May 27, 2003

(54) DC MOTOR ROTATION DETECTING APPARATUS AND DC MOTOR ROTATION CONTROL APPARATUS

(75) Inventors: Yoshimi Ohno, Kawasaki (JP); Kenji Koyama, Yokohama (JP); Ikuya Tsurukawa, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 29 days.

(21) Appl. No.: 09/884,103

(22) Filed: Jun. 20, 2001

(65) Prior Publication Data

US 2002/0044769 A1 Apr. 18, 2002

(30) Foreign Application Priority Data

Jun. 20, 2000 (JP) .................................. P2000-185497
Jun. 20, 2000 (JP) .................................. P2000-185499

(51) Int. Cl.[7] .............................................. H02K 29/00
(52) U.S. Cl. ........................ 318/254; 318/439; 318/138
(58) Field of Search ................................ 318/138, 254, 318/439; 388/800

(56) References Cited

U.S. PATENT DOCUMENTS 3,784,888 A * 1/1974 Geiersbach et al. ........ 318/138
3,840,790 A * 10/1974 Stich et al. .................. 318/254
5,406,184 A * 4/1995 Bahn .......................... 318/439

FOREIGN PATENT DOCUMENTS

JP          4-127864          4/1992

* cited by examiner

Primary Examiner—Khanh Dang
(74) Attorney, Agent, or Firm—Oblon, Spivak, McClelland, Maier & Neustadt, P.C.

(57) ABSTRACT

A direct current motor rotation detecting apparatus and a direct current motor rotation control apparatus detect and control at least one of a rotational direction, a rotational speed, a rotational position, and a cumulative rotation number of a rotor of a direct current motor. The apparatus include at least one rotation detecting brush which detects a rotation of the rotor, a differentiating circuit which differentiates a voltage obtained through the at least one rotation detecting brush, and a pulse generator triggered by the differentiating circuit at a time interval proportional to a rotational speed of the direct current motor to generate pulses having a predetermined pulse width.

4 Claims, 38 Drawing Sheets

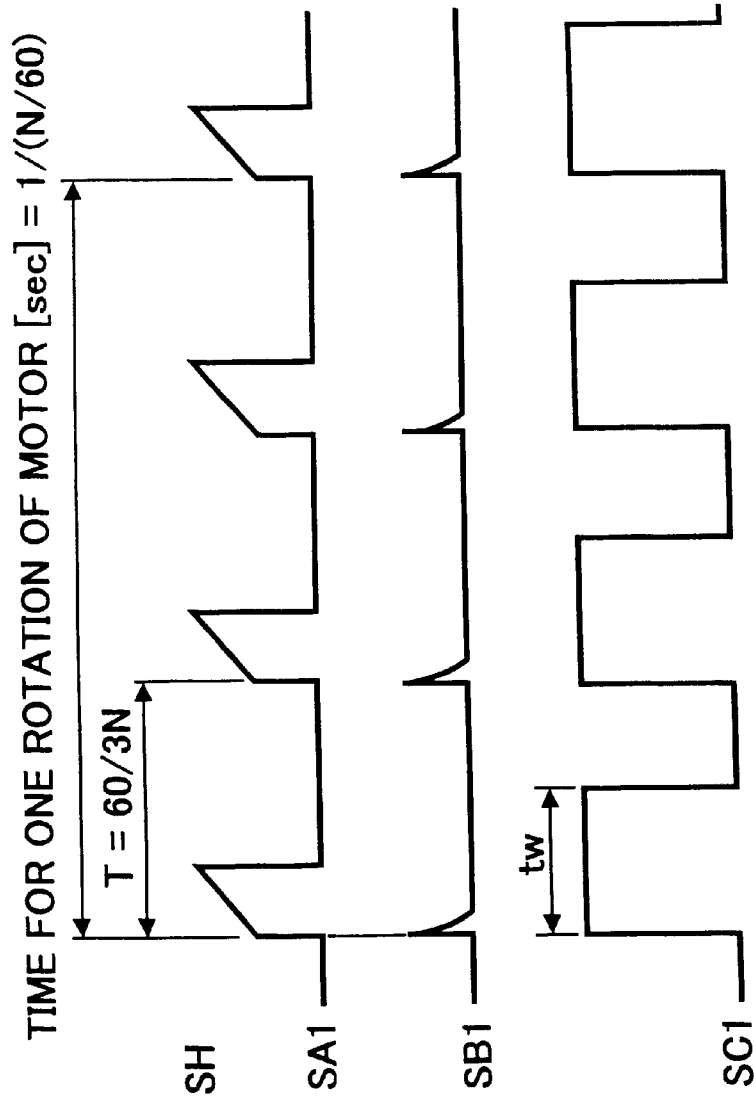

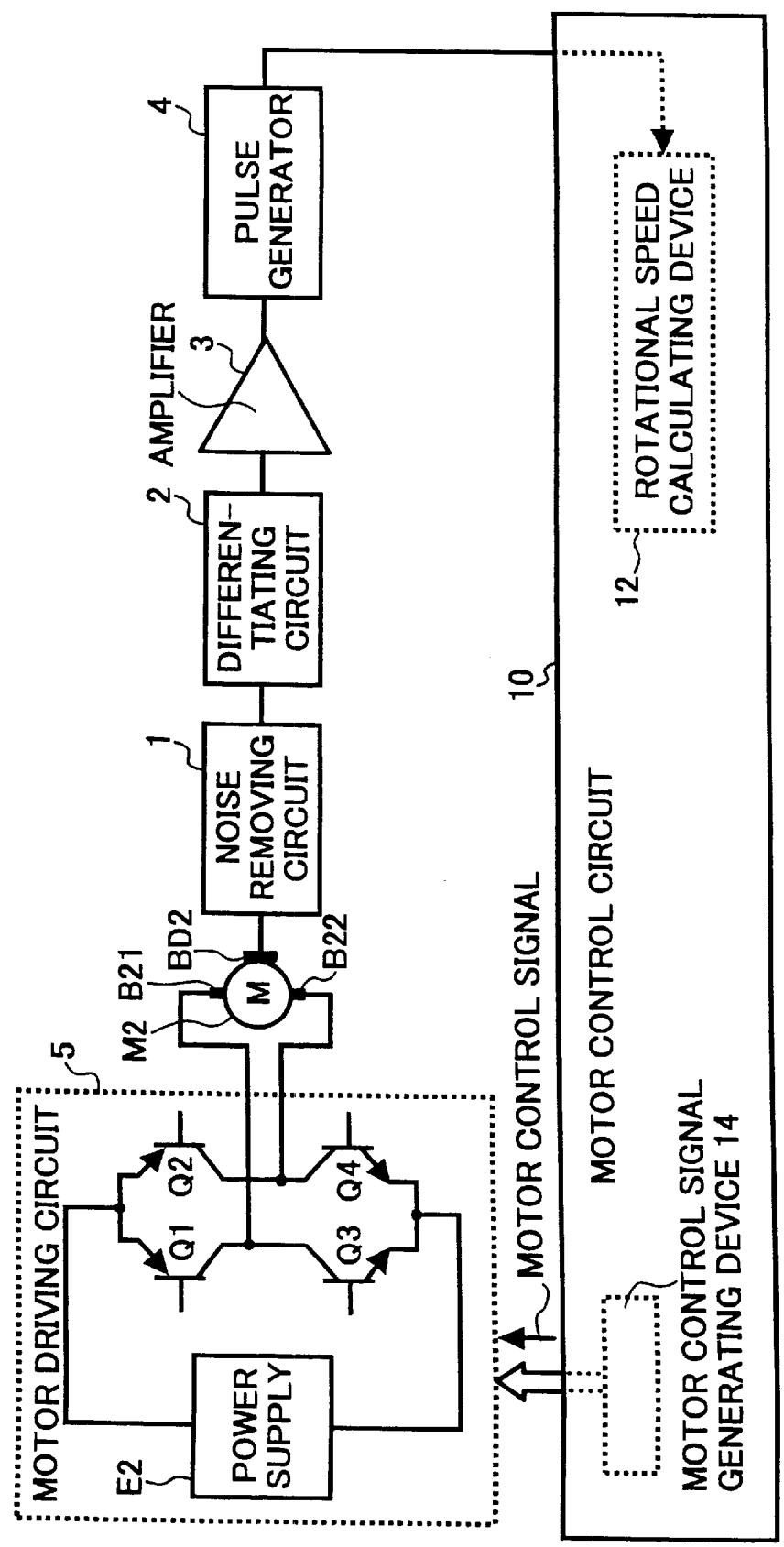

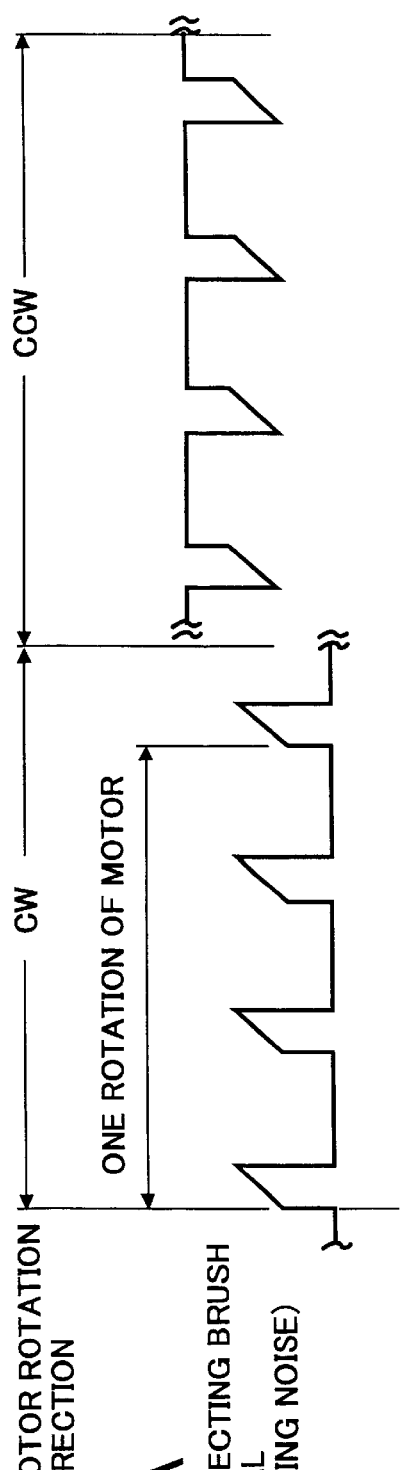
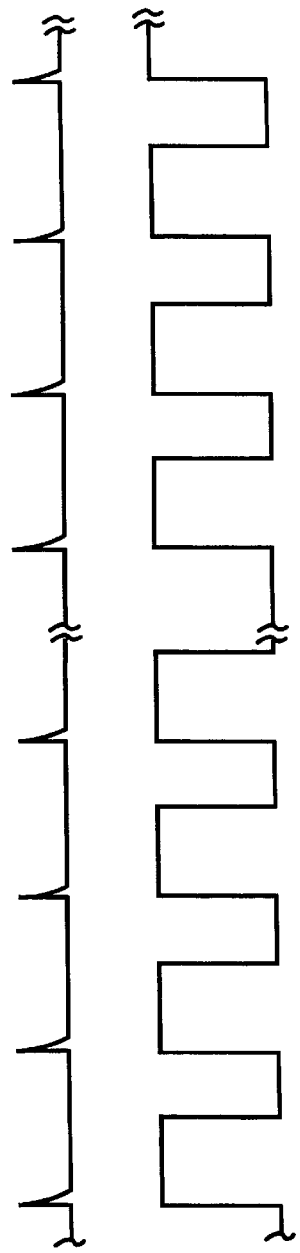
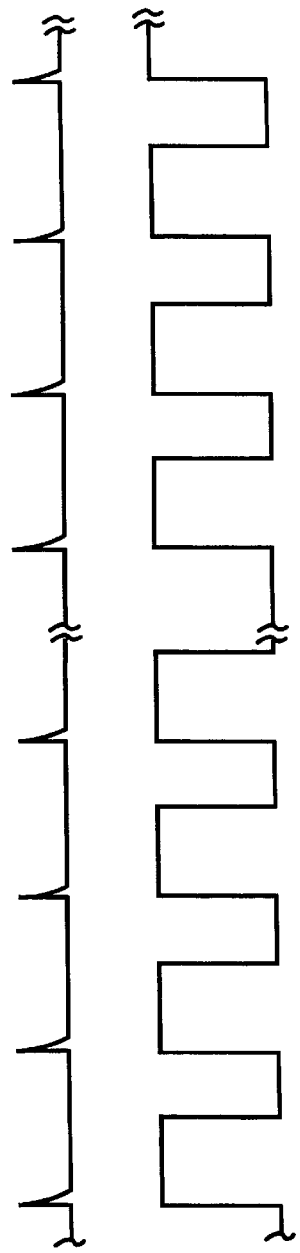
FIG. 10A
ROTATION DETECTING BRUSH
OUTPUT SIGNAL
(AFTER REMOVING NOISE)
FIG. 10B
DIFFERENTIATING CIRCUIT
OUTPUT SIGNAL
FIG. 10C
PULSE GENERATOR
OUTPUT SIGNAL

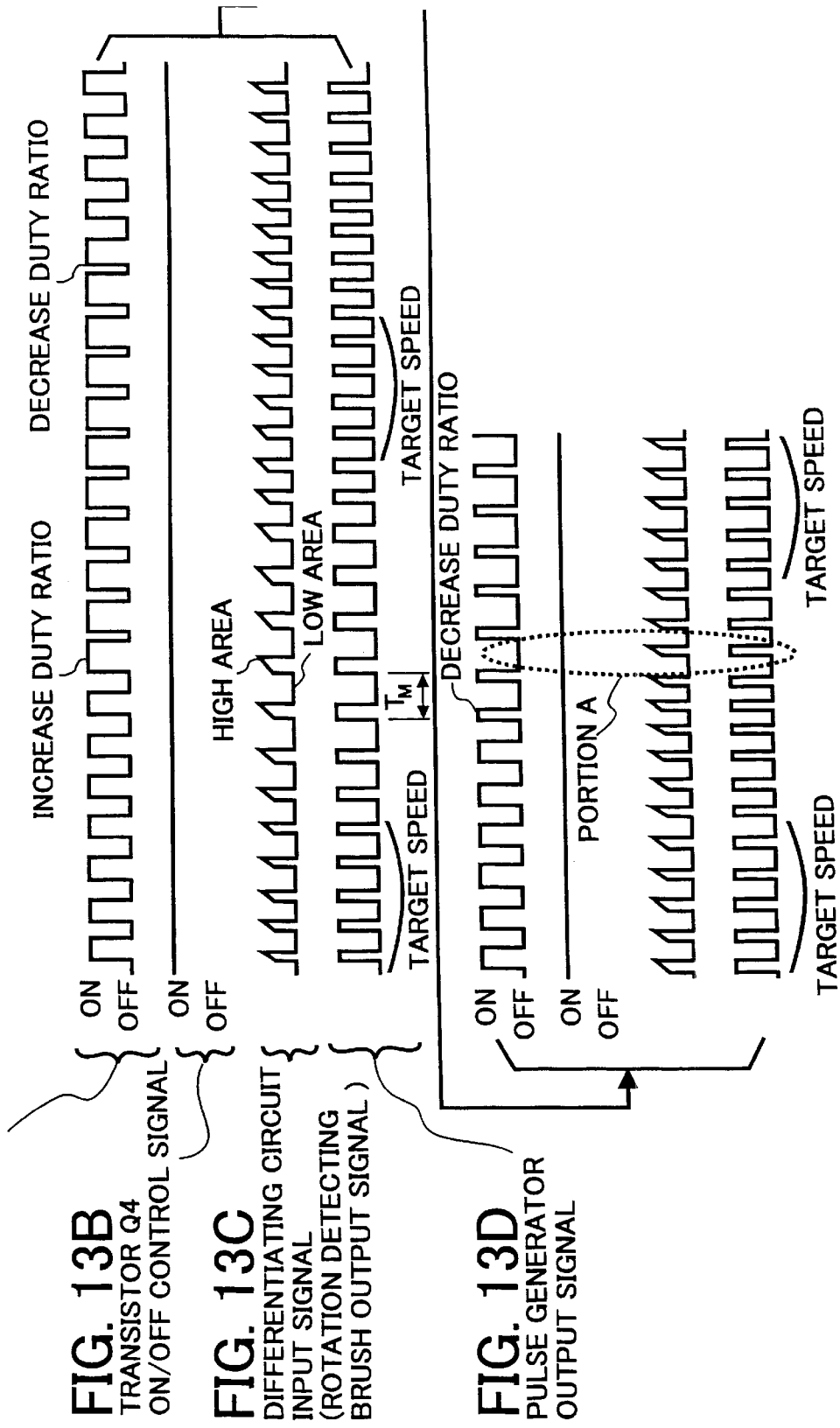

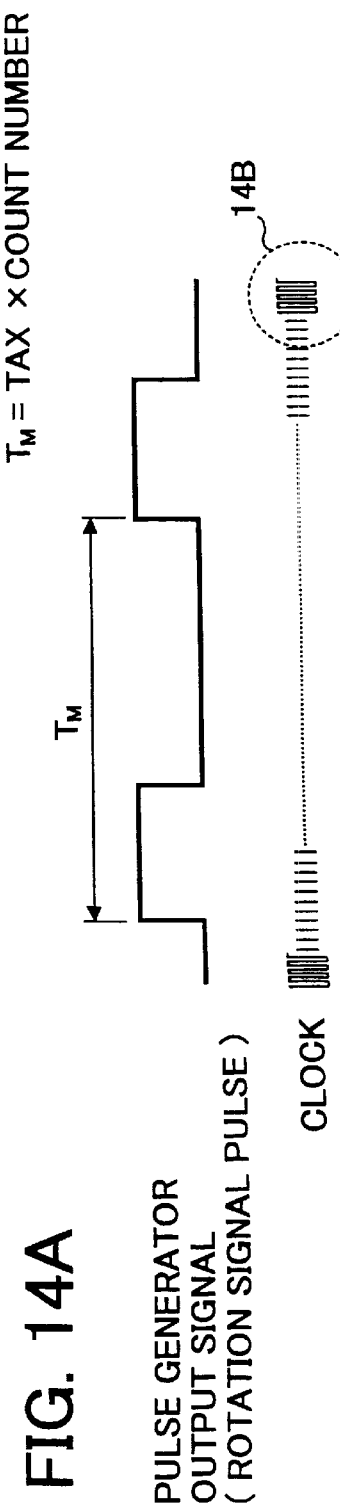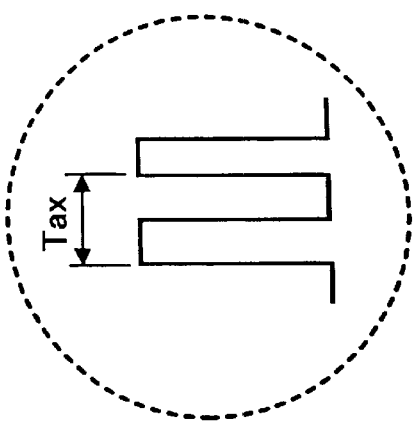
FIG. 14A
FIG. 14B

FIG. 16

| IN1 | IN2 | OUT1 | OUT2 | OUT3 | OUT4 | Q1 | Q2 | Q3 | Q4 | MOTOR CONDITION |
|---|---|---|---|---|---|---|---|---|---|---|
| L | L | H | H | L | L | OFF | OFF | OFF | OFF | STOP |
| L | H | H | L | H | L | OFF | ON | ON | OFF | CCW ROTATION |
| H | L | L | H | L | H | ON | OFF | OFF | ON | CW ROTATION |
| H | H | H | H | H | H | OFF | OFF | ON | ON | BRAKE (SHUNT) |

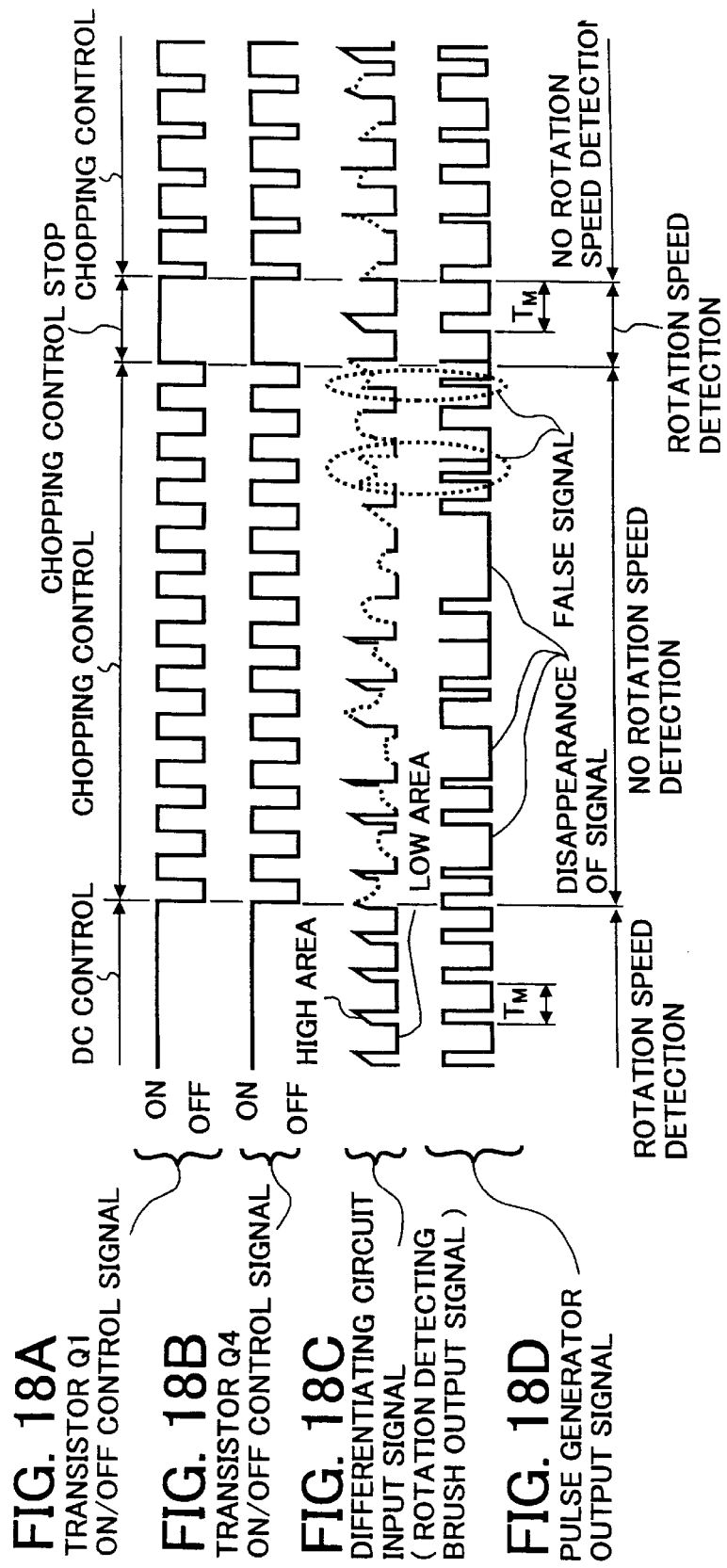

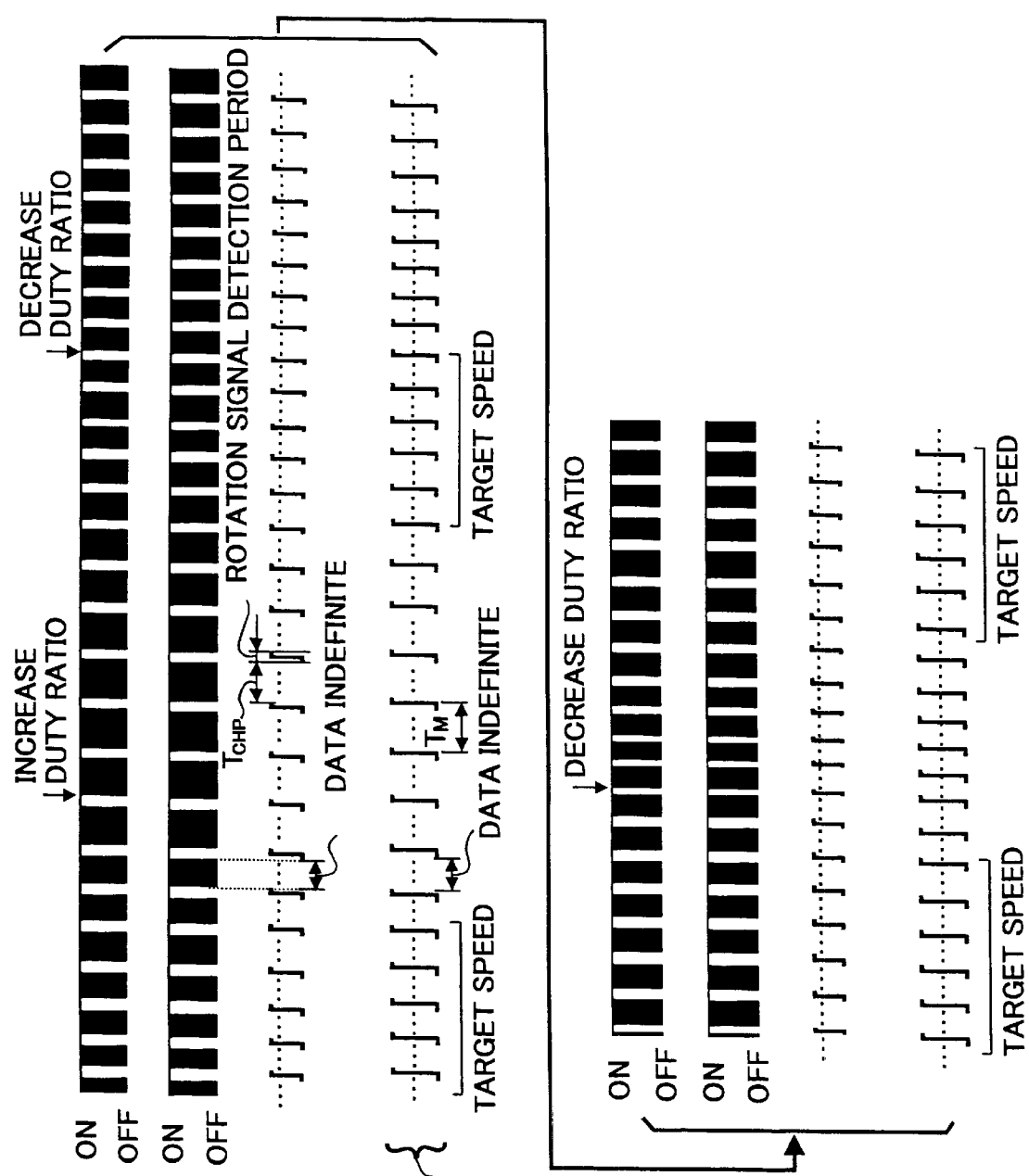
FIG. 20A TRANSISTOR Q1 ON/OFF CONTROL SIGNAL
FIG. 20B TRANSISTOR Q4 ON/OFF CONTROL SIGNAL
FIG. 20C DIFFERENTIATING CIRCUIT INPUT SIGNAL (ROTATION DETECTING BRUSH OUTPUT SIGNAL)
FIG. 20D PULSE GENERATOR OUTPUT SIGNAL

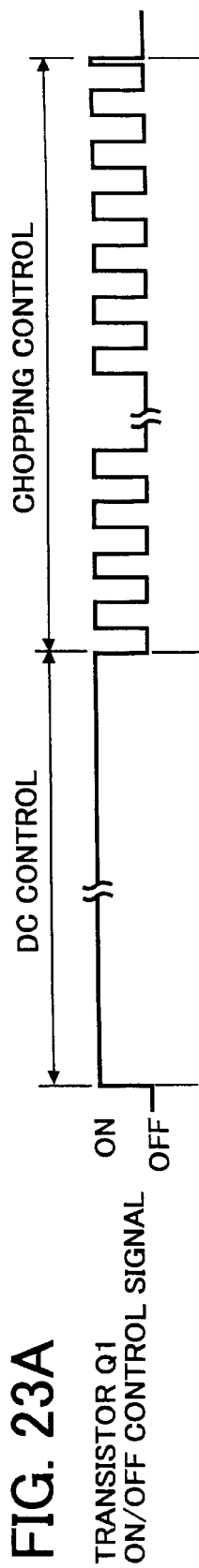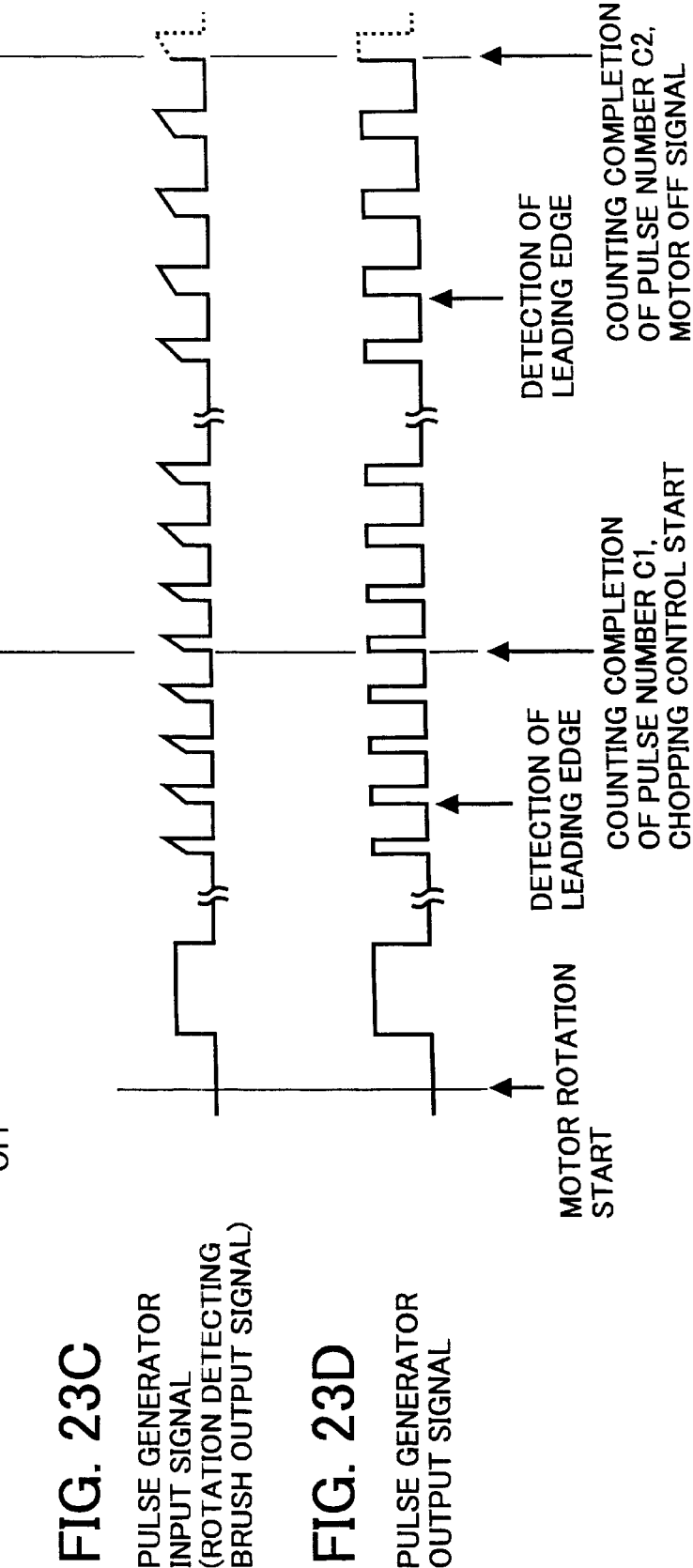
FIG. 23A TRANSISTOR Q1 ON/OFF CONTROL SIGNAL
FIG. 23B TRANSISTOR Q4 ON/OFF CONTROL SIGNAL
FIG. 23C PULSE GENERATOR INPUT SIGNAL (ROTATION DETECTING BRUSH OUTPUT SIGNAL)
FIG. 23D PULSE GENERATOR OUTPUT SIGNAL

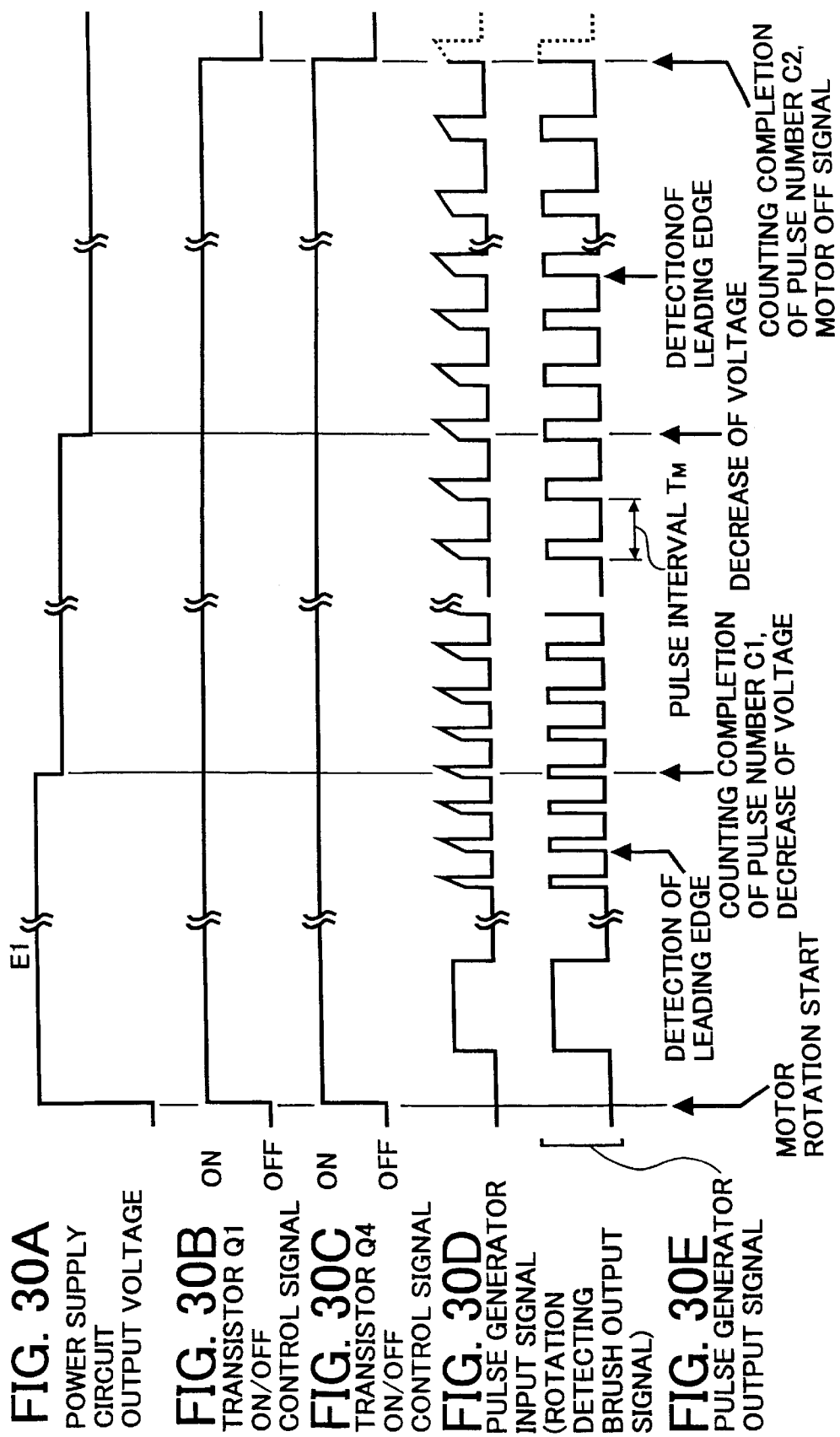

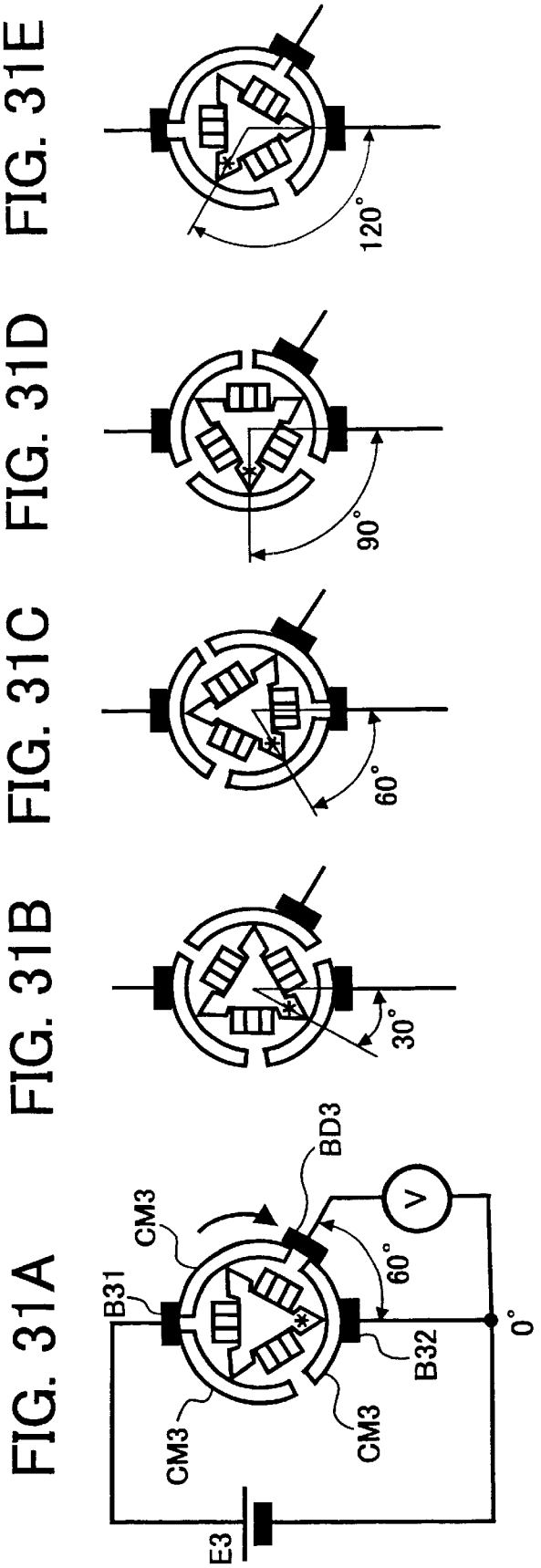

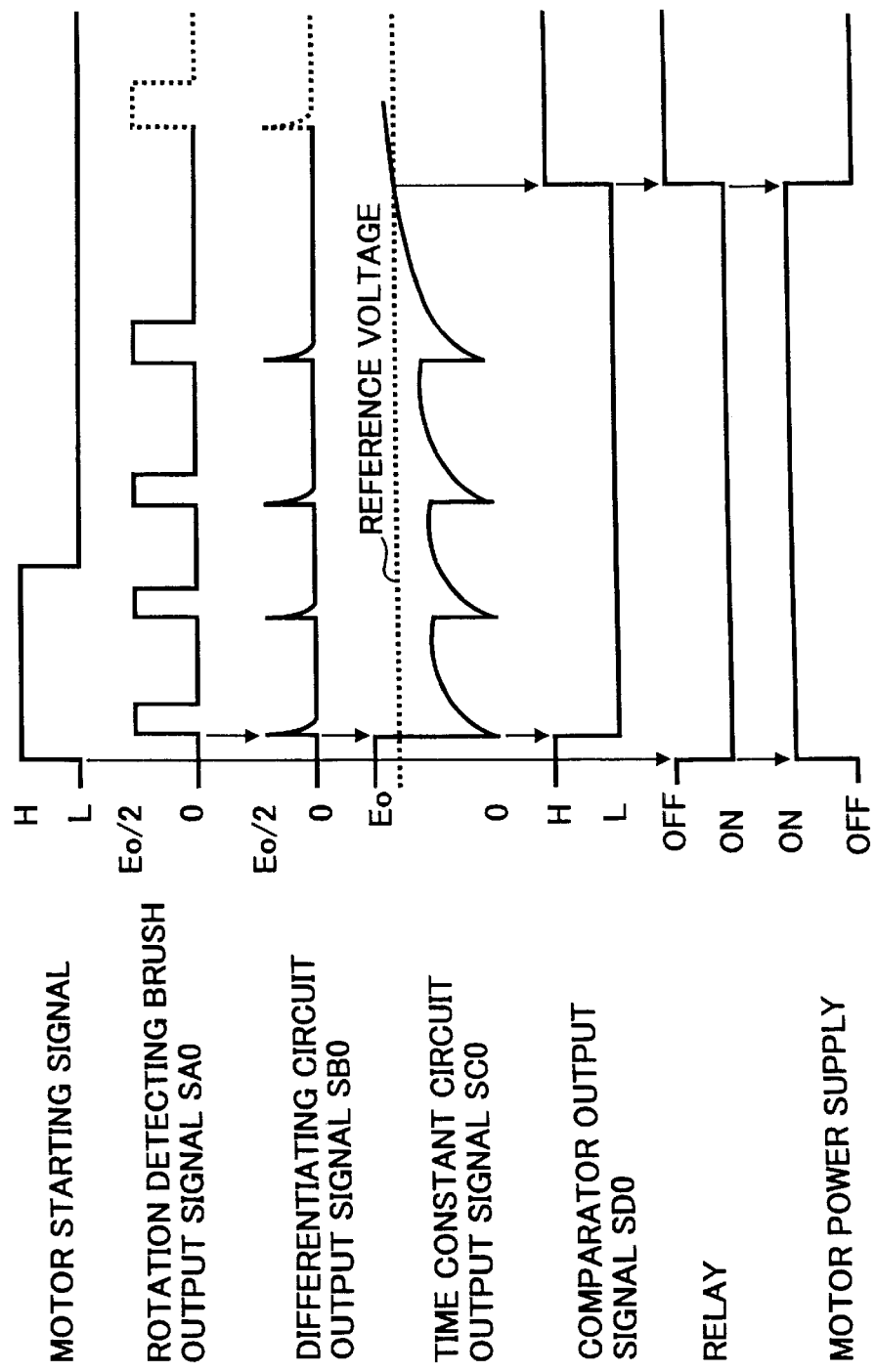

DC MOTOR ROTATION DETECTING APPARATUS AND DC MOTOR ROTATION CONTROL APPARATUS

BACKGROUND OF THE INVENTION

1. Field of the Invention

The present invention relates to an apparatus wherein a DC (direct current) motor is used to provide the driving force for performing mechanical operations, and wherein stabilization of the rotational speed of the DC motor and control of cumulative rotation numbers of the DC motor are required. More particularly, the present invention relates to a rotation detecting apparatus and a rotation control apparatus for a DC motor wherein rotational operations of the rotor of a DC motor are controlled by detecting at least one of the rotational direction, the rotational speed, the cumulative rotation number, and the rotational position of the rotor.

2. Discussion of the Background

A brush-use DC motor is often used as a driving force for mechanical operations in a camera, such as, for example, zooming operations wherein photographic lenses including a zoom lens are zoomed, focusing operations wherein at least one of a photographic lens and an imaging device is moved along an optic axis of the photographic lens for focusing based on the information of a distance from an object to an image focusing point, and film feeding operations wherein a photographic film is wound and rewound.

In the brush-use DC motor, plural fixed magnetic poles are formed in a stator employing a permanent magnet, etc. A DC drive current is switched corresponding to a rotation angle of a rotor and is applied to plural rotor coils forming plural magnetic poles of the rotor through a commutator which rotates together with the rotor and through a brush which is in sliding contact with the commutator. Thereby, the rotor rotates.

There are, for example, five types of apparatuses using a motor as a driving force: (1) uni-directional rotations of the motor are used, and a rotational speed of the motor is required to be kept constant; (2) uni-directional rotations of the motor are used, and a cumulative rotation number of the motor, that is, a total driving amount of the motor, is required to be controlled; (3) bi-directional rotations of the motor (i.e., a forward rotation and a reverse rotation) are used, and a rotational speed only on uni-directional rotations of the motor is required to be kept constant; (4) bi-directional rotations of the motor are used, and each rotational speed on bi-directional rotations of the motor is required to be kept constant; and (5) bi-directional rotations of the motor are used, and a cumulative rotation number on unidirectional rotations of the motor is required to be controlled.

With regard to a rotation control method of a motor in an apparatus, there are, for example, two types of apparatuses according to their uses and operation environmental conditions; (1) a rotational speed of the motor is controlled by changing a drive voltage for driving the motor, and (2) a rotational speed of the motor is controlled by a chopping control wherein a drive voltage is intermittently applied to the motor.

As an example of the above-described brush-use DC motor, FIG. 35 illustrates a three-pole motor. In the three-pole motor, electricity is fed to a commutator CM0 which is in sliding contact with a pair of electrode brushes B01 and B02 from a DC drive power supply E0 through the paired electrode brushes B01 and B02. The paired electrode brushes B01 and B02 are brought into contact with the commutator CM0 on rotation angle positions which differ by 180°. The commutator CM0 includes three pieces which form a cylindrical surface and rotates together with a rotor of the DC motor. The three pieces of the commutator CM0 are separated at an equally angled interval of about 120°. Three rotor coils are connected to each other between the adjacent pieces of the commutator CM0, and thereby three rotor magnetic poles are formed therebetween. The polarity of these rotor magnetic poles varies depending on the contact state of each piece of the commutator CM0 and the electrode brushes B01 and B02 which changes corresponding to the rotation angle of the rotor. Thereby, a rotation driving force is generated between, for example, a pair of stator magnetic poles of a permanent magnet at the side of a stator (not shown).

With the rotation of the rotor, respective rotor magnetic poles oppose to respective stator magnetic poles in order, and the contact state of each piece of the commutator CM0 and the electrode brushes B01 and B02 changes. Thus, by the variance of the polarity of each rotor magnetic pole in order, the rotor continually rotates.

Specifically, when a voltage is applied to the paired electrode brushes B01 and B02 from the power supply E0, the current flows from one of the electrode brushes B01 and B02 to another through the rotor coils. The magnetic field is generated by the rotor coils, and thereby the rotor magnetic poles are formed. By the action of the magnetic field generated by the rotor coils and the magnetic field generated by the stator magnetic poles, the rotor rotates.

As a method of detecting the rotation of the above-described motor, a rotary encoder method is known. Specifically, in the rotary encoder method, a rotation slit disk having slits on its circumferential surface is provided on a rotation output shaft of the motor or in a power transmission mechanism rotated by the rotation output shaft. The rotation of the motor is detected by the method of detecting the slits on the circumferential surface of the rotation slit disk with a photointerrupter. Although the rotary encoder method allows an accurate detection of the rotation of the motor, space and cost for the rotary encoder constructed by the rotation slit disk, the photointerrupter, etc. are inevitably increased.

Further, another method of detecting the rotation of the motor from the drive voltage ripple of the motor is described referring to FIGS. 36 and 37. In FIG. 36, a resistor R0 is connected in series to electrode brushes B01 and B02 in a power supplying line for supplying the motor drive current to the electrode brushes B01 and B02 from a drive power supply E0, and the voltage between both terminals of the resistor R0 is detected. In such a way, the ripple waveform of 60°-period of the drive current as illustrated in FIG. 37 is obtained.

Because the ripple waveform corresponds to the rotation angle position of a rotor, the pulse signal corresponding to the rotation angle position can be obtained by suitably rectifying (shaping) the ripple waveform. Although this another rotation detecting method is advantageous in cost and space, detection errors due to noise cause inaccuracies. Thus, this rotation detecting method is disadvantageous.

Japanese Laid-open patent publication No. 4-127864 describes another method for detecting a rotational speed of a DC motor wherein a rotation detecting brush is provided in addition to a pair of electrode brushes. The rotation detecting brush is brought into sliding contact with a commutator so as to extract a voltage applied to the commutator. The rotational speed of the DC motor is detected based on the signal generated by the rotation detecting brush.

Further, Japanese Laid-open patent publication No. 4-127864 describes a DC motor control circuit illustrated in FIG. 38. Referring to FIG. 38, a rotation detecting brush BD0 is provided to a motor M0 in addition to a pair of electrode brushes B01 and B02. The rotation detecting brush BD0 is connected to a differentiating circuit 101, a time constant reset circuit 102, and a time constant circuit 103 in order. In a comparator 105, the voltage of the output signal from the time constant circuit 103 is applied to a non-inversion input terminal (i.e., + side) of the comparator 105, and the voltage of the output signal from a reference voltage generating device 104 is applied to an inversion input terminal (i.e., − side) of the comparator 105. The output signal from the comparator 105 is connected to one terminal of exciting coils of a relay 107 through a diode 106. Another terminal of the exciting coils of the relay 107 is connected to one terminal of a drive power supply E0. The pair of electrode brushes B01 and B02 is connected to the drive power supply E0 via a contact 107a of the relay 107.

One terminal of the exciting coils of the relay 107 is connected to a collector of a transistor 109a of a motor starting circuit 109 via a diode 108. The motor starting signal is applied to a base of the transistor 109a via a resistor 109b. A resistor 109c is connected between the base and an emitter of the transistor 109a. The emitter of the transistor 109a is connected to another terminal of the drive power supply E0.

FIG. 39 is a diagram illustrating waveforms of a motor starting signal input to the motor starting circuit 109, a rotation detecting signal SA0 of the rotation detecting brush BD0, an output signal SB0 from the differentiating circuit 101, an output signal SC0 from the time constant circuit 103, an output signal SD0 from the comparator 105, an operation (on/off) signal of the relay 107, and a supply signal applied to a motor M0 from a drive power supply E0.

When the transistor 109a of the motor starting circuit 109 is turned on by the motor starting signal, the relay 107 is turned on and the contact 107a is closed. Thereby, the electric power is supplied to the motor M0 through the electrode brushes B01 and B02, and the motor M0 starts rotating.

With the rotation of the motor M0, pulse train SA0 is output from the rotation detecting brush BD0 and is differentiated in the differentiating circuit 101. Then, signal SB0 which is synchronized in the leading edge of each pulse is applied to the time constant reset circuit 102. The time constant reset circuit 102 is synchronized in the signal SB0, and resets the time constant circuit 103. Then, signal SC0 is output from the time constant circuit 103 as illustrated in FIG. 39.

In the normal state in which the motor M0 rotates at a usual rotational speed, the voltage of the output signal SC0 from the time constant circuit 103 does not exceed the reference voltage applied from the reference voltage generating device 104. In this state, output signal SD0 from the comparator 105 is in an "L" (low) level, and the relay 107 is excited and keeps an ON condition. Thereby, the supply of electricity to the motor M0 is maintained.

However, when the rotational speed of the motor M0 is lowered by overloads, etc., the voltage of the output signal SC0 from the time constant circuit 103 exceeds the reference voltage. Thereby, the output signal SD0 from the comparator 105 becomes a "H" (high) level, and the exciting current does not flow through the relay 107. Thereby, the relay 107 is turned off, and the contact 107a is opened. As a result, the supply of electricity to the motor M0 is stopped.

Thus, in the above-described DC motor control circuit, the lowering of the rotational speed of the motor M0 is detected, and excessive current is prevented from flowing in the motor M0 by stopping the DC motor M0.

Japanese Laid-open patent publication No. 4-127864 describes a DC motor control circuit wherein only when the rotational speed of the motor M0 is lower than the certain rotational speed is the relay 107 turned off.

DC motor rotation control apparatuses which detect and control the rotational speed, the rotational position, the cumulative rotation number, and the rotational direction of the DC motor with high accuracy are heretofore not known in the art.

SUMMARY OF THE INVENTION

According to one aspect of the present invention, a direct current motor rotation detecting apparatus and a direct current motor rotation control apparatus which are configured to detect and control at least one of a rotational direction, a rotational speed, a rotational position, and a cumulative rotation number of a rotor of a direct current motor, include at least one rotation detecting brush configured to detect a rotation of the rotor, a differentiating circuit configured to differentiate a voltage obtained through the at least one rotation detecting brush, and a pulse generator configured to be triggered by the differentiating circuit at a time interval proportional to a rotational speed of the direct current motor and to generate pulses having a predetermined pulse width.

The present invention also includes a method for detecting at least one of a rotational direction, a rotational speed, a rotational position, and a cumulative rotation number of a rotor of a direct current motor. The method includes detecting a rotation of the rotor using at least one rotation detecting brush, differentiating a voltage obtained through the at least one rotation detecting brush, triggering a pulse generator by a differentiating device, and generating pulses having a predetermined pulse width.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 8A is a diagram illustrating the waveform of an output signal from a rotation detecting brush, from which noise is removed by the noise removing circuit, FIG. 8B is a diagram illustrating the waveform of an output signal from a differentiating circuit, and FIG. 8C is a diagram illustrating the waveform of an output signal from a pulse generator;

FIG. 9 is a circuit diagram illustrating a configuration of a rotation detecting apparatus according to a second embodiment of the present invention;

FIG. 10A is a diagram illustrating the waveform of an output signal from the rotation detecting brush, from which noise is removed by the noise removing circuit, FIG. 10B is a diagram illustrating the waveform of an output signal from the differentiating circuit, and FIG. 10C is a diagram illustrating the waveform of an output signal from the pulse generator;

FIG. 13A is a diagram illustrating the waveform of an on/off control signal of a transistor Q1, FIG. 13B is a diagram illustrating the waveform of an on/off control signal of a transistor Q4, FIG. 13C is a diagram illustrating the waveform of a signal input to the differentiating circuit, and FIG. 13D is a diagram illustrating the waveform of an output signal from the pulse generator;

FIG. 14A is a waveform diagram for explaining a measurement of a pulse interval, and FIG. 14B is an enlarged view of one clock period;

FIG. 16 is a truth table for explaining motor rotation control operation of the rotation control apparatus of FIG. 15;

FIG. 18A is a diagram illustrating the waveform of an on/off control signal of the transistor Q1, FIG. 18B is a diagram illustrating the waveform of an on/off control signal of the transistor Q4, FIG. 18C is a diagram illustrating the waveform of a signal input to the differentiating circuit, and FIG. 18D is a diagram illustrating the waveform of rotation signal pulses output from the pulse generator;

FIG. 20A is a diagram illustrating the waveform of an on/off control signal of the transistor Q1, FIG. 20B is a diagram illustrating the waveform of an on/off control signal of the transistor Q4, FIG. 20C is a diagram illustrating the waveform of a signal input to the differentiating circuit, and FIG. 20D is a diagram illustrating the waveform of rotation signal pulses output from the pulse generator;

FIG. 23A is a diagram illustrating the waveform of an on/off control signal of the transistor Q1, FIG. 23B is a diagram illustrating the waveform of an on/off control signal of the transistor Q4, FIG. 23C is a diagram illustrating the waveform of a signal input to the pulse generator, and FIG. 23D is a diagram illustrating the waveform of rotation signal pulses output from the pulse generator;

FIG. 30A is a diagram illustrating the waveform of an output voltage of the power supply circuit; FIG. 30B is a diagram illustrating the waveform of an on/off control signal of the transistor Q1; FIG. 30C is a diagram illustrating the waveform of an on/off control signal of the transistor Q4; FIG. 30D is a diagram illustrating the waveform of a signal input to the pulse generator; and FIG. 30E is a diagram illustrating the waveform of an output signal from the pulse generator;

FIGS. 31A through 31E are schematic views illustrating an example of a DC motor wherein a rotation detecting brush is arranged in a position inclined by 60° relatively to an electrode brush, and conditions of a commutator rotating clockwise in order by 30°;

FIG. 39 is a diagram illustrating waveforms of a motor starting signal, a rotation detecting signal, an output signal from a differentiating circuit, an output signal from a time constant circuit, an output signal from a comparator, an operation (on/off) signal of a relay, and a supply signal applied to a motor from a drive power supply according to a background art.

DESCRIPTION OF THE PREFERRED EMBODIMENTS

Figure 1:
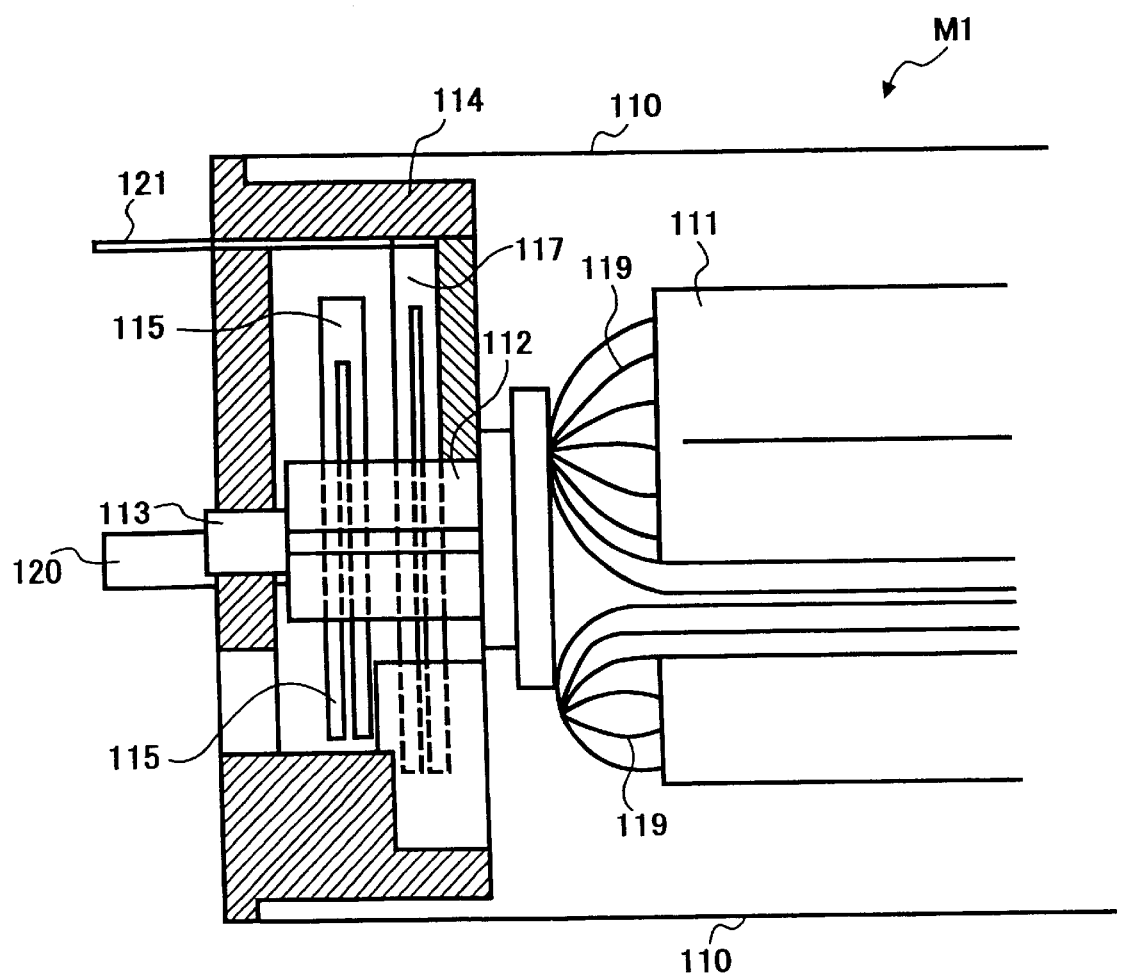
FIG. 1 is a schematic front view of a DC motor of the present invention illustrating a part of the DC motor shown in a longitudinal cross-section.

Preferred embodiments of the present invention are described in detail referring to the drawings, wherein like reference numerals designate identical or corresponding parts throughout the several views.

Other features of the invention will become apparent in the course of the following descriptions of exemplary embodiments, which are given for illustration of the invention and are not intended to be limiting thereof.

Figure 2:
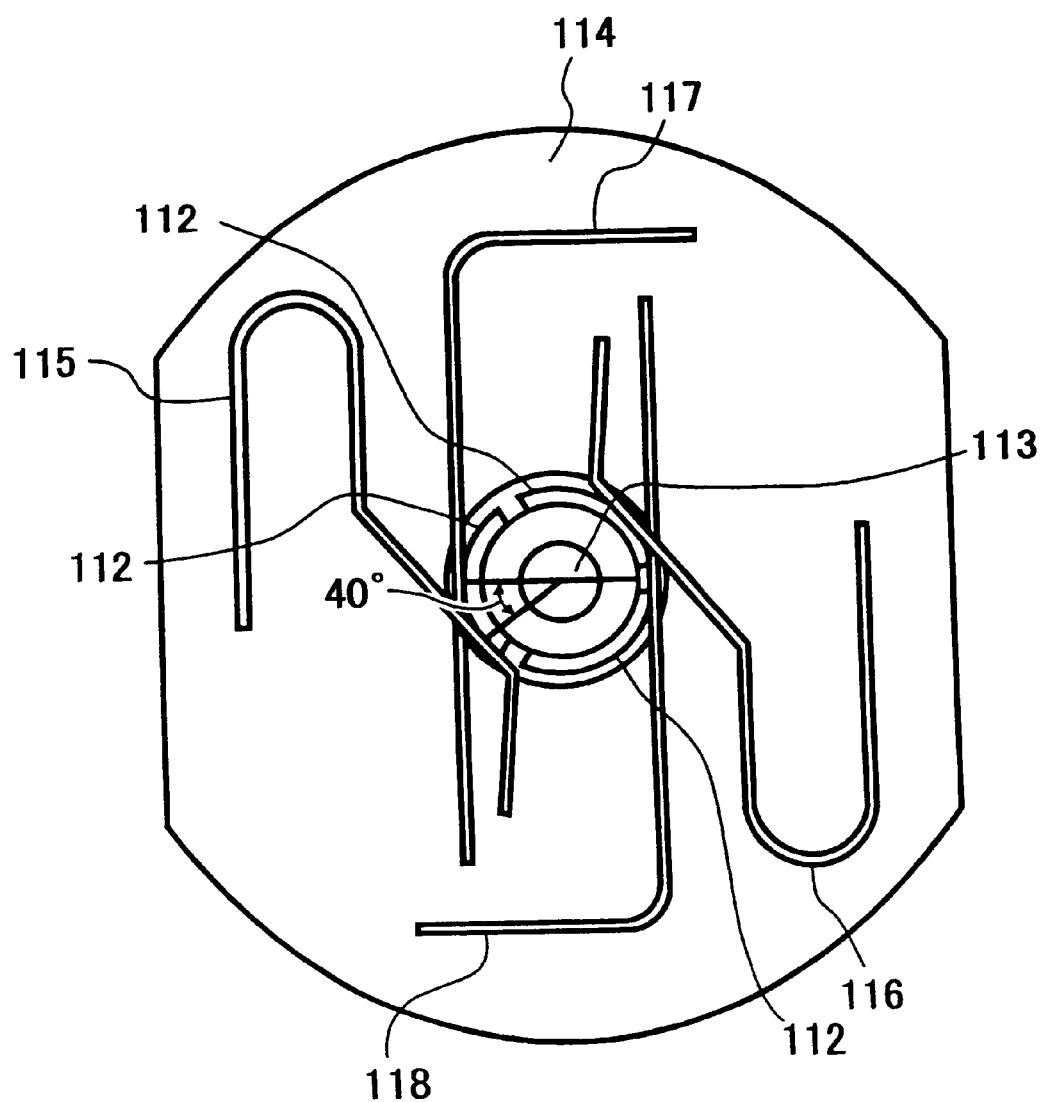
FIG. 2 is a schematic showing an internal cross-sectional view of the DC motor viewing from a left side opposed to a tip end of a rotation shaft of the DC motor.

FIGS. 1 and 2 illustrate a construction of a section in the vicinity of electrode brushes and rotation detecting brushes of a DC motor of the present invention. FIG. 1 is a schematic front view of the DC motor which illustrates a part of the DC motor shown in a longitudinal cross section, and FIG. 2 is a schematic of an internal cross-sectional view of the DC motor viewing from the left side opposed to a tip end of a rotation shaft. FIGS. 1 and 2 illustrate main elements of a DC motor M1 such as a stator 110, a rotor 111, a commutator 112, a rotation shaft 113, a support base 114, a pair of electrode brushes 115 and 116, a pair of rotation detecting brushes 117 and 118, rotor coils 119, and external connection terminals 120, 121 (the stator 110 and the rotor 111 are not shown in FIG. 2). For sake of clarity, FIG. 1 depicts only the electrode brush 115 and the rotation detecting brush 117 which are arranged by shifting the position in the thrust direction along an axis of the rotation shaft 113. Referring to FIG. 2, the rotation detecting brushes 117 and 118 are arranged on the rotation angle position of 40° relative to the electrode brushes 115 and 116, respectively.

The rotor 111 forms, for example, three magnetic poles with the structure including three sets of rotor coils 119 wound in the rotor 111. The rotor 111 is fixed on the rotation shaft 113. The commutator 112 includes segments made up of, for example, three conductive pieces which surround the circumference of the rotation shaft 113 at equally angled intervals with somewhat of a small gap. Each set of rotor coils 119 of the rotor 111 is connected to each other between the segments of the commutator 112 adjacent to each other. The rotation shaft 113 fixedly supports the rotor 111 on the intermediate portion of the rotation shaft 113, and fixedly supports the commutator 112 on the portion of the rotation shaft 113 close to one end of the rotor 111. The rotation shaft 113 is rotatably held by the support base 114, etc.

The support base 114 rotatably holds the rotation shaft 113 at a position in the vicinity of one end of the rotation shaft 113 at the side of the commutator 112 by a suitable bearing mechanism. The support base 114 is in the shape of short-sized cylinder which is hollow and has one end surface portion, and accommodates and supports almost all portions of the paired electrode brushes 115 and 116 and the paired rotation detecting brushes 117 and 118 in its hollow portion. In the state that the support base 114 holds the rotation shaft 113, the support base 114 accommodates almost all portions of the commutator 112 in its hollow portion.

The stator 110 accommodates the rotor 111, the commutator 112, the rotation shaft 113, and etc. Further, the stator 110 partially accommodates the support base 114. In such a way, the assembly as mentioned above constitutes a unit of the DC motor M1.

The paired electrode brushes 115 and 116 are preferably made of a material in a state of a plate which is conductive and resilient. As illustrated in FIG. 2, the electrode brushes 115 and 116 can respectively be bent into a U shape. One end of each electrode brush 115 and 116 is bent outward. The one end thereof is further bent back such that the tip end portion thereof becomes almost parallel with the non-bent portion. At each other tip end portion of electrode brushes 115 and 116, an extending portion that extends in a direction perpendicular to the end surface portion of the support base 114 is formed.

The electrode brushes 115 and 116 are formed in a rotationally symmetric state relative to the rotation shaft 113 which is almost in parallel with the extending portions. The support base 114 holds the electrode brushes 115 and 116 in the hollow portion such that the electrode brushes 115 and 116 are brought into sliding contact with the commutator 112 on the rotation angle position of 180° relative to the commutator 112.

The paired rotation detecting brushes 117 and 118 can be made of a material in a state of a plate which is conductive and resilient. As illustrated in FIG. 2, the rotation detecting brushes 117 and 118 can respectively be bent in a L shape. One portion of each rotation detecting brush 117 and 118 from the bent point is longer than the other portion therefrom. At each tip end portion of the other portions of the rotation detecting brushes 117 and 118, an extending portion that extends in a direction perpendicular to the end surface portion of the support base 114 is formed.

The rotation detecting brushes 117 and 118 are formed in a rotationally symmetric state relative to the rotation shaft 113 which is almost in parallel with the extending portions. The support base 114 holds the rotation detecting brushes 117 and 118 in the hollow portion such that the rotation detecting brushes 117 and 118 are brought into sliding contact with the commutator 112 on the rotation angle position of 180° relative to the commutator 112. In addition, the sliding contact position of each rotation detecting brush 117 and 118 is a position different from the sliding contact position of each electrode brush 115 and 116 at a predetermined positional interval in the thrust direction along the axis of the rotation shaft 113. The sliding contact positions of the rotation detecting brushes 117 and 118 are shifted by a predetermined rotation angle, for example 40°, relative to the sliding contact positions of the electrode brushes 115 and 116, respectively.

The support base 114 includes a through-hole on the center of the end plate portion thereof so as to pass the rotation shaft 113 into the through-hole and to rotatably hold the rotation shaft 113. A bearing portion is formed at the through-hole.

Respective tip ends of the extending portions at the other tip end portions of the electrode brushes 115 and 116, and respective tip ends of the extending portions at the tip end portions of the rotation detection brushes 117 and 118, protrude outward from the end surface portion of the support base 114 to serve as external connection terminals 120 and 121, respectively.

Although the pair of rotation detecting brushes 117 and 118 is provided in the DC motor M1, only one of the rotation detecting brushes 117 and 118 can be provided therein.

The shapes of the electrode brushes 115 and 116 and the rotation detecting brushes 117 and 118 are not limited to those illustrated in FIG. 2, but any other shapes can be employed.

Figure 3:
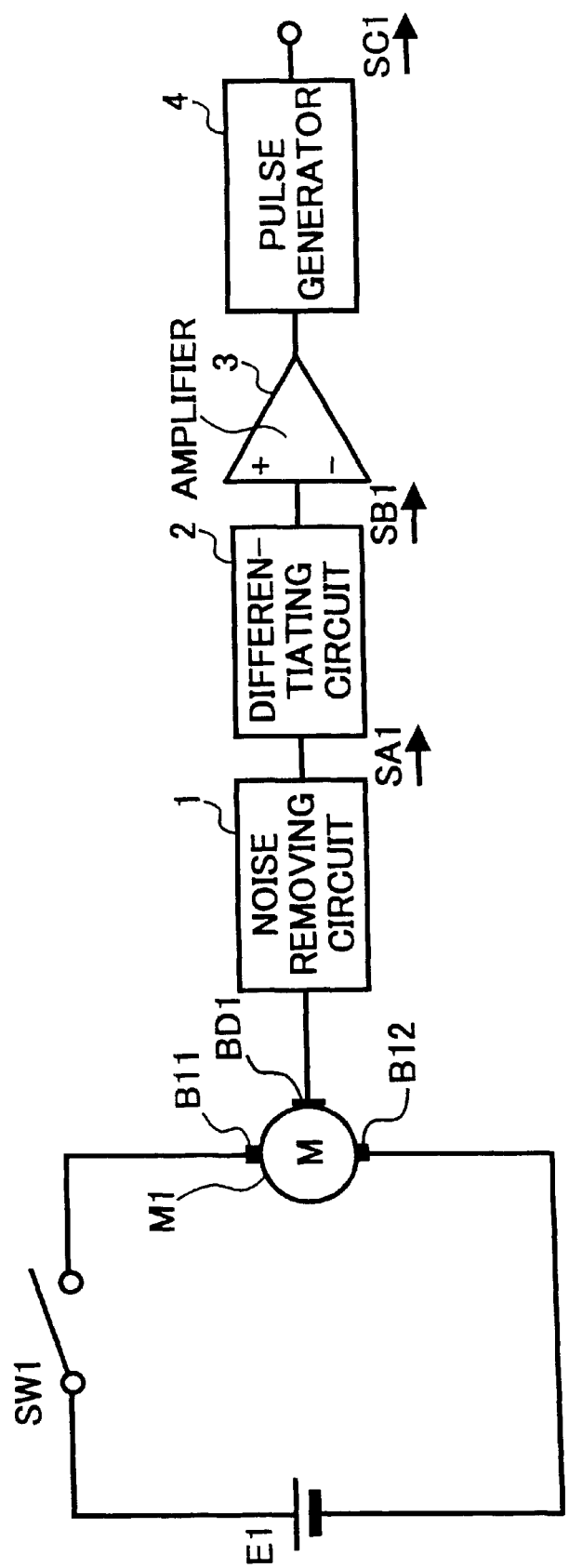
FIG. 3 is a circuit diagram illustrating a basic configuration of a rotation detecting apparatus according to a first embodiment of the present invention.

Hereinafter is described a rotation detecting apparatus of the present invention that detects the rotational operation of a DC motor. FIG. 3 is a circuit diagram illustrating a basic configuration of a DC motor rotation detecting apparatus that detects the rotational operation of a DC motor. The DC motor M1 is driven by being applied with a drive voltage from a drive power supply E1 through a switch SW1. The DC motor M1 includes one rotation detecting brush BD1 in addition to a pair of electrode brushes B11 and B12.

The rotation detecting apparatus of FIG. 3 includes a noise removing circuit 1, a differentiating circuit 2, an amplifier 3, and a pulse generator 4. The noise removing circuit 1 removes noise components such as a waveform in a state of a sharp surge from the signal detected by the rotation detecting brush BD1 and applies the detected signal voltage to the differentiating circuit 2.

Figure 4:
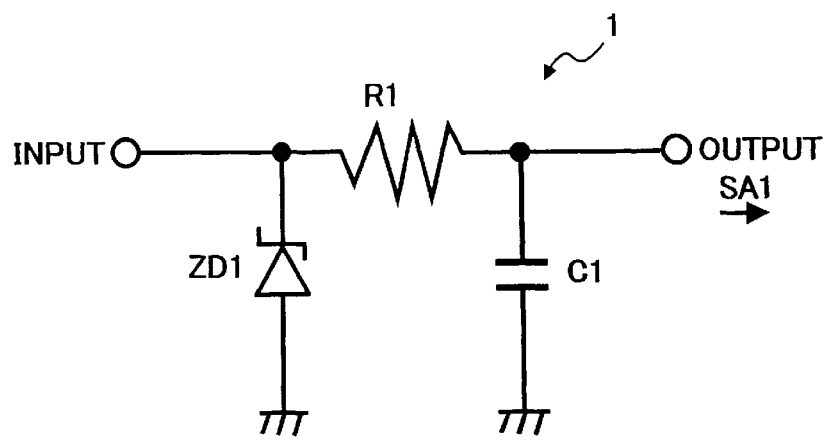
FIG. 4 is a circuit diagram illustrating an exemplary construction of a noise removing circuit of the rotation detecting apparatus of FIG. 3.

FIG. 4 illustrates an exemplary construction of the noise removing circuit 1. The noise removing circuit 1 includes a constant-voltage diode ZD1, a resistor R1, and a capacitor C1.

The constant-voltage diode ZD1 (e.g., zener diode, etc.) is connected across the rotation detecting brush BD1 and the common low-voltage side of the drive power supply E1.

The resistor R1 and the capacitor C1 are connected in series. The series circuit of the resistor R1 and the capacitor C1 is connected in parallel with the constant-voltage diode ZD1 across the rotation detecting brush BD1 and the common low-voltage side of the drive power supply E1.

One terminal of the resistor R1 is connected to an input terminal, that is, a connection point of the rotation detecting brush BD1 and the constant-voltage diode ZD1. The other terminal of the resistor R1 is connected to one terminal of the capacitor C1. The other terminal of the capacitor C1 is connected to the common low-voltage side of the drive power supply E1. A voltage between both terminals of the capacitor C1, that is, a voltage between a connection point of the capacitor C1 and the resistor R1 and the common low-voltage side of the drive power supply E1, is applied to the differentiating circuit 2.

The differentiating circuit 2 differentiates the detection signal generated by the rotation detecting brush BD1 from which the noise is removed by the noise removing circuit 1, and outputs differentiating pulses. The differentiating circuit 2 detects the leading edge or the trailing edge of the sharp surge-state waveform of the detection signal generated by the rotation detecting brush BD1 from which the noise is removed by the noise removing circuit 1.

Figure 5:
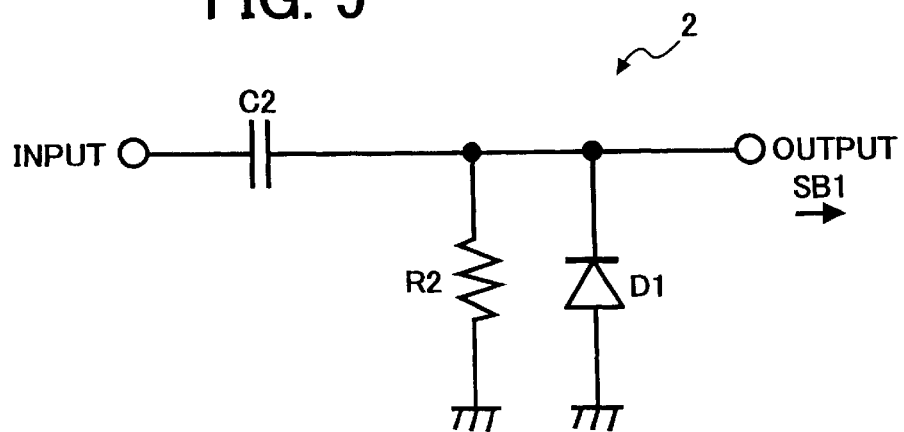
FIG. 5 is a circuit diagram illustrating an exemplary construction of a differentiating circuit of the rotation detecting apparatus of FIG. 3.

FIG. 5 illustrates an exemplary construction of the differentiating circuit 2. The differentiating circuit 2 of FIG. 5 includes a capacitor C2, a resistor R2, and a diode D1. The capacitor C2 and the resistor R2 are connected in series. The output voltage from the noise removing circuit 1 is applied to both terminals of the series circuit of the capacitor C2 and the resistor R2. One terminal of the capacitor C2 is connected to a connection point of the resistor R1 and the capacitor C1 of the noise removing circuit 1. The other terminal of the capacitor C2 is connected to the common low-voltage side of the drive power supply E1 via the resistor R2. The diode D1 is connected in parallel with the resistor R2. A voltage between both terminals of the diode D1 is applied to the amplifier 3.

Figure 6:
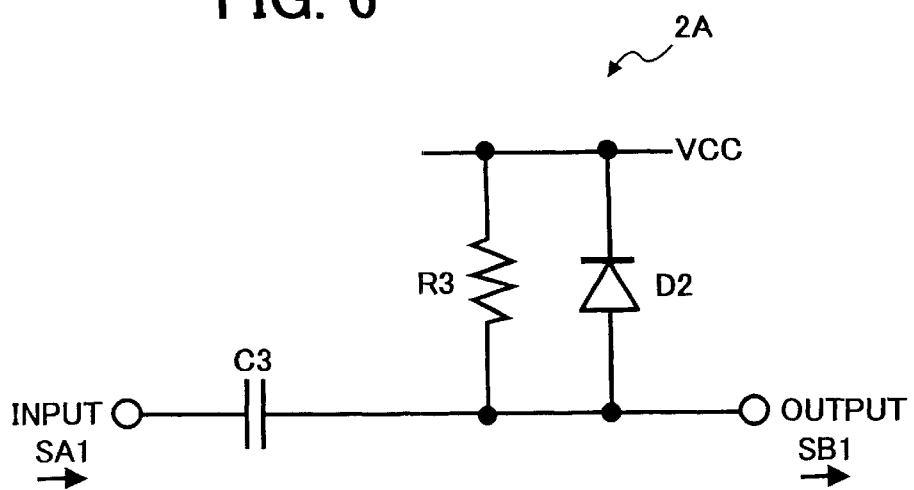
FIG. 6 is a circuit diagram illustrating an alternative construction of the differentiating circuit of the rotation detecting apparatus of FIG. 3.

An alternative construction of the differentiating circuit 2 is illustrated in FIG. 6. A differentiating circuit 2A of FIG. 6 includes a capacitor C3, a resistor R3, and a diode D2. The capacitor C3 and the resistor R3 are connected in series. An output voltage from the noise removing circuit 1 is applied to one terminal of the capacitor C3. The one terminal of the capacitor C3 is connected to the connection point of the resistor R1 and the capacitor C1 of the noise removing circuit 1. The other terminal of the capacitor C3 is connected to a power supply voltage VCC via the resistor R3. The diode D2 is connected in parallel with the resistor R3. A voltage between both terminals of the diode D2 is applied to the amplifier 3.

An output voltage from the differentiating circuit 2 is amplified by the amplifier 3 and is applied to the pulse generator 4 to trigger the pulse generator 4. The pulse generator 4 generates a one-shot pulse of a predetermined pulse width in response to a trigger signal output from the amplifier 3. When the pulse generator 4 is triggered by a pulse train, the pulse generator 4 outputs a pulse train having a predetermined pulse width which is the same as a duty cycle of the triggering pulse train.

Figure 7:
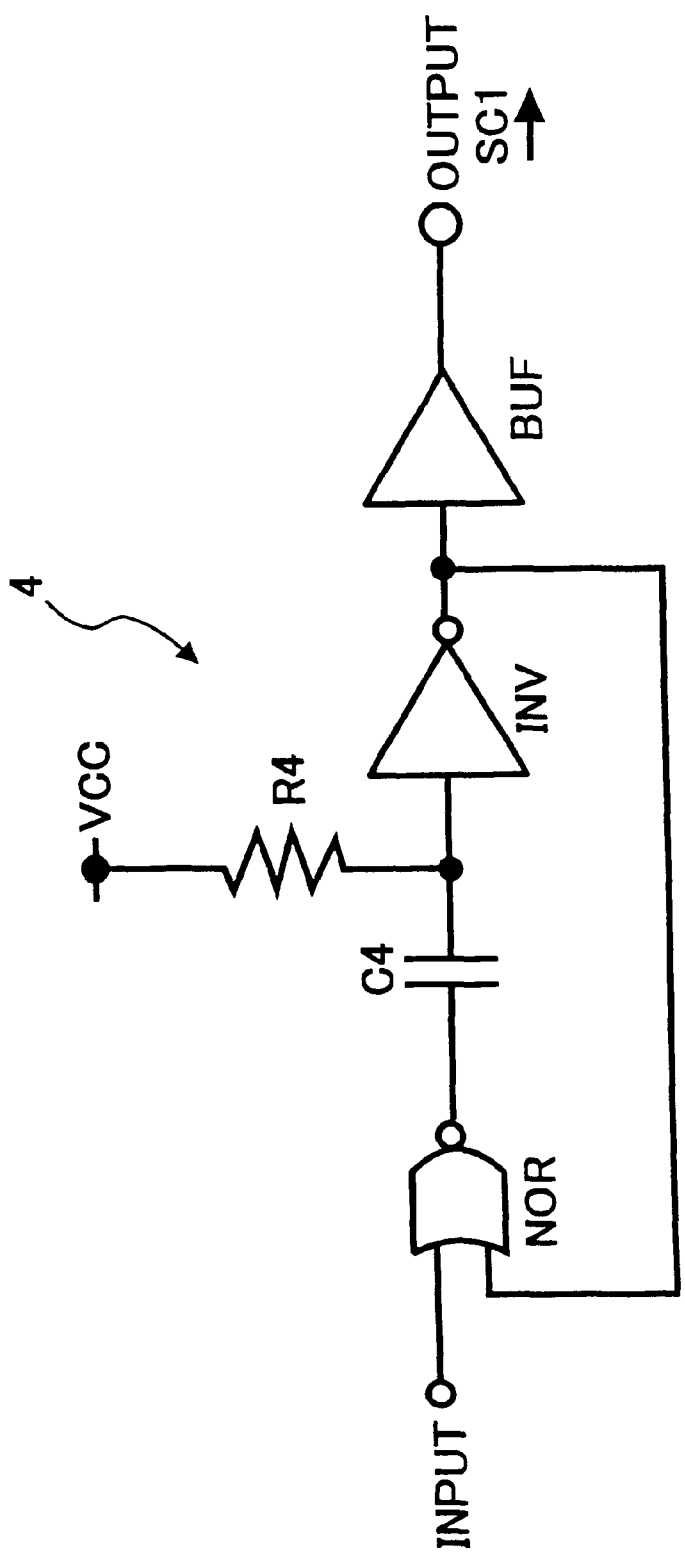
FIG. 7 is a circuit diagram illustrating an exemplary construction of a pulse generator of the rotation detecting apparatus of FIG. 3.

FIG. 7 illustrates an exemplary construction of a circuit of the pulse generator 4. The pulse generator 4 of FIG. 7 includes a NOR gate NOR, a capacitor C4, a resistor R4, an inverter INV, and a buffer circuit BUF. The NOR gate NOR is a two input type. An output voltage from the amplifier 3 is input to one input terminal of the NOR gate NOR. One terminal of the capacitor C4 is connected to an output terminal of the NOR gate NOR. The other terminal of the capacitor C4 is connected to one terminal of the resistor R4. The other terminal of the resistor R4 is connected to a power supply voltage VCC. A connection point of the capacitor C4 and the resistor R4 is connected to an input terminal of the inverter INV. An output terminal of the inverter INV is connected to an input terminal of the buffer circuit BUF. An output voltage from the inverter INV is fed back to the other input terminal of the NOR gate NOR. Finally, an output voltage from the buffer circuit BUF becomes an output voltage from the pulse generator 4.

Next, the operation of the rotation detecting apparatus of FIG. 3 is described referring to FIGS. 8A through 8C. FIG. 8A is a diagram illustrating the waveform of an output signal SA1 from the rotation detecting brush BD1, from which the noise is removed by the noise removing circuit 1, FIG. 8B is a diagram illustrating the waveform of an output signal SB1 from the differentiating circuit 2, and FIG. 8C is a diagram illustrating the waveform of an output signal SC1 from the pulse generator 4.

The DC motor M1 and the switch SW1 are connected to the drive power supply E1 in series. The rotation detecting brush BD1 of the DC motor M1 is connected to the noise removing circuit 1. As described above referring to FIG. 4, in the noise removing circuit 1, the series circuit of the resistor R1 and the capacitor C1 is connected in parallel with the constant-voltage diode ZD1. The constant-voltage diode ZD1 clamps the voltage of the counter-electromotive force induced by the action of self-induction of the rotor windings of the DC motor M1, i.e., the rotor coils.

The resistor R1 and the capacitor C1 construct a lowpass filter for taking out an output voltage from a connection point of the resistor R1 and the capacitor C1 and removing high frequency components. The output voltage taken out from the connection point of the resistor R1 and the capacitor C1 is applied to the differentiating circuit 2.

When the switch SW1 is closed, the drive voltage is applied to the DC motor M1 from the drive power supply E1. Thereby, the rotor coils are magnetically excited through the electrode brushes B11 and B12, and the rotor rotates relative to the stator having magnetic poles formed by permanent magnets, etc. of itself. By the rotation of the DC motor M1, a voltage signal almost in the state of a pulse is generated onto the rotation detecting brush BD1.

Regarding the sharp surge-state waveform of the leading edge portion of each pulse in the pulse train of the voltage signal output from the rotation detecting brush BD1, because the magnitude of the current flowing through the rotor coils connected to respective conductive pieces of the commutator instantaneously varies when the conductive pieces of the commutator in contact with the rotation detecting brush BD1 are changed over, the above-described variation of the current is caused by the voltage generated by the action of the self-induction of the rotor coils. The peak value and width of the surge voltage waveform vary in accordance with the magnitude of the voltage thus induced varies in accordance with the magnitude of the current flowing through the rotor coils corresponding to the rotational speed of the DC motor M1.

The inclined portion of each pulse is composed of (by superposing) the voltage generated by current flowing through the rotor coils and by DC resistance components of the rotor coils and the induction voltage induced by the action of the rotor coils' rotation in the magnetic field.

In the waveform of the output signal SA1 from the rotation detecting brush BD1 illustrated in FIG. 8A, the above-described surge waveform and high-frequency noise such as mechanical noise, etc., caused by the contact of the rotation detecting brush BD1 with the commutator are removed by the noise removing circuit 1.

The differentiating circuit 2 differentiates the voltage of the output signal SA1 from the noise removing circuit 1, for example, in the circuit illustrated in FIG. 5 including the capacitor C2, the resistor R2, and the diode D1. In the differentiating circuit 2, negative polarity components corresponding to the trailing edge of the waveform of the output signal from the rotation detecting brush BD1 are removed by the diode D1 from the differential waveform obtained at the connection point of the capacitor C2 and the resistor R2. Thereby, only positive polarity components corresponding to the leading edge of the sharp surge-state waveform of the output signal from the rotation detecting brush BD1 are taken out, so that spike-state differential pulses are output from the differentiating circuit 2 as illustrated in FIG. 8B. The output voltage from the differentiating circuit 2 is amplified by the amplifier 3 and triggers the pulse generator 4 as trigger pulses.

As illustrated in FIG. 7, the pulse generator 4 is a so-called one shot pulse generator circuit including the Nor gate NOR, the capacitor 4, the resistor R4, the inverter INV, and the buffer circuit BUF. Each time the trigger signal is input to the Nor gate NOR, a one shot pulse having a predetermined pulse width is generated. Specifically, in the pulse generator 4, the output voltage of the inverter INV is inverted by the trigger signal, and is then inverted again after a predetermined time by a time constant circuit composed of the capacitor C4 and the resistor R4. The output voltage of the inverter INV is output from the pulse generator 4 through the buffer circuit BUF as rectangular waveform pulses illustrated in FIG. 8C. An output pulse width "tw" of the pulses output from the pulse generator 4 is set by a value of the capacitor C4 and the resistor R4.

FIGS. 8A through 8C illustrate waveforms in a case of a three-pole DC motor, that is, the number of rotor coils is three. Assuming that N represents a maximum rotational speed of the DC motor M1, a time for one rotation of the rotor of the DC motor M1, i.e., a rotation period, is determined by the following formula:

Time for one rotation of the rotor of the DC motor M1 (seconds)= $1/(N/60)$

In order to prevent respective pulses from overlapping with adjacent pulses, a pulse width of the output signal from the pulse generator 4 should satisfy the following condition:

$tw < T = 60/3N$ where tw is the pulse width of the output signal from the pulse generator 4, T is a pulse period of the output signal from the rotation detecting brush BD1, and N is a maximum rotational speed of the DC motor M1. Thus, in the case of n-pole DC motor, the pulse width of the output signal from the pulse generator should satisfy the following condition:

$tw < 60/nN$.

By setting the pulse width of the output signal from the pulse generator to satisfy the above-described condition, a DC motor rotation is effectively detected corresponding to the number of rotor magnetic poles.

The noise removing circuit 1 and the amplifier 3 may be suitably constructed according to properties of the used DC motor, electric power consumed by the DC motor, and voltage of a signal processing circuit system, etc. Further, the noise removing circuit 1 and the amplifier 3 are not always indispensable structures. Depending on the properties of the used DC motor, the electric power consumed by the DC motor, and the voltage of the signal processing circuit system, etc., the noise removing circuit 1 and the amplifier 3 may be omitted.

Next, referring to FIG. 9, a rotation control apparatus that controls the rotational operation of a DC motor according to a second embodiment of the present invention is described.

Similarly as in the rotation detecting apparatus of FIG. 3, the rotation control apparatus of FIG. 9 includes the noise removing circuit 1, the differentiating circuit 2, the amplifier 3, and the pulse generator 4 in addition to a DC motor M2. The rotation control apparatus of FIG. 9 further includes a motor driving circuit 5 and a motor control circuit 10.

The rotation control apparatus of FIG. 9 controls the rotational operation of the DC motor M2 that is driven by being supplied with a drive electric power from a drive power supply E2 of the motor driving circuit 5. The DC motor M2 includes one rotation detecting brush BD2 and a pair of electrode brushes B21 and B22.

The motor driving circuit 5 includes the drive power supply E2 and a switching section constructing a bridge circuit composed of four transistors Q1, Q2, Q3, and Q4. The switching section is connected to the positive and negative output terminals of the drive power supply E2 constructed with a DC power supply.

The electrode brush B21 of the DC motor M2 is connected to one of the output terminals of the motor driving circuit 5, i.e., a connection point of a collector of the pnp transistor Q1 and a collector of the npn transistor Q3. The other electrode brush B22 of the DC motor M2 is connected to the other output terminal of the motor driving circuit 5, i.e., a connection point of a collector of the pnp transistor Q2 and a collector of the npn transistor Q4.

Four control input terminals of the motor driving circuit 5 are connected to the motor control circuit 10. Turning on/off of the transistors Q1 through Q4, forward/reverse rotations of the DC motor M2, and the rotation stop of the DC motor M2 are controlled in accordance with motor control signals generated by a motor control signal generating device 14 of the motor control circuit 10.

The rotation detecting brush BD2 of the DC motor M2 is connected to the noise removing circuit 1 which removes noise components from the signal detected by the rotation detecting brush BD2. The output signal of the noise removing circuit 1 is input to the differentiating circuit 2 which differentiates the output signal of the noise removing circuit 1 and outputs differentiating pulses which are synchronized with the leading edge of the rotation signal pulse output from the rotation detecting brush BD2.

The output signal of the differentiating circuit 2 is input to the amplifier 3 which amplifies the differential pulses. The output signals of the amplifier 3 are input to the pulse generator 4. The pulse generator 4 is triggered by the differential pulses amplified by the amplifier 3 and generates pulses having a predetermined pulse width. The output signal of the pulse generator 4 is input to the motor control circuit 10.

The motor control circuit 10 includes a microcomputer (not shown), a rotational speed calculating device 12 and the motor control signal generating device 14. The rotational speed calculating device 12 calculates the rotational speed of the DC motor M2 based on the pulse interval of the rotation signal pulse of the DC motor M2 output from the pulse generator 4. The motor control circuit 10 receives the output signal from the pulse generator 4 and, if necessary, a control command signal from an external device (not shown). The motor control signal generating device 14 generates the motor control signal to be applied to the motor driving circuit 5.

Next, the operation of the rotation control apparatus of FIG. 9 is described referring to FIGS. 10A through 10C.

FIG. 10A is a diagram illustrating the waveform of an output signal from the rotation detecting brush BD2, from which the noise is removed by the noise removing circuit 1, when the DC motor M2 rotates in the clockwise (CW) and counter-clockwise (CCW) directions, FIG. 10B is a diagram illustrating the waveform of an output signal from the differentiating circuit 2 when the DC motor M2 rotates in the clockwise (CW) and counter-clockwise (CCW) directions, and FIG. 10C is a diagram illustrating the waveform of an output signal from the pulse generator 4 when the DC motor M2 rotates in the clockwise (CW) and counter-clockwise (CCW) directions.

When the motor control signal is output from the motor control signal generating device 14, and the transistors Q1 and Q4 of the motor driving circuit 5 are turned on, the DC motor M2 rotates, for example, in the clockwise direction. When the motor control signal is output from the motor control signal generating device 14, and the transistors Q2 and Q3 of the motor driving circuit 5 are turned on, the DC motor M2 rotates in the counter-clockwise direction. Then, the voltage of the rotation detecting signal generated by the rotation detecting brush BD2 of the DC motor M2 is applied to the differentiating circuit 2 through the noise removing circuit 1 (FIG. 10A).

The differentiating circuit 2 outputs differential pulses in response to, for example, the leading edge of the rotation signal pulse output from the rotation detecting brush BD2 (FIG. 10B). The waveform of the output signal from the rotation detecting brush BD2 from which the noise is removed by the noise removing circuit 1 turns out to be in a periodic pulse state corresponding to the rotation angle of the DC motor M2. The pulse period of the differential pulses output from the differentiating circuit 2 is inversely proportional to the rotational angle speed of the DC motor M2.

The differential pulses are amplified by the amplifier 3 and trigger the pulse generator 4. The pulse generator 4 outputs pulses of a predetermined pulse width each time it is triggered. As a result, pulse trains in a rectangular waveform in which the pulse period varies inversely with the rotational angle speed of the DC motor M2 are obtained as the output signal from the pulse generator 4 as illustrated in FIG. 10C.

The rotational speed calculating device 12 of the motor control circuit 10 calculates the rotational speed of the DC motor M2 based on the pulse trains output from the pulse generator 4. The motor control signal generating device 14 generates the motor control signal based on the rotational speed of the DC motor M2 calculated by the rotational speed calculating device 12, and applies the motor control signal to the motor driving circuit 5. The motor driving circuit 5 controls the transistors Q1 through Q4 by the switching control at a required timing based on the motor control signals.

With the above-described construction of the rotation control apparatus, stable rotation signals can be obtained in bidirectional rotations of the DC motor M2. As a result, the rotational speed of the DC motor M2 can be properly controlled.

Figure 11:
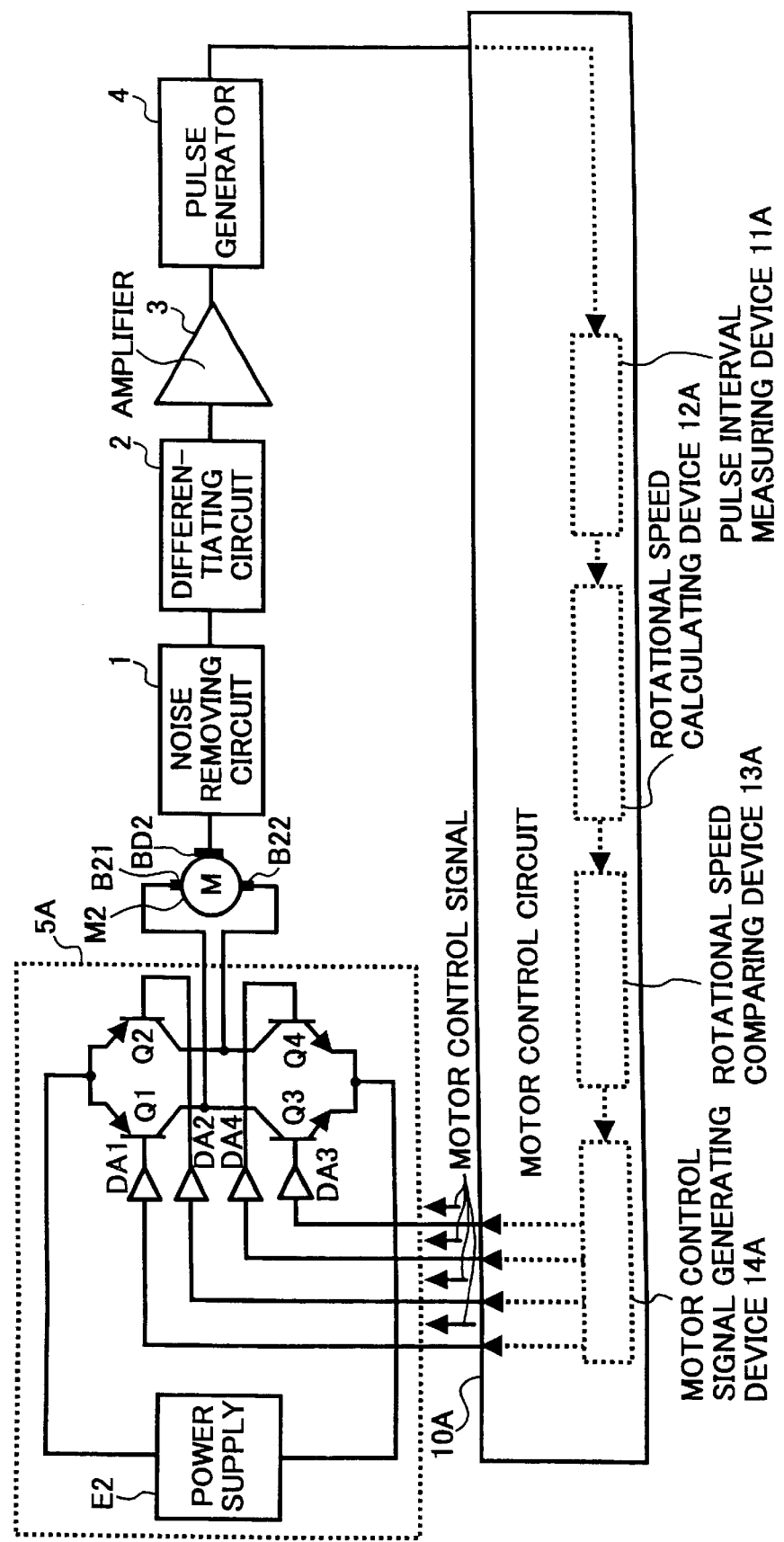
FIG. 11 is a circuit diagram illustrating a configuration of a rotation control apparatus according to a third embodiment of the present invention.

FIG. 11 illustrates a construction of a rotation control apparatus that controls the rotational operation of the DC motor according to a third embodiment of the present invention. The rotation control apparatus of FIG. 11 has a construction similar to the rotation control apparatus of FIG. 9 with the exception of employing a motor driving circuit 5A instead of the motor driving circuit 5, and a motor control circuit 10A instead of the motor control circuit 10.

The motor control circuit 10A includes a microcomputer (not shown), a pulse interval measuring device 11A, a rotational speed calculating device 12A, a rotational speed comparing device 13A, and a motor control signal generating device 14A.

The pulse interval measuring device 11A measures a pulse interval $T_M$. The method of measuring the pulse interval $T_M$ by use of the pulse interval measuring device 11A is to count a clock having a sufficiently higher frequency than that of the rotation signal pulse of the DC motor M2 output from the pulse generator 4 as illustrated in FIG. 14A by one period of the rotation signal pulse. In FIG. 14B, "Tax" represents one period of the clock. The pulse interval $T_M$ signifies "Tax× count number".

The rotational speed calculating device 12A calculates the rotational speed of the DC motor M2 based on the pulse interval $T_M$ obtained by the pulse interval measuring device 11A. When the period of the rotation signal pulse obtained by the pulse interval measuring device 11A, that is, the pulse interval, is $T_M$ seconds, the rotational speed of the DC motor M2 is calculated by the rotational speed calculating device 12A. The calculated value is $60/3T_M$ r.p.m. in the case of the three-pole motor. The clock is generated by a clock oscillator (not shown) contained in the microcomputer (not shown), etc. of the motor control circuit 10A.

The rotational speed comparing device 13A compares a present rotational speed N1 calculated by the rotational speed calculating device 12A with a target speed N2, and causes the motor control signal generating device 14A to generate a motor control signal so as to obtain the target speed N2.

The motor driving circuit 5A is constructed such that the transistors Q1, Q2, Q3, and Q4 are respectively turned on/off by drivers DA1, DA2, DA3, and DA4 which react to the motor control signal generated by the motor control signal generating device 14A of the motor control circuit 10A.

Figure 12:
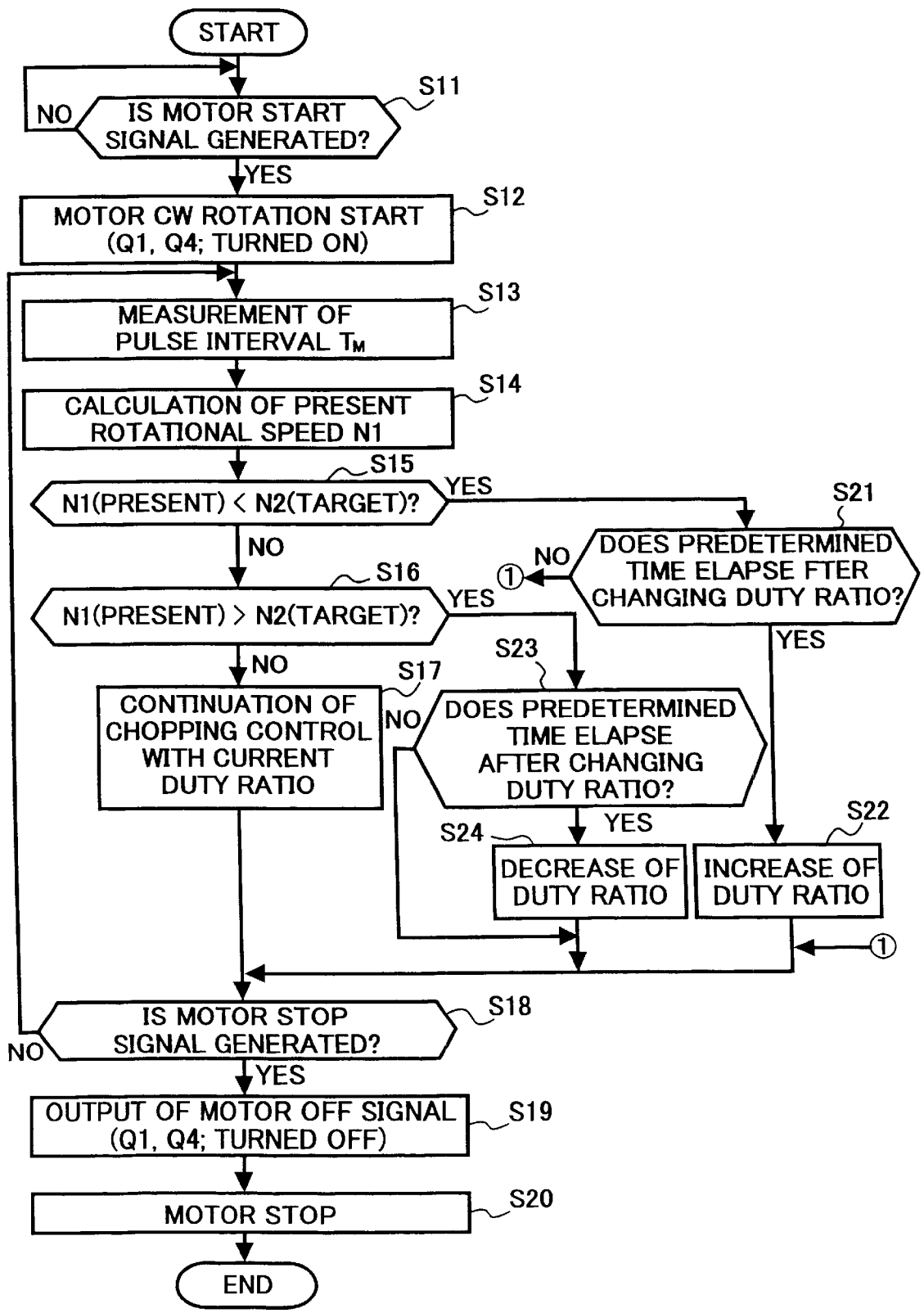
FIG. 12 is a flowchart illustrating main steps of the motor rotation control operation of the rotation control apparatus of FIG. 11.

Next, the operation of the rotation control apparatus of FIG. 11 is described referring to FIG. 12 and FIGS. 13A through 13D. FIG. 12 is a flowchart illustrating main steps of the operation of controlling the rotational speed of the DC motor M2. FIG. 13A is a diagram illustrating the waveform of an on/off control signal of the transistor Q1, FIG. 13B is a diagram illustrating the waveform of an on/off control signal of the transistor Q4, FIG. 13C is a diagram illustrating the waveform of a signal input to the differentiating circuit 2 (i.e., an output signal of the rotation detecting brush BD2), and FIG. 13D is a diagram illustrating the waveform of an output signal from the pulse generator 4.

Respective signals illustrated in FIGS. 13A through 13D are generated in the state that the DC motor M2 is rotated by performing a chopping control and the rotational speed of the DC motor M2 is controlled to be constant until a motor stop signal is generated. When the DC motor M2 is rotated, rotation signal pulses of the DC motor M2 appear from the output terminal of the pulse generator 4 corresponding to the rotation of the DC motor M2.

In the rotation control apparatus according to the third embodiment of the present invention, the motor control circuit 10A performs the so-called chopping control of repeating the momentary turning-off of the electricity supplying to the DC motor M2, and the rotational speed of the DC motor M2 is controlled by changing the duty ratio of the chopping control.

Specifically, the rotational speed of the DC motor M2 is calculated based on the rotation signal generated by the rotation detecting brush BD2. When the rotational speed of the DC motor M2 is higher than a predetermined target rotational speed, the duty ratio (i.e., the ratio of ON time per one pulse period) is reduced, and thereby the rotational speed of the DC motor M2 is lowered. When the rotational speed of the DC motor M2 is lower than the target rotational speed, the duty ratio is increased, and thereby the rotational speed of the DC motor M2 is made higher than the target rotational speed.

Hereinafter, main steps of the operation of controlling the rotational speed of the DC motor (hereinafter simply referred to as a motor rotation control operation) are described referring to FIG. 12. In step S11, the motor control circuit 10A judges if a motor start signal is generated from an external device (not shown) or not. If the answer is YES in step S11, the transistors Q1 and Q4 of the motor driving circuit 5A are turned on, and the power supply voltage is applied to the electrode brushes B21 and B22 of the DC motor M2. Thereby, the DC motor M2 starts rotating in the clockwise direction in step S12. If the answer is NO in step S11, the motor rotation control operation returns to reexecute step S11.

Further, the pulse interval measuring device 11A measures the pulse interval $T_M$ based on the rotation signal pulses output from the pulse generator 4 in step S13. Based on the measurement result of the pulse interval $T_M$, the rotational speed calculating device 12A calculates a present rotational speed N1 of the DC motor M2 in step S14.

Then, the rotational speed comparing device 13A compares the present rotational speed N1 calculated by the rotational speed calculating device 12A with a target rotational speed N2, and judges if the present rotational speed N1 is lower than the target rotational speed N2 in step S15. The target rotational speed N2 may not be a specified rotational speed value but may fall within a specified rotational speed range. If the answer is NO in step S15, the rotational speed comparing device 13A judges if the present rotational speed N1 exceeds the target rotational speed N2 in step S16.

If the answer is NO in step S16, the present rotational speed N1 equals the target rotational speed N2. Therefore, the motor control circuit 10A continues the chopping control of the DC motor M2 with the current duty ratio in step S17.

Then, the motor control circuit 10A judges if a motor stop signal is generated from an external device (not shown) or not in step S18. If the answer is YES in step S18, the motor control signal generating device 14A outputs motor off signals, and the transistors Q1 and Q4 are turned off in step S19. Then, the DC motor M2 stops rotating in step S20. If the answer is NO in step S18, the motor rotation control operation returns to reexecute step S13.

If the answer is YES in step S15, the motor control circuit 10A judges if a predetermined time elapses after the immediately-before duty ratio is changed in step S21. If the answer is YES in step S21 or if the duty ratio is not changed before at all, the motor control circuit 10A increases the duty ratio of the chopping control in step S22, and then the motor rotation control operation proceeds to step S18. If the answer is NO in step S21, the motor rotation control operation proceeds to step S18 without changing the duty ratio of the chopping control.

If the answer is YES in step S16, the motor control circuit 10A judges if a predetermined time elapses after the immediately-before duty ratio is changed in step S23. If the answer is YES in step S23 or if the duty ratio is not changed before at all, the motor control circuit 10A decreases the duty ratio of the chopping control in step S24, and then the motor rotation control operation proceeds to step S18. If the answer is NO in step S23, the motor rotation control operation proceeds to step S18 without changing the duty ratio of the chopping control.

In the above-described motor rotation control operation, unless the predetermined time elapses after changing the duty ratio, the duty ratio is not changed. Because, it is considered that even though the duty ratio is changed, the rotational speed of the DC motor M2 does not immediately vary, and the response of the DC motor M2 is delayed. In such a situation, the predetermined number of the pulse periods of the chopping control or the predetermined count number of the rotation signal pulses may be used instead of the predetermined time.

As illustrated in FIGS. 13A through 13D, when the present rotational speed N1 coincides with the target rotational speed N2, the motor control circuit 10A executes a control such that the transistor Q1 repeats the state of turning-on and turning-off with the constant-period/constant-duty (ratio) and the transistor Q4 is always in the state of turning-on.

When the motor control circuit 10A judges that the measured present rotational speed N1 is lower than the target rotational speed N2, the motor control signal generating device 14A applies the motor control signals to the motor driving circuit 5A so as to increase the duty ratio of the chopping control in accordance with the difference between the present rotational speed N1 and the target rotational speed N2.

Specifically, for example, the ratio of the ON period during one period in the periodical on/off operation of the transistor Q1 is increased relative to the OFF period. For example, if the duty ratio is controlled to be 50% at the beginning, the duty ratio is changed to 75%, and then the rotational speed of the DC motor M2 is measured again.

When the motor control circuit 10A judges that the present rotational speed N1 exceeds the target rotational speed N2, the motor control signal generating device 14A applies the motor control signals to the motor driving circuit 5A so as to decrease the duty ratio of the chopping control in accordance with the difference between the present rotational speed N1 and the target rotational speed N2.

Specifically, for example, the ratio of the ON period during one period in the periodical on/off operation of the transistor Q1 is decreased relative to the OFF period. For example, if the duty ratio is controlled to be 75% at the beginning, the duty ratio is changed to 50%, and then the rotational speed of the DC motor M2 is measured again.

However, when the motor control circuit 10A judges that the present rotational speed N1 is still higher than the target rotational speed N2, the motor control signal generating device 14A applies the motor control signals to the motor driving circuit 5A so as to further decrease the duty ratio of the chopping control in accordance with the difference between the present rotational speed N1 and the target rotational speed N2.

Specifically, the ratio of the ON period during one period in the periodical on/off operation of the transistor Q1 is further decreased relative to the OFF period. For example, if the duty ratio is controlled to be 50% at the beginning, the duty ratio is changed to 25%, and then the rotational speed of the DC motor M2 is measured again.

Hereinafter, the output voltage generated from the rotation detecting brush BD2 and from which the noise is removed by the noise removing circuit 1 at the time of performing the chopping control is described. Referring to FIG. 13C, in the waveform at the DC control, the low-voltage area where the voltage is scarcely generated is shown as low "L" area, and the area where the voltage is gradually increased in the state of rightward rising-up is shown as high "H" area. In the "L" area, because the transistor Q4 is always turned on even in the chopping control period, the electric potential of the electrode brush B22 is almost equal to the common low-voltage potential. Because the rotation detecting brush BD2 inclined by the angle of 40° from the electrode brush B22 is short-circuited to the electrode brush B22 through the commutator, the rotation detecting brush BD2 almost falls to the common low-voltage potential.

In the "H" area, for example, viewing the "Portion A" indicated by dotted lines in FIGS. 13A through 13D, because the transistor Q1 is turned off at that time, the external voltage is not applied across the electrode brushes B21 and B22 of the DC motor M2. However, because the voltage is generated by the rotor coils due to the inductive electromotive force when the DC motor M2 rotates, the voltage also appears in the "H" area. When the rotation of the DC motor M2 becomes slow, the voltage turns out to be small. Therefore, it may be difficult to detect the voltage.

As described above, in the rotation control apparatus according to the third embodiment of the present invention, the rotational speed of the DC motor M2 is controlled by the chopping control. When the present rotational speed N1 is lower than the target rotational speed N2, the duty ratio of the chopping control is increased so as to increase the rotational speed of the DC motor M2. On the contrary, when the present rotational speed N1 exceeds the target rotational speed N2, the duty ratio of the chopping control is decreased so as to decrease the rotational speed of the DC motor M2.

Figure 15:
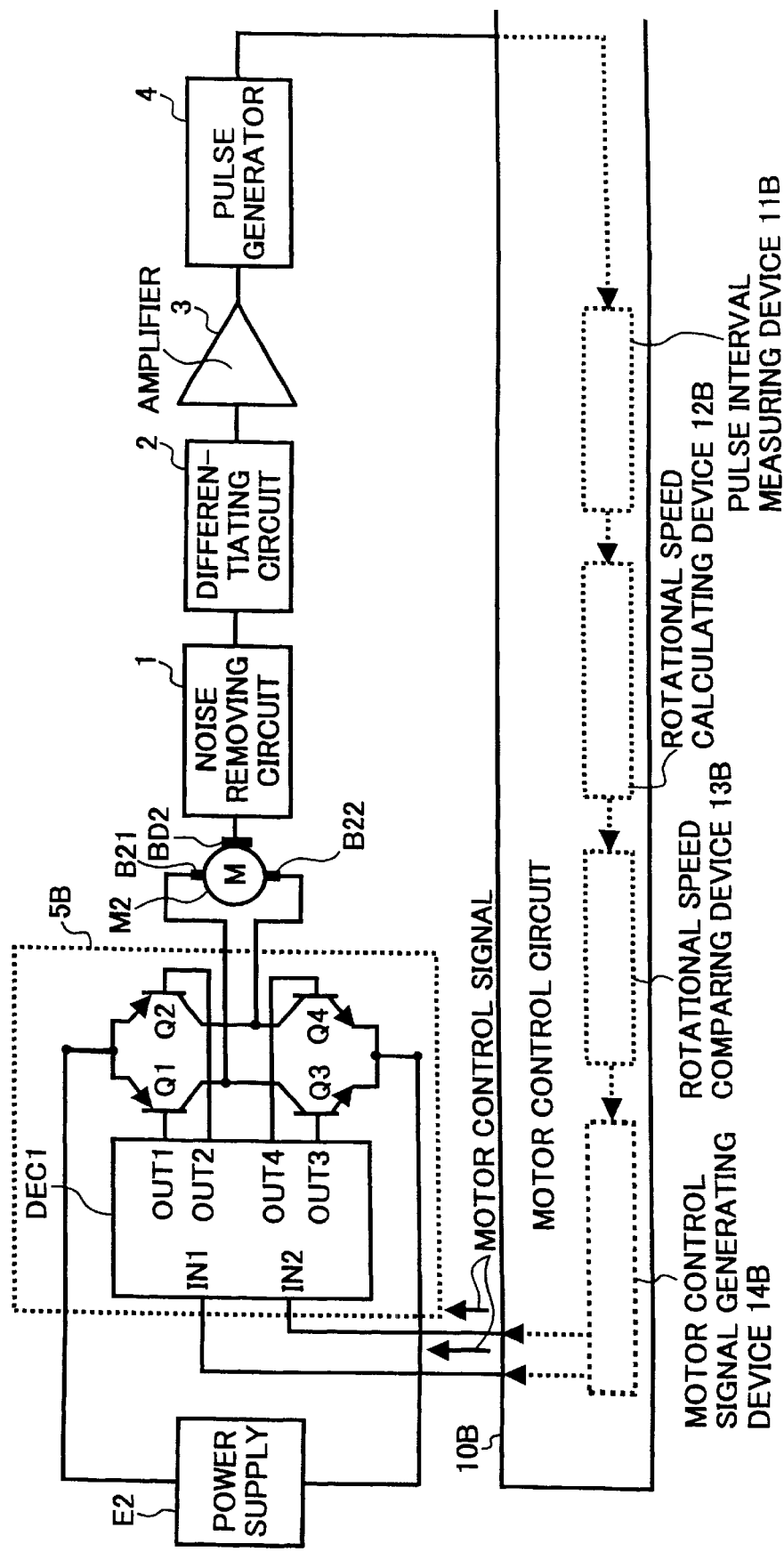
FIG. 15 is a circuit diagram illustrating a configuration of a rotation control apparatus according to a fourth embodiment of the present invention.

FIG. 15 illustrates a rotation control apparatus that controls the rotational operation of the DC motor M2 according to a fourth embodiment of the present invention. The rotation control apparatus of FIG. 15 has a construction similar to the rotation control apparatus of FIG. 11 employing a motor driving circuit 5B instead of the motor driving circuit 5A, and a motor control circuit 10B instead of the motor control circuit 10A.

In the motor driving circuit 5B, a decoder DEC1 is provided at the preceding stage of the bridge circuit including the four transistors Q1 through Q4. As illustrated in a truth table of FIG. 16, the motor driving circuit 5B serves to cause the DC motor M2 to be in the four states, such as, the clockwise rotation, the counter-clockwise rotation, the brake (shunt), and the stop, by use of the combination of two bits composed of the respective one-bit input signals IN1 and IN2 respectively applied as the motor control signals from a motor control signal generating device 14B of the motor control circuit 10B.

In such a motor driving circuit 5B, because the number of the control signals is small, the motor driving circuit 5B can be widely utilized in an apparatus that controls the rotation of the DC motor. In the motor driving circuit 5B, the transistors Q1 through Q4 are respectively turned on and off by the action of output signals OUT1 through OUT4 of the decoder DEC1 reacting in accordance with the motor control signals IN1 and IN2.

The motor control circuit 10B includes a microcomputer (not shown), a pulse interval measuring device 11B, a rotational speed calculating device 12B, a rotational speed comparing device 13B, and the motor control signal generating device 14B.

In the motor control circuit 10B, the rotational speed comparing device 13B compares a present rotational speed N1 calculated by the rotational speed calculating device 12B with a target rotational speed N2. Based on the comparison result, the motor control signal generating device 14B generates motor control signals so as to obtain a target rotational speed N2 by the combination of the DC control and the chopping control. However, during the period of chopping control, the comparison result of the present rotational speed N1 and the target rotational speed N2, or the detection result of the rotational speed of the DC motor M2 by the pulse interval measuring device 11B and the rotational speed calculating device 12B, is ignored and not reflected to the motor control signals applied to the motor driving circuit 5B.

Figure 17:
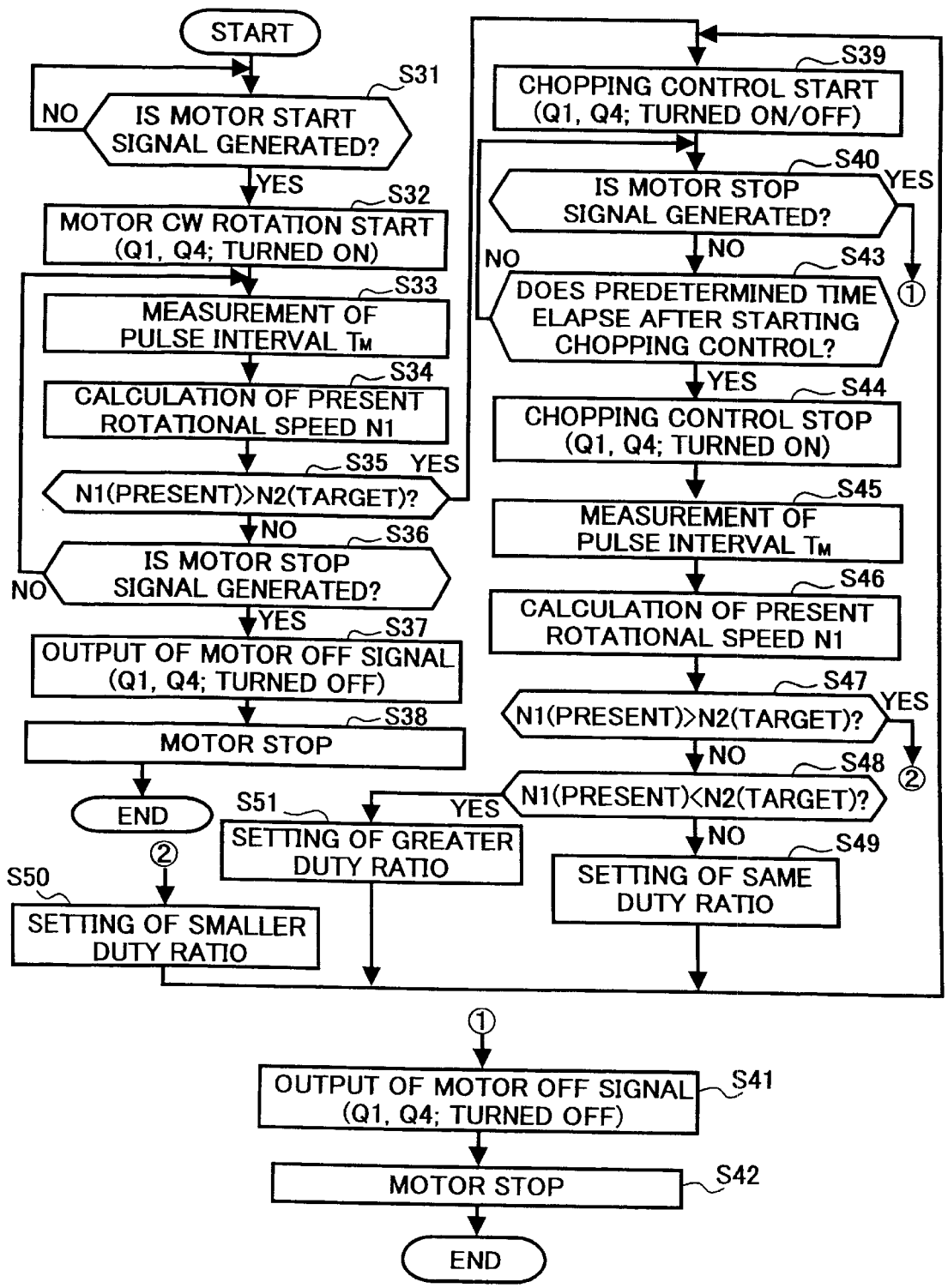
FIG. 17 is a flowchart illustrating main steps of the motor rotation control operation of the rotation control apparatus of FIG. 15.

Next, the operation of the rotation control apparatus of FIG. 15 is described referring to FIG. 17 and FIGS. 18A through 18D. FIG. 17 is a flowchart illustrating main steps of the operation of controlling the rotational speed of the DC motor M2. FIG. 18A is a diagram illustrating the waveform of an on/off control signal of the transistor Q1 when the DC control and the chopping control are performed, FIG. 18B is a diagram illustrating the waveform of an on/off control signal of the transistor Q4 when the DC control and the chopping control are performed, FIG. 18C is a diagram illustrating the waveform of a signal input to the differentiating circuit 2 (i.e., an output signal of the rotation detecting brush BD2) when the DC control and the chopping control are performed, and FIG. 18D is a diagram illustrating the waveform of rotation signal pulses output from the pulse generator 4 when the DC control and the chopping control are performed.

The brief flows of the operation of the rotation control apparatus of FIG. 15 are that the DC voltage is applied to the DC motor M2 through the motor driving circuit 5B in accordance with the motor control signals generated by the motor control signal generating device 14B, and thereby the DC motor M2 starts rotating. The rotational speed of the DC motor M2 is gradually increased in accordance with the time constant of the motor driving circuit 5B, and finally the rotational speed thereof becomes constant. In the motor control circuit 10B, a present rotational speed N1 is calculated from the rotation signal of the DC motor M2. When the present rotational speed N1 exceeds a predetermined target rotational speed N2, the DC control is switched to the chopping control for a certain period of time so as to decrease the rotational speed of the DC motor M2. In the chopping control, the turning-on and turning-off of the electricity supplying to the DC motor M2 are repeated, and intermittent feeding is performed so as to obtain the target rotational speed N2 of the DC motor M2.

Hereinafter, main steps of the operation of controlling the rotational speed of the DC motor (hereinafter simply referred to as a motor rotation control operation) are described referring to FIG. 17. In step S31, the motor control circuit 10B judges if a motor start signal is generated from an external device (not shown) or not. If the answer is YES in step S31, the motor control signal "H" is applied to the IN1, and the motor control signal "L" is applied to the IN2 from the motor control signal generating device 14B. Then, the transistors Q1 and Q4 of the motor driving circuit 5B are turned on, and a voltage substantially equal to the power supply voltage is applied to the electrode brushes B21 and B22 of the DC motor M2. Thereby, the DC motor M2 starts rotating in the clockwise direction in step S32. As a result, the rotation signal pulses are output from the pulse generator 4 corresponding to the rotations of the DC motor M2. If the answer is NO in step S31, the motor rotation control operation returns to reexecute step S31.

The rotation of the DC motor M2 is at a slow-speed upon starting of the DC motor. However, if the motor drive voltage continues to be applied to the DC motor M2, the rotation of the DC motor M2 is increased in accordance with the time constant of the motor driving circuit 5B, and then the rotational speed of the DC motor M2 becomes constant when the torque generated by the DC motor M2 and the load torque are balanced with each other.

Further, the pulse interval measuring device 11B measures the pulse interval $T_M$ based on the rotation signal pulses output from the pulse generator 4 in step S33. Based on the measurement result of the pulse interval $T_M$, the rotational speed calculating device 12B calculates a present rotational speed N1 of the DC motor M2 in step S34.

Then, the rotational speed comparing device 13B compares the present rotational speed N1 calculated by the rotational speed calculating device 12B with a target rotational speed N2, and judges if the present rotational speed N1 exceeds the target rotational speed N2 in step S35. If the answer is NO in step S35, the rotational speed of the DC motor M2 is maintained. Further, the motor control circuit 10B judges if a motor stop signal is generated from an external device (not shown) or not in step S36. If the answer is YES in step S36, the motor control signal generating device 14B outputs motor off signals, and the transistors Q1 and Q4 are turned off in step S37. Then, the DC motor M2 stops rotating in step S38. The reason why the motor control circuit 10B judges if the motor stop signal is generated from the external device in step S36 is that, if the rotational speed of the DC motor M2 does not reach the target rotational speed N2 forever for some reasons, the motor rotation control operation is put in an endless loop inevitably. If the answer is NO in step S36, the motor rotation control operation returns to reexecute step S33.

If the answer is YES in step S35, the motor control circuit 10B starts chopping control of continuing or discontinuing the supply of the drive current by performing the ON/OFF control of the drive current by turning on and off the transistors Q1 and Q4 of the motor driving circuit 5B at the same time in step S39.

With regard to the subsequent motor rotation control operation steps, the present rotational speed N1 of the DC motor M2 is calculated from the rotation signal of the DC motor M2. When the present rotational speed N1 exceeds the predetermined target rotational speed N2, the duty ratio is decreased so as to decrease the rotational speed of the DC motor M2. On the contrary, when the present rotational speed N1 is lower than the predetermined target rotational speed N2, the duty ratio is increased so as to increase the rotational speed of the DC motor M2. Thereby, the motor control circuit 10B controls the rotational speed of the DC motor M2 to reach the target rotational speed N2.

After the chopping control is started in step S39, the motor control circuit 10B judges if the motor stop signal is generated from the external device or not in step S40. If the answer is YES in step S40, the motor control signal generating device 14B outputs motor off signals, and the transistors Q1 and Q4 are turned off in step S41. Then, the DC motor M2 stops rotating in step S42. If the answer is NO in step S40, the motor control circuit 10B judges if a predetermined time elapses after starting the chopping control or not in step S43. If the answer is NO in step S43, the motor rotation control operation returns to reexecute step S40.

If the answer is YES in step S43, the motor control circuit 10B stops the chopping control in step S44. The motor control signal generating device 14B outputs the motor control signals IN1 "H" and IN2 "L", and thereby the transistors Q1 and Q4 of the motor driving circuit 5B are turned on. As a result, the DC motor M2 is controlled by the DC control from the chopping control.

Further, the pulse interval measuring device 11B measures the pulse interval $T_M$ based on the rotation signal pulses output from the pulse generator 4 in step S45. Based on the measurement result of the pulse interval $T_M$, the rotational speed calculating device 12B calculates the present rotational speed N1 of the DC motor M2 in step S46. Then, the rotational speed comparing device 13B compares the present rotational speed N1 calculated by the rotational speed calculating device 12B with the target rotational speed N2, and judges if the present rotational speed N1 exceeds the target rotational speed N2 in step S47. The target rotational speed N2 may not be a specified rotational speed value but may fall within a specified rotational speed range.

If the answer is NO in step S47, the rotational speed comparing device 13B judges if the present rotational speed N1 is lower than the target rotational speed N2 or not in step S48. If the answer is NO in step S48, because the present rotational speed N1 equals the target rotational speed N2, the motor control circuit 10B sets the duty ratio that is set last time in step S49. After step S49, the motor rotation control operation returns to reexecute step S39 at the same duty ratio set in step S49.

If the answer is YES in step S47, the motor control circuit 10B sets a smaller duty ratio of the chopping control than that of the last time in step S50. After step S50, the motor rotation control operation returns to reexecute step S39 at the smaller duty ratio set in step S50. If the answer is YES in step S48, the motor control circuit 10B sets a greater duty ratio of the chopping control than that of the last time in step S51. After step S51, the motor rotation control operation returns to reexecute step S39 at the greater duty ratio set in step S51.

In the above-described motor rotation control operation, when the predetermined time does not elapse after setting the duty ratio and starting chopping control, the chopping control is not stopped. Because, it is considered that even though the duty ratio is set and the chopping control is started, the rotational speed of the DC motor M2 does not immediately vary, and the response of the DC motor M2 is delayed.

In the chopping control of the rotation control apparatus of FIG. 15 according to the fourth embodiment of the present invention, the ON state of both transistors Q1 and Q4 of the motor driving circuit 5B and the OFF state of both transistors Q1 and Q4 are alternately repeated.

In the output signal from the rotation detecting brush BD2 during the chopping control period, as illustrated in FIG. 18C, the electric potential becomes unstable during the period when the both transistors Q1 and Q4 are turned off (i.e., the area indicated by dotted lines in the waveform of the input signal to the differentiating circuit 2 in FIG. 18C). This is because when both transistors Q1 and Q4 are turned off, the rotation detecting brush BD2 is completely separated from the motor driving circuit 5B. As a result, the output signal from the pulse generator 4 inevitably turns out to be unstable. For example, the pulse width may change, the pulse may appear even in the area where there exists no rotation signal of the DC motor M2, the signal may disappear, a false signal may appear, etc.

Therefore, the motor control circuit 10B does not detect the rotational speed of the DC motor M2 during the period of chopping control, but detects the rotational speed of the DC motor M2 after the chopping control is changed to the DC control. By repeating the above-described chopping control and DC control, the rotational speed of the DC motor M2 is controlled to reach the target rotational speed.

The predetermined time period from stopping the chopping control after starting the chopping control till detecting the rotational speed of the DC motor M2 under the DC control is determined in consideration of the response speed of the DC motor M2 under the chopping control. Moreover, the other time period of detecting the rotational speed of the DC motor M2 under the DC control is short, for example, the time period of counting at least two rotation signal pulses output from the pulse generator 4.

Next, a rotation control apparatus that controls the rotational operation of the DC motor M2 according to a fifth embodiment of the present invention is described. The rotation control apparatus according to the fifth embodiment of the present invention has the same construction as that of the rotation control apparatus of FIG. 15 but performs different motor rotation control operations.

The brief flows of the operation of the rotation control apparatus according to the fifth embodiment of the present invention are that the motor control circuit 10B stops the chopping control and calculates a present rotational speed N1 of the DC motor M2 based on the rotation signal of the DC motor M2. When the present rotational speed N1 is lower than a predetermined target speed N2, the duty ratio is increased so as to increase the rotational speed of the DC motor M2, and the chopping control is performed during a predetermined time period $T_{CHP}$ from that time point. On the other hand, when the present rotational speed N1 is higher than the target speed N2, the duty ratio is decreased so as to decrease the rotational speed of the DC motor M2, and the chopping control is performed during the predetermined time period $T_{CHP}$ from that time point. Thereby, the rotational speed of the DC motor M2 is controlled to reach the target rotational speed.

The above-described time period $T_{CHP}$ signifies the time obtained from the pulse interval $T_M$ measured by the pulse interval measuring device 11B; for example, $T_{CHP}$=0.7 $T_M$. During the time period $T_{CHP}$, the detection of the rotation signal pulse is not performed. The detection of the rotation signal pulse is started in the DC control state of turning on both of the transistors Q1 and Q4 after the time period $T_{CHP}$ elapses. Until detecting the leading edge of the rotation signal pulse, both of the transistors Q1 and Q4 keep the ON state.

From the time point when the leading edge of the rotation signal pulse immediately before starting the chopping control is detected, the counting of the clock (signals) is started. In the state of performing the next DC control after the chopping control, the leading edge of the pulse is detected and the pulse interval $T_M$ is calculated. The chopping control is performed again by the predetermined time period $T_{CHP}$ (=0.7 $T_M$). At this time, the duty ratio is changed if necessary. Thereafter, such steps as mentioned above are repeated.

Hereinafter, main steps of the operation of controlling the rotational speed of the DC motor (hereinafter simply referred to as a motor rotation control operation) are described referring to FIGS. 19A and 19B and FIGS. 20A through 20D.

FIG. 20A is a diagram illustrating the waveform of an on/off control signal of the transistor Q1 when the DC control and the chopping control are repeatedly performed, FIG. 20B is a diagram illustrating the waveform of an on/off control signal of the transistor Q4 when the DC control and the chopping control are repeatedly performed, FIG. 20C is a diagram illustrating the waveform of a signal input to the differentiating circuit 2 (i.e., an output signal of the rotation detecting brush BD2) when the DC control and the chopping control are repeatedly performed, and FIG. 20D is a diagram illustrating the waveform of rotation signal pulses output from the pulse generator 4 when the DC control and the chopping control are repeatedly performed.

In the respective waveforms of on/off control signals of the transistors Q1 and Q4 illustrated in FIGS. 20A and 20B, respectively, the frequency of the chopping control is made sufficiently high. Further, in the same waveforms, the DC control period of stopping the chopping control is illustrated in the state of the pulse.

In the waveforms of FIGS. 20C and 20D, the area where the chopping control is performed is indicated by dotted lines. The above-described area corresponds to the time period $T_{CHP}$. When the DC motor M2 rotates, the rotation signal pulses are output from the pulse generator 4 corresponding to the rotations of the DC motor M2. Because the false pulses appear in the area of the waveform indicated by dotted lines (i.e., the time period $T_{CHP}$) the motor control circuit 10B does not detect the rotation signal pulses in that area.

Figure 19A:
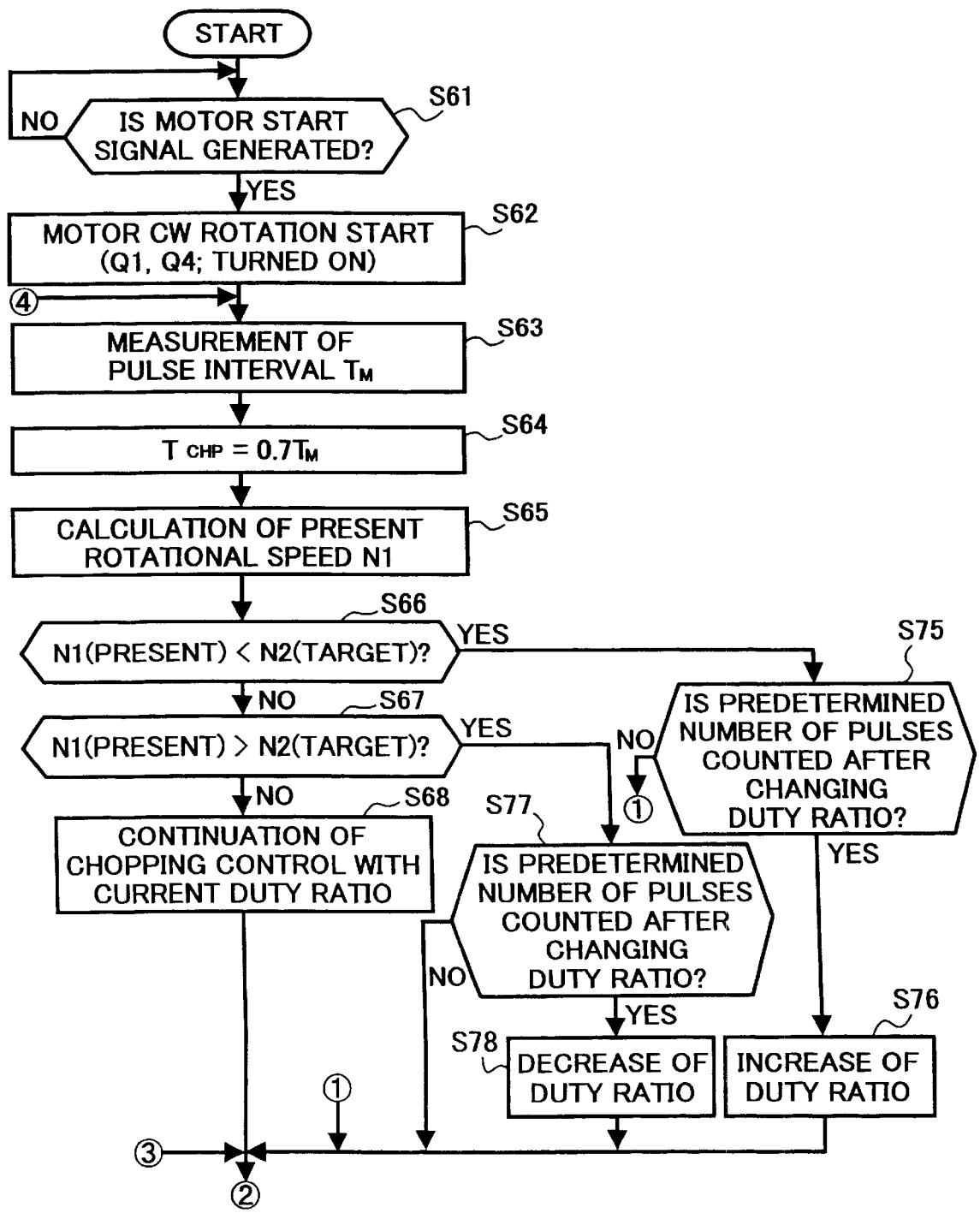
FIGS. 19A and 19B are a flowchart illustrating main steps of another motor rotation control operation of the rotation control apparatus of FIG. 15.
Figure 19B:
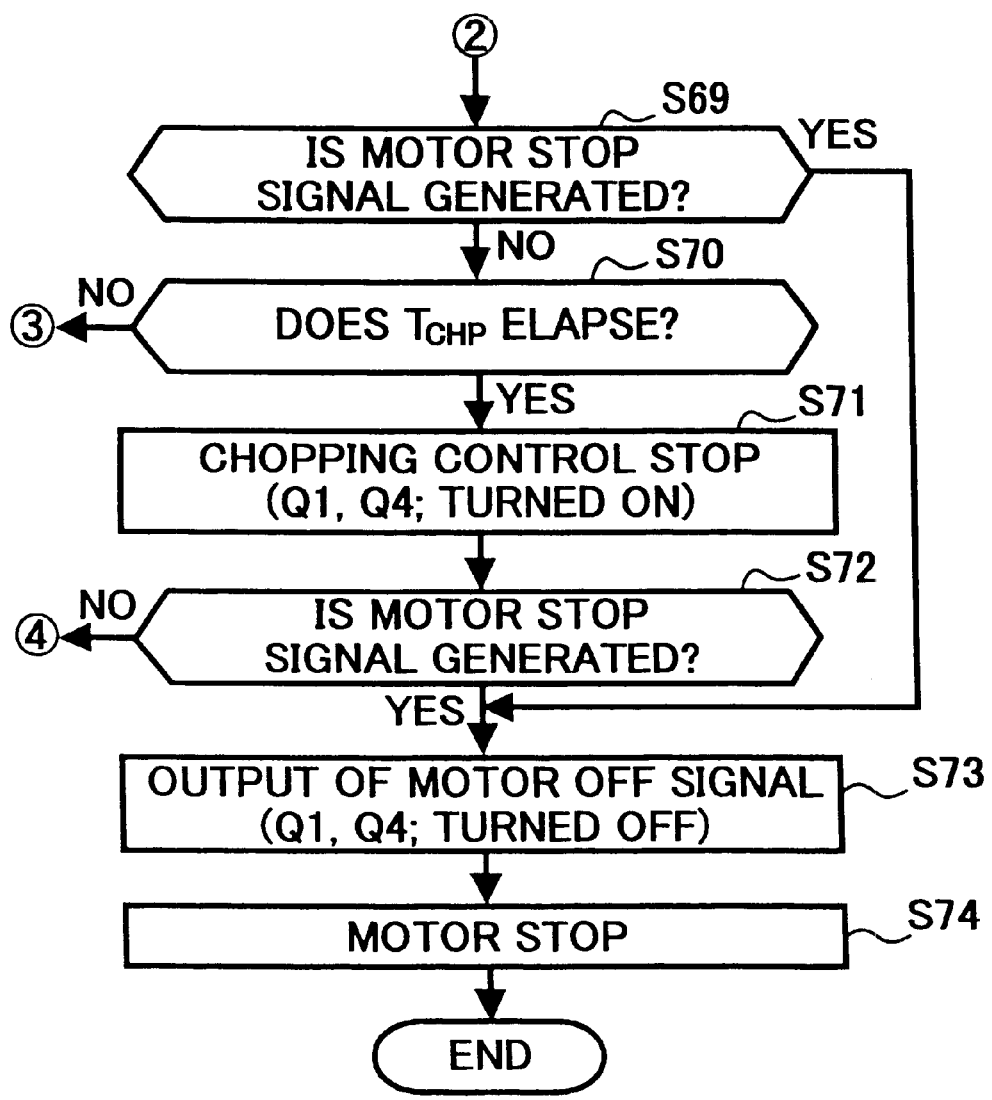

Referring to a flowchart of FIGS. 19A and 19B, in step S61, the motor control circuit 10B judges if a motor start signal is generated from an external device (not shown) or not. If the answer is YES in step S61, the motor control signal "H" is applied to the IN1, and the motor control signal "L" is applied to the IN2 from the motor control signal generating device 14B. Then, the transistors Q1 and Q4 of the motor driving circuit 5B are turned on, and a voltage substantially equal to the power supply voltage is applied to the electrode brushes B21 and B22 of the DC motor M2. Thereby, the DC motor M2 starts rotating in the clockwise direction in step S62. As a result, the rotation signal pulses are output from the pulse generator 4 corresponding to the rotations of the DC motor M2. If the answer is NO in step S61, the motor rotation control operation returns to reexecute step S61.

Further, the pulse interval measuring device 11B measures the pulse interval $T_M$ based on the rotation signal pulses output from the pulse generator 4 in step S63. Based on the measurement result of the pulse interval $T_M$, the pulse interval measuring device 11B further calculates a predetermined time $T_{CHP}$ (=0.7 $T_M$) in step S64. Then, the rotational speed calculating device 12B calculates a present rotational speed N1 of the DC motor M2 based on the measurement result of the pulse interval $T_M$ in step S65.

Further, the rotational speed comparing device 13B compares the present rotational speed N1 calculated by the rotational speed calculating device 12B with a target rotational speed N2, and judges if the present rotational speed N1 is smaller than the target rotational speed N2 in step S66. The target rotational speed N2 may not be a specified rotational speed value but may fall within a specified rotational speed range.

If the answer is NO in step S66, the rotational speed comparing device 13B judges if the present rotational speed N1 exceeds the target rotational speed N2 in step S67. If the answer is NO in step S67, because the present rotational speed N1 equals the target rotational speed N2, the motor control circuit 10B continues the chopping control with the current duty ratio in step S68.

Then, the motor control circuit 10B judges if a motor stop signal is generated from an external device (not shown) in step S69. If the answer is NO in step S69, the motor control circuit 10B judges if the predetermined time $T_{CHP}$ elapses or not in step S70. If the answer is NO in step S70, the motor rotation control operation returns to reexecute step S69. If the answer is YES in step S70, the motor control circuit 10B stops the chopping control, and both transistors Q1 and Q4 of the motor driving circuit 5B are turned on in step S71. Further, the motor control circuit 10B judges if the motor stop signal is generated from the external device (not shown) in step S72. If the answer is NO in step S72, the motor rotation control operation returns to reexecute step S63. If the answer is YES in both steps S69 and S72, the motor control signal generating device 14B outputs motor off signals, and the transistors Q1 and Q4 are turned off in step S73. Then, the DC motor M2 stops rotating in step S74.

If the answer is YES in step S66, the motor control circuit 10B judges if a predetermined number of rotation signal pulses is counted after changing the immediately-before duty ratio in step S75. If the answer is YES in step S75 or if the duty ratio is not changed before at all, the motor control circuit 10B increases the duty ratio of the chopping control in step S76. Further, the motor rotation control operation proceeds to step S69. If the answer is NO in step S75, the motor rotation control operation proceeds to step S69 without changing the duty ratio of the chopping control.

If the answer is YES in step S67, the motor control circuit 10B judges if a predetermined number of rotation signal pulses is counted after changing the immediately-before duty ratio in step S77. If the answer is YES in step S77 or if the duty ratio is not changed before at all, the motor control circuit 10B decreases the duty ratio of the chopping control in step S78. Further, the motor rotation control operation proceeds to step S69. If the answer is NO in step S77, the motor rotation control operation proceeds to step S69 without changing the duty ratio of the chopping control.

In the above-described motor rotation control operation, the duty ratio is not changed until the predetermined number of rotation signal pulses is counted after changing the immediately-before duty ratio. Because, it is considered that even though the duty ratio is changed, the rotational speed of the DC motor M2 does not follow immediately, and the response of the DC motor M2 is delayed.

In the above-described rotation control apparatuses according to the fourth and fifth embodiments of the present invention, even if the motor control circuit 10B that makes the rotation detecting brush BD2 substantially separate from the motor driving circuit 5B at the time of performing the chopping control is employed, the rotational speed of the DC motor M2 can be controlled to reach the target rotational speed.

Next, a rotation control apparatus that controls the rotational operation and a cumulative rotation number of the DC motor M2 according to a sixth embodiment of the present invention is described. The rotation control apparatus of FIG. 21 has a construction similar to the rotation control apparatus of FIG. 11 employing a motor control circuit 10C instead of the motor control circuit 10A.

The motor control circuit 10C includes a microcomputer (not shown), a pulse number counting device 11C, a cumulative rotation number calculating device 12C, a remaining rotation number calculating device 13C, and a motor control signal generating device 14C.

The pulse number counting device 11C counts the number of the rotation signal pulses output from the pulse generator 4, and inputs the number of pulses to the cumulative rotation number calculating device 12C. The cumulative rotation number calculating device 12C calculates the cumulative rotation number of the DC motor M2 from the rotation start of the DC motor M2, and inputs the cumulative rotation number to the remaining rotation number calculating device 13C. Then, the remaining rotation number calculating device 13C calculates the remaining rotation number to a target cumulative rotation number of the DC motor M2 corresponding to the motor stop. When the remaining rotation number becomes zero, the remaining rotation number calculating device 13C causes the motor control signal generating device 14C to generate a motor off signal.

Figure 21:
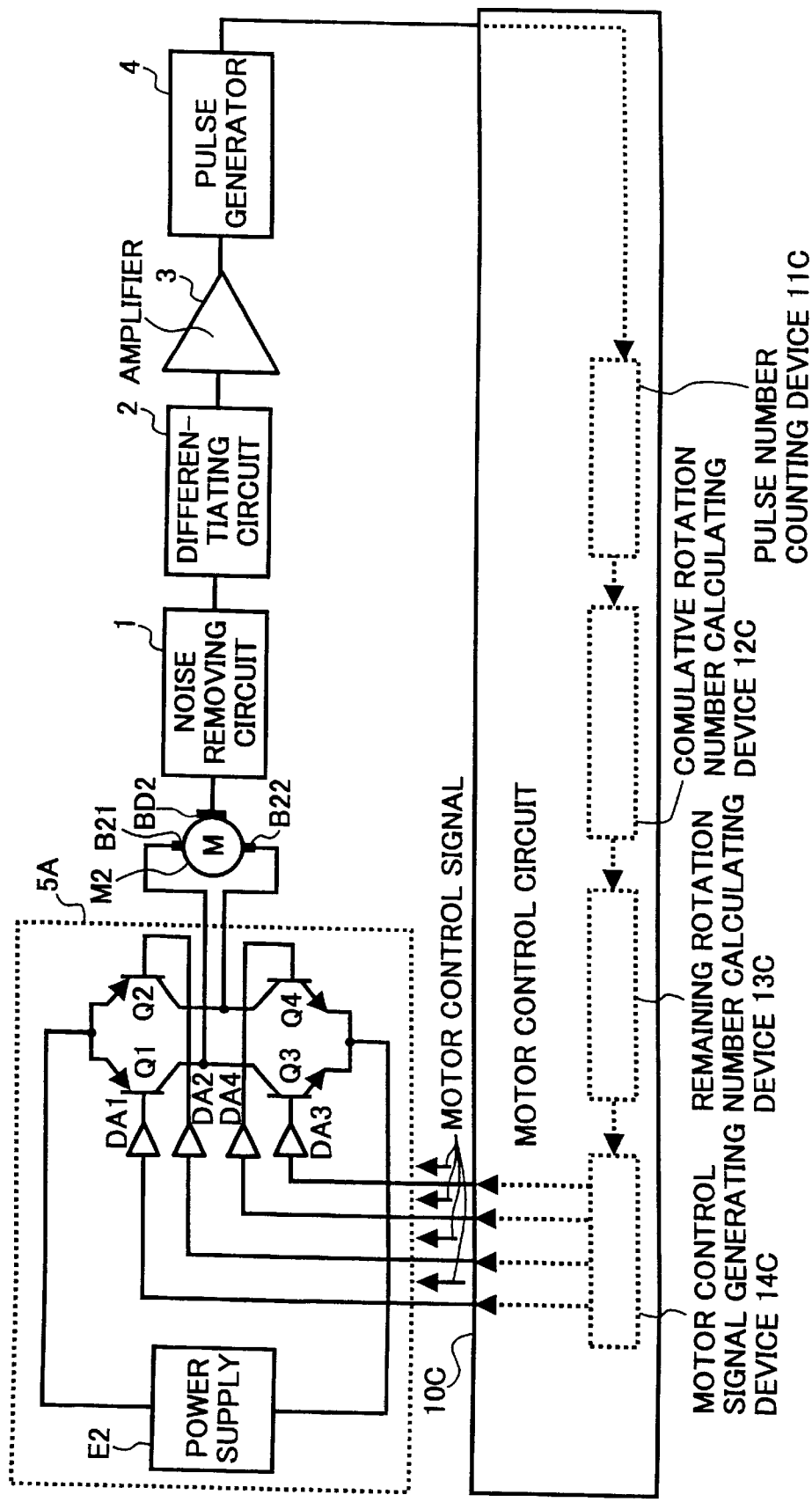
FIG. 21 is a circuit diagram illustrating a configuration of a rotation control apparatus according to a sixth embodiment of the present invention.

The brief flows of the operation of the rotation control apparatus of FIG. 21 are that the rotation number of the DC motor M2 is counted from the rotation start thereof, and when the cumulative rotation number reaches a predetermined rotation number, the rotation of the DC motor M2 is stopped.

Specifically, the DC motor M2 is driven to rotate by performing the DC control first. When the cumulative rotation number of the DC motor M2 from the rotation start thereof reaches a predetermined rotation number (R1), the DC motor M2 is switched to be driven by performing the chopping control. When the cumulative rotation number of the DC motor M2 from the switch to the chopping control reaches a predetermined rotation number (R2), the DC motor M2 is stopped. That is, when the cumulative rotation number of the DC motor M2 from the rotation start thereof reaches a predetermined rotation number (R1+R2), the DC motor M2 is stopped.

In the rotation control apparatus of FIG. 21, the rotation of the DC motor M2 is controlled to be fast by performing the DC control in the period corresponding to the rotation number R1, and the rotation of the DC motor M2 is controlled to be relatively slow by performing the chopping control before the rotation of the DC motor M2 is stopped (i.e., in the period corresponding to the rotation number R2).

Figure 22:
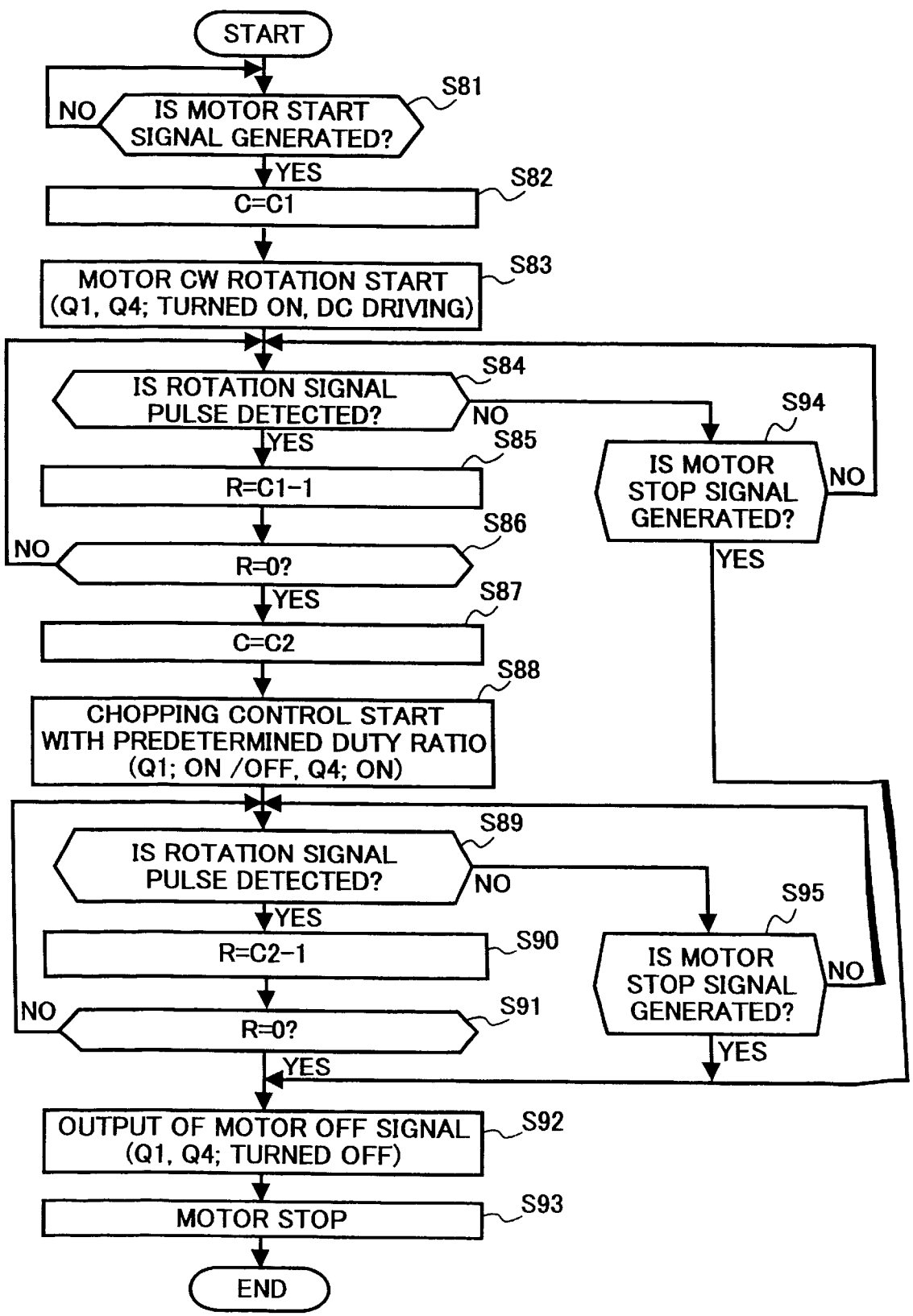
FIG. 22 is a flowchart illustrating main steps of the motor rotation control operation of the rotation control apparatus of FIG. 21.

Next, the operation of the rotation control apparatus of FIG. 21 is described referring to FIG. 22 and FIGS. 23A through 23D. FIG. 22 is a flowchart illustrating main steps of the operation of controlling the rotational speed and cumulative rotation number of the DC motor M2 (hereinafter simply referred to as a motor rotation control operation). FIG. 23A is a diagram illustrating the waveform of an on/off control signal of the transistor Q1 when the DC control and the chopping control are performed, FIG. 23B is a diagram illustrating the waveform of an on/off control signal of the transistor Q4 when the DC control and the chopping control are performed, FIG. 23C is a diagram illustrating the waveform of a signal input to the pulse generator 4 (i.e., an output signal of the rotation detecting brush BD2) when the DC control and the chopping control are performed, and FIG. 23D is a diagram illustrating the waveform of rotation signal pulses output from the pulse generator 4 when the DC control and the chopping control are performed.

In the flowchart of FIG. 22, for the sake of clarity, a cumulative pulse number and a remaining pulse number are used instead of the above-described cumulative rotation number and the remaining rotation number, respectively. In step S81, the motor control circuit 10C judges if a motor start signal is generated from an external device (not shown) or not. If the answer is YES in step S81, a first target cumulative pulse number "C" is set as a remaining pulse number C1 in the remaining rotation number calculating device 13C in step S82. If the answer is NO in step S81, the motor rotation control operation returns to reexecute step S81. Then, the transistors Q1 and Q4 of the motor driving circuit SA are turned on, and thereby the DC motor M2 is driven to rotate in the clockwise direction by performing the DC control in step S83.

Next, the motor control circuit 10C judges if the rotation signal pulse output from the pulse generator 4 is detected or not in step S84. If the answer is YES in step S84, the by subtracting one from the remaining pulse number C1 in step S85. Further, the motor control circuit 10C judges if the remaining pulse number "R" is zero or not in step S86. If the answer is NO in step S86, the motor rotation control operation returns to reexecute step S84. If the answer is YES in step S86, a second target cumulative pulse number "C" is set as a remaining pulse number C2 in the remaining rotation number calculating device 13C in step S87.

Then, the motor control signal is generated from the motor control signal generating device 14C such that the transistor Q1 is turned on/off and the transistor Q4 is turned on. Thereby, the DC motor M2 is driven by performing the chopping control with a predetermined duty ratio in step S88.

After starting the chopping control in step S88, the motor control circuit 10C judges if the rotation signal pulse output from the pulse generator 4 is detected or not in step S89. If the answer is YES in step S89, the remaining rotation number calculating device 13C calculates a remaining pulse number "R" by subtracting one from the remaining pulse number C2 in step S90. Further, the motor control circuit 10C judges if the remaining pulse number "R" is zero or not in step S91. If the answer is NO in step S91, the motor rotation control operation returns to reexecute step S89. If the answer is YES in step S91, the motor control signal generating device 14C outputs motor off signals, and the transistors Q1 and Q4 are turned off in step S92. Thereby, the DC motor M2 stops rotating in step S93.

If the answer is NO in step S84, the motor control circuit 10C judges if a motor stop signal is generated from an external device (not shown) or not in step S94. If the answer is YES in step S94, the motor rotation control operation proceeds to step S92. If the answer is NO in step S94, the motor rotation control operation returns to reexecute step S84.

If the answer is NO in step S89, the motor control circuit 10C judges if the motor stop signal is generated from the external device (not shown) or not in step S95. If the answer is YES in step S95, the motor rotation control operation proceeds to step S92. If the answer is NO in step S95, the motor rotation control operation returns to reexecute step S89.

In the rotation control apparatus according to the sixth embodiment, owing to the above-described rotation control operations, the DC motor M2 can reach the target rotation number at high speed by the DC control, and then the DC motor M2 can smoothly stop at the target position by the chopping control. As a result, the stopping position accuracy of the DC motor M2 can be improved.

There are several methods of detecting the rotation signal pulse such as, for example, detection of the leading edge, detection of the trailing edge, and detection of both the leading edge and the trailing edge. In the rotation control apparatus according to the sixth embodiment, the leading edge of the rotation signal pulse is detected as illustrated in FIG. 23D, although the trailing edge could instead or additionally be detected.

In the above-described rotation control apparatus according to the sixth embodiment of the present invention, the rotation number of the DC motor M2 is counted from the rotation start thereof. Alternatively, the rotation number of the DC motor M2 may start to be counted with reference to the signal generated by an external device (not shown) after the rotation start of the DC motor M2.

Although the rotation control apparatus according to the sixth embodiment of the present invention employ the same motor driving circuit 5A as the rotation control apparatus of FIG. 11, the motor driving circuit 5B that is employed in the rotation control apparatus of FIG. 15 can be used instead of the motor driving circuit 5A.

Figure 24:
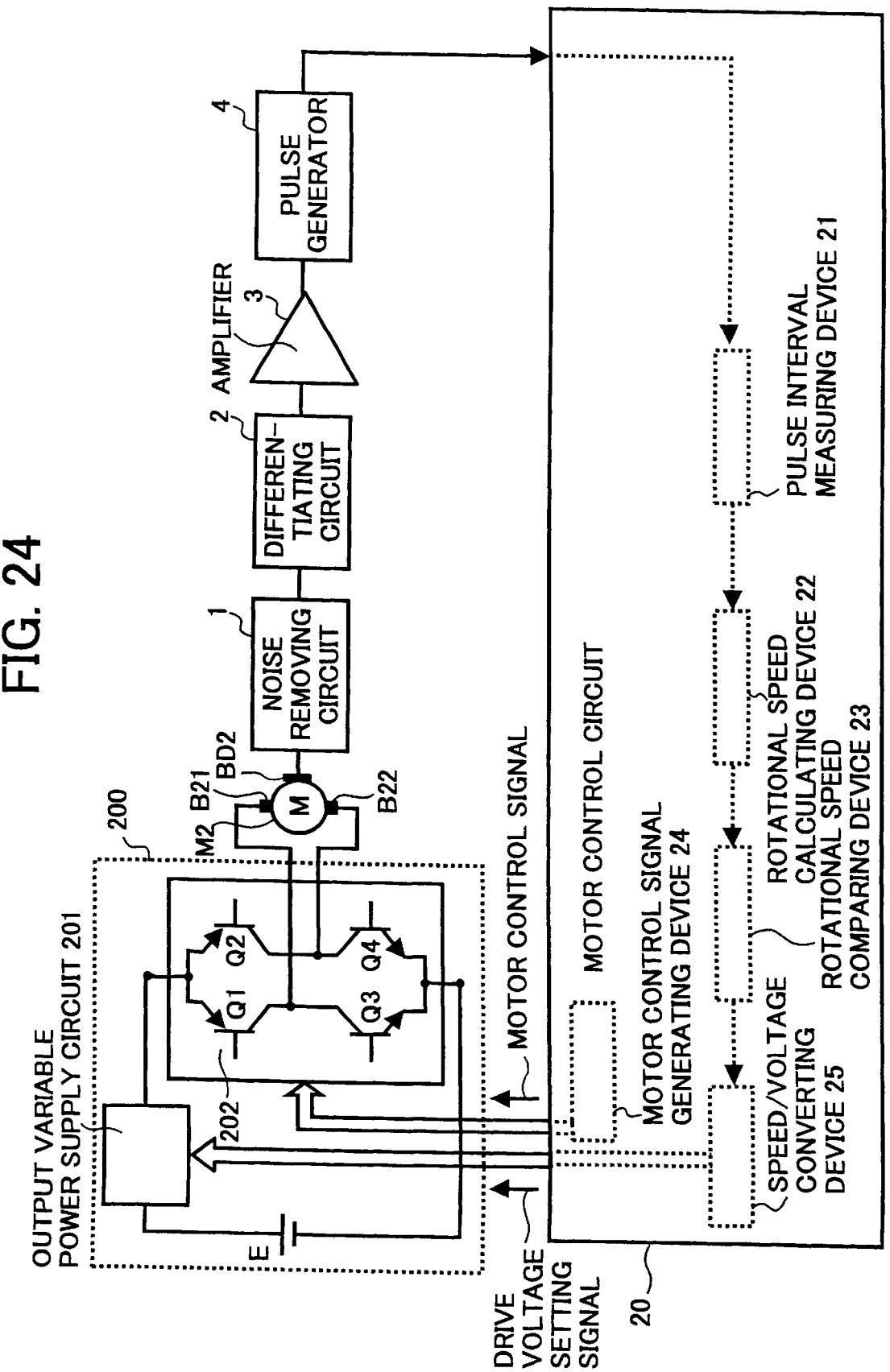
FIG. 24 is a circuit diagram illustrating a configuration of a rotation control apparatus according to a seventh embodiment of the present invention.

FIG. 24 illustrates a construction of a DC motor rotation control apparatus that controls the rotational operation of the DC motor according to a seventh embodiment of the present invention. In the DC motor rotation control apparatus of FIG. 9, the output voltage of the drive power supply E2 is constant, and the rotation of the DC motor M2 is controlled by the switching control of the motor driving circuit 5. On the other hand, an output voltage of a drive power supply circuit of FIG. 24 corresponding to the drive power supply E2 of FIG. 9 is variable.

The DC motor rotation control apparatus illustrated in FIG. 24 includes a motor driving circuit 200, the DC motor M2, the noise removing circuit 1, the differentiating circuit 2, the amplifier 3, the pulse generator 4, and a motor control circuit 20. The motor driving circuit 200 includes a DC power supply E, an output variable power supply circuit 201, and a switching section 202. In the motor driving circuit 200, the output voltage from the DC power supply E is applied to the switching section 202 under the control of the output variable power supply circuit 201.

The motor control circuit 20 applies a motor control signal to the switching section 202 of the motor driving circuit 200 and applies a drive voltage setting signal corresponding to a required rotational speed of the DC motor M2 to the output variable power supply circuit 201 based on the output signal of the pulse generator 4.

The output variable power supply circuit 201 controls a voltage to be applied to the switching section 202 of the motor driving circuit 200 in accordance with the drive voltage setting signal so as to rotate the DC motor M2 at a required rotational speed. The switching section 202 of the motor driving circuit 200 includes the same bridge circuit composed of four transistors Q1, Q2, Q3, and Q4 as that of the motor driving circuit 5 of FIG. 9. The DC motor M2 includes the rotation detecting brush BD2 in addition to the pair of electrode brushes B21 and B22.

The motor control circuit 20 includes a microcomputer (not shown), a pulse interval measuring device 21, a rotational speed calculating device 22, a rotational speed comparing device 23, a motor control signal generating device 24, and a speed/voltage converting device 25.

As described earlier, the pulse interval measuring device 21 measures a pulse interval $T_M$ of output pulses of the pulse generator 4, and supplies the pulse interval $T_M$ to the rotational speed calculating device 22.

The rotational speed calculating device 22 calculates the rotational speed of the rotor, i.e., the DC motor M2 based on the pulse interval $T_M$ obtained by the pulse interval measuring device 21.

The rotational speed comparing device 23 compares a present rotational speed N1 calculated by the rotational speed calculating device 22 with a target speed N2. The comparison result by the rotational speed comparing device 23 is input to the speed/voltage converting device 25. Based on the comparison result of the present rotational speed N1 and the target speed N2, the speed/voltage converting device 25 obtains a drive voltage which enables the present rotational speed N1 of the DC motor M2 to reach the target speed N2, and applies the drive voltage setting signal to the output variable power supply circuit 201.

Figure 25:
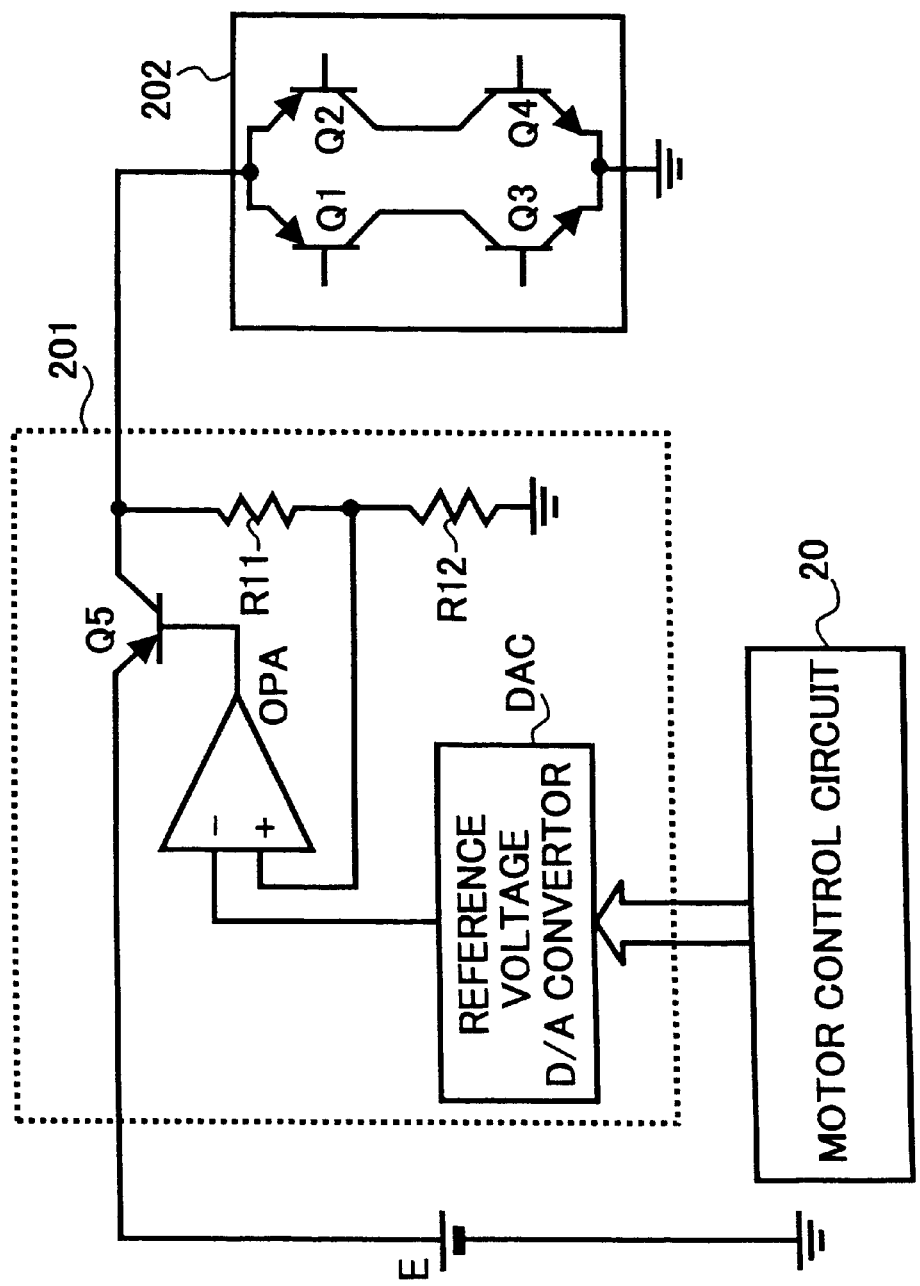
FIG. 25 is a circuit diagram illustrating an output variable power supply circuit of the rotation control apparatus of FIG. 24.

As illustrated in detail in FIG. 25, the output variable power supply circuit 201 includes an operational amplifier OPA, a pnp transistor Q5, a D/A (digital/analog) converter DAC, and resistors R11 and R12, which construct a so-called series regulator. The D/A converter DAC generates a reference voltage to be applied to an inversion input terminal of the operational amplifier OPA in accordance with the drive voltage setting signal applied from the speed/voltage converting device 25 of the motor control circuit 20.

In the transistor Q5, a DC voltage is applied to an emitter of the transistor Q5 from the DC power supply E, and an output voltage of the operational amplifier OPA is applied to a base of the transistor Q5. Further, an output voltage of a collector of the transistor Q5 is applied to the switching section 202 of the motor driving circuit 200. The output voltage of the collector is divided by the resistors R11 and R12 connected in series between the collector and the common low-voltage side. The voltage at the connection point of the resistors R11 and R12 is fed back to a non-inversion input terminal of the operational amplifier OPA.

Figure 26:
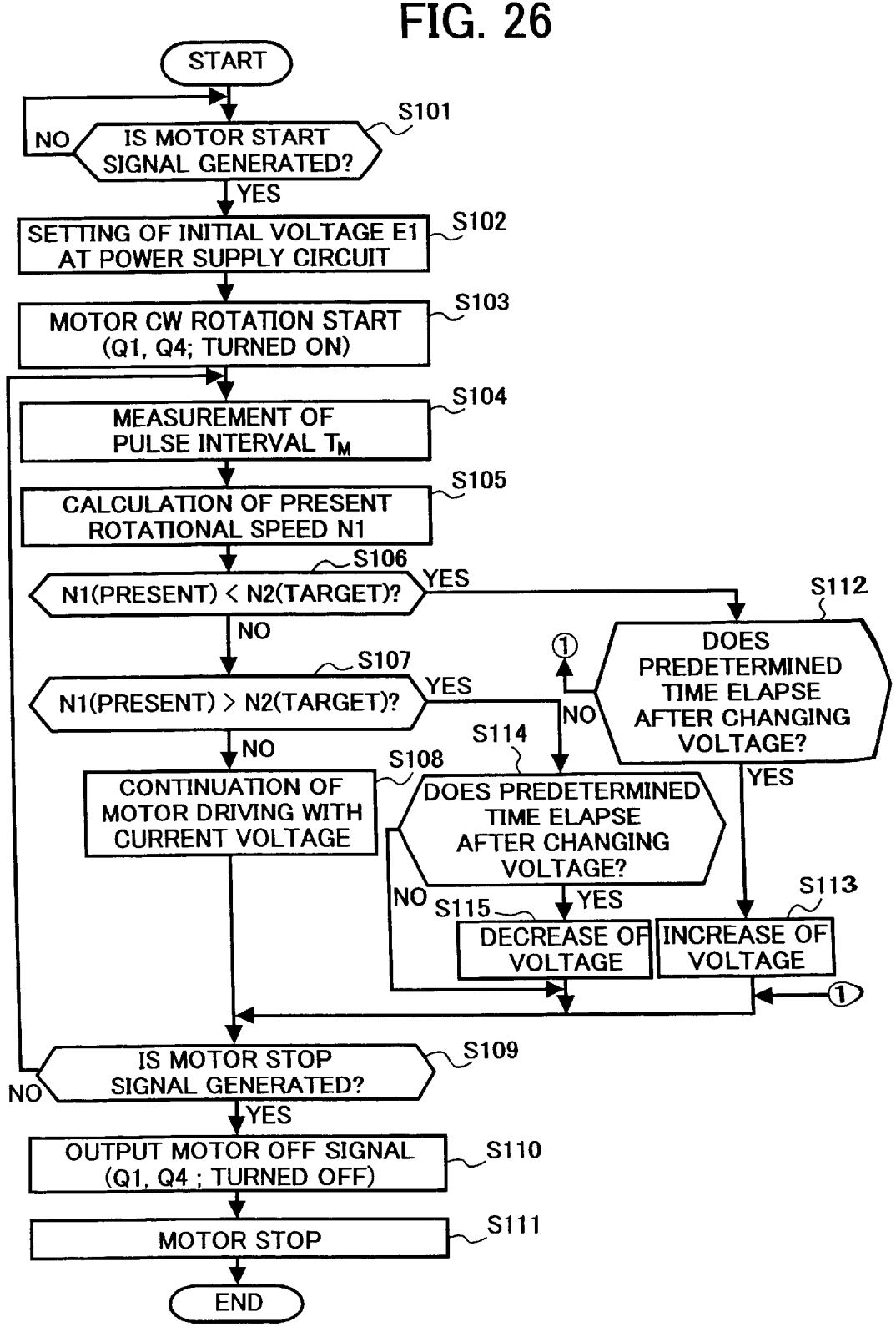
FIG. 26 is a flowchart illustrating main steps of the motor rotation control operation of the rotation control apparatus of FIG. 24.
Figure 27:
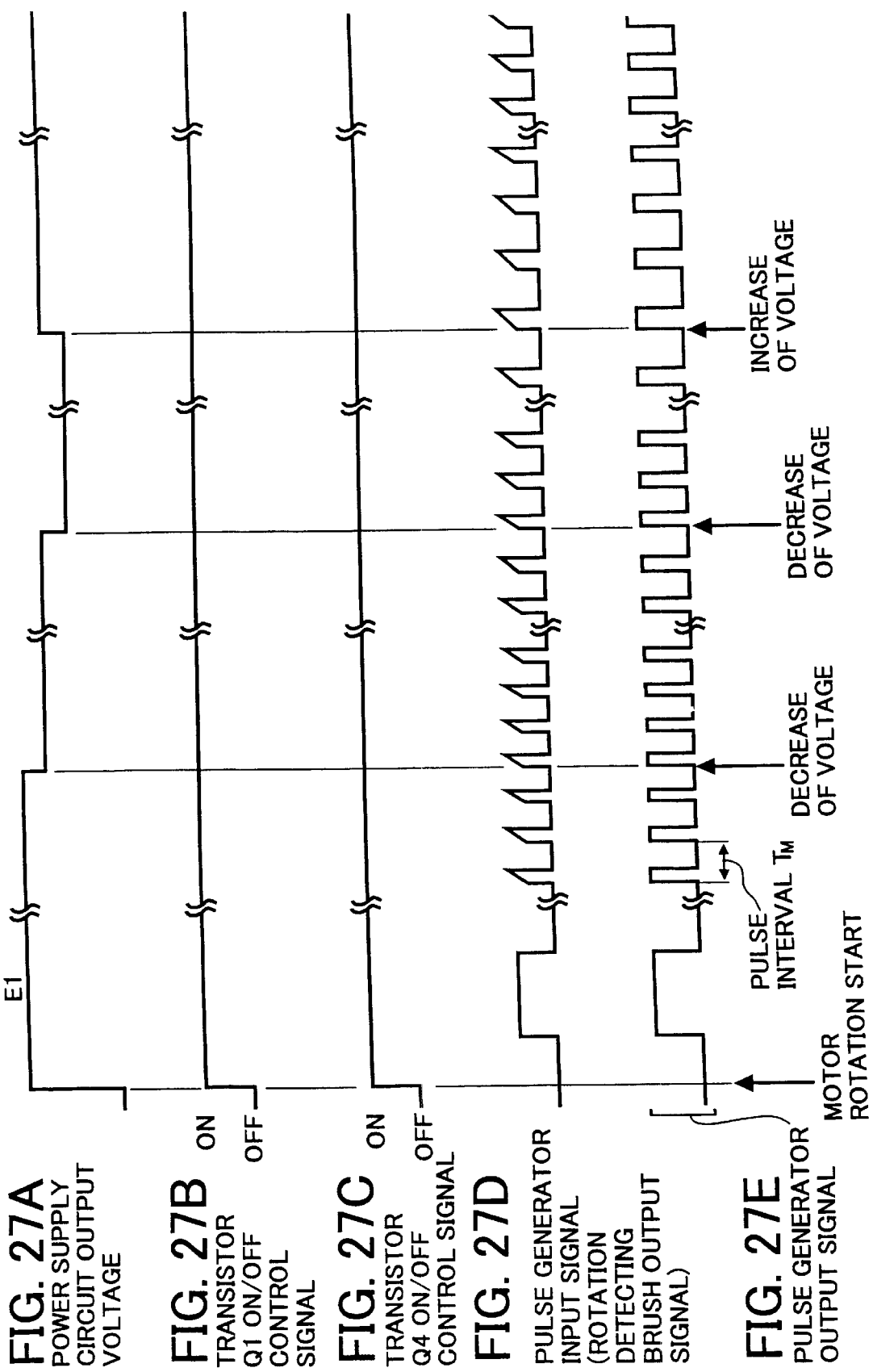
FIG. 27A is a diagram illustrating the waveform of an output voltage of the power supply circuit.
FIG. 27B is a diagram illustrating the waveform of an on/off control signal of the transistor Q1.
FIG. 27C is a diagram illustrating the waveform of an on/off control signal of the transistor Q4.
FIG. 27D is a diagram illustrating the waveform of a signal input to the pulse generator.
FIG. 27E is a diagram illustrating the waveform of an output signal from the pulse generator.

Next, an operation of the DC motor rotation control apparatus of FIG. 24 is described referring to FIG. 26 and FIGS. 27A through 27E. FIG. 26 is a flowchart illustrating main steps of the operation of controlling the rotational speed of the DC motor M2. FIG. 27A is a diagram illustrating the waveform of an output voltage of the power supply circuit 201. FIG. 27B is a diagram illustrating the waveform of an on/off control signal of the transistor Q1. FIG. 27C is a diagram illustrating the waveform of an on/off control signal of the transistor Q4. FIG. 27D is a diagram illustrating the waveform of a signal input to the pulse generator 4 (i.e., an output signal of the rotation detecting brush BD2). FIG. 27E is a diagram illustrating the waveform of an output signal from the pulse generator 4.

Respective signals illustrated in FIGS. 27A through 27E are generated in the state that the DC motor M2 is rotated by performing a DC control. When the DC motor M2 is rotated, rotation signal pulses of the DC motor M2 are output from the pulse generator 4 corresponding to the rotation of the DC motor M2.

Hereinafter, main steps of the operation of controlling the rotational speed of the DC motor (hereinafter simply referred to as a motor rotation control operation) are described referring to FIG. 26.

In step S101, the motor control circuit 20 judges if a motor start signal is generated from an external device (not shown) or not. If the answer is YES in step S101, a predetermined initial drive power supply voltage E1 is set at the output variable power supply circuit 201 in accordance with the drive voltage setting signal applied from the speed-voltage converting device 25 in step S102. If the answer is NO in step S101, the motor rotation control operation returns to reexecute step S101.

Substantially simultaneously, the transistors Q1 and Q4 of the switching section 202 of the motor driving circuit 200 are turned on in accordance with the motor control signal generated from the motor control signal generating device 24, and a voltage substantially equal to the power supply voltage E1 is applied to the electrode brushes B21 and B22 of the DC motor M2. Thereby, the DC motor M2 starts rotating in the clockwise direction in step S103.

As a result, rotation signal pulses of the rotation detecting brush BD2 of the DC motor M2 are output from the pulse generator 4 corresponding to the rotation of the DC motor M2.

Further, the pulse interval measuring device 21 measures the pulse interval $T_M$ based on the rotation signal pulses output from the pulse generator 4 in step S104. Based on the measurement result of the pulse interval $T_M$, the rotational speed calculating device 22 calculates a present rotational speed N1 of the DC motor M2 in step S105.

Then, the rotational speed comparing device 23 compares the present rotational speed N1 calculated by the rotational speed calculating device 22 with a target rotational speed N2, and judges if the present rotational speed N1 is lower than the target rotational speed N2 in step S106.

The rotation of the DC motor M2 is slow-speed upon starting of the DC motor. However, if the motor drive voltage continues to be applied to the DC motor M2, the rotation of the DC motor M2 is increased in accordance with the time constant of the motor driving circuit 200, and then the rotational speed of the DC motor M2 becomes constant when the torque generated by the DC motor M2 and the load torque are balanced with each other.

If the answer is NO in step S106, the rotational speed comparing device 23 judges if the present rotational speed N1 exceeds the target rotational speed N2 in step S107.

If the answer is NO in step S107, the present rotational speed N1 equals the target rotational speed N2. Therefore, the motor control circuit 20 continues to drive the DC motor M2 with the current drive power supply voltage in step S108.

Then, the motor control circuit 20 judges if a motor stop signal is generated from an external device (not shown) or not in step S109. If the answer is YES in step S109, the motor control signal generating device 24 outputs motor off signals to the motor driving circuit 200, and the transistors Q1 and Q4 are turned off in step S110. Then, the DC motor M2 stops rotating in step S111. If the answer is NO in step S109, the motor rotation control operation returns to reexecute step S104.

If the answer is YES in step S106, the motor control circuit 20 judges if a predetermined time elapses after the immediately-before drive power supply voltage is changed or not in step S112. If the answer is YES in step S112 or if the drive power supply voltage has not been changed at all, the speed/voltage converting device 25 outputs the drive voltage setting signal to the output variable power supply circuit 201 such that the drive power supply voltage is increased from the initial drive power supply voltage E1 or the immediately-before drive power supply voltage in step S113, and then the motor rotation control operation proceeds to step S109. If the answer is NO in step S112, the motor rotation control operation proceeds to step S109 without changing the drive power supply voltage of the output variable power supply circuit 201.

If the answer is YES in step S107, the motor control circuit 20 judges if a predetermined time elapses after the immediately-before drive power supply voltage is changed or not in step S114. If the answer is YES in step S114 or if the drive power supply voltage has not been changed at all, the speed-voltage converting device 25 outputs the voltage setting signal to the output variable power supply circuit 201 such that the drive power supply voltage is decreased from the initial drive power supply voltage E1 or the immediately-before drive power supply voltage in step S115, and then the motor rotation control operation proceeds to step S109. If the answer is NO in step S114, the motor rotation control operation proceeds to step S109 without changing the drive power supply voltage of the output variable power supply circuit 201.

In the above-described motor rotation control operation, unless the predetermined time elapses after changing the immediately-before drive power supply voltage, the drive power supply voltage is not changed. Because, it is considered that even though the drive power supply voltage is changed, the rotational speed of the DC motor M2 does not immediately vary, and the response of the DC motor M2 is delayed. In such a situation, the predetermined number of the pulse periods of the rotation signal pulses or the predetermined count number of the rotation signal pulses can be used instead of the predetermined time.

As described above, in the DC motor rotation control apparatus according to the seventh embodiment of the present invention, the rotational speed of the DC motor M2 is controlled by changing the drive power supply voltage of the output variable power supply circuit 201. When the present rotational speed N1 is lower than the target rotational speed N2, the drive power supply voltage is increased so as to increase the rotational speed of the DC motor M2. On the contrary, when the present rotational speed N1 exceeds the target rotational speed N2, the drive power supply voltage is decreased so as to decrease the rotational speed of the DC motor M2.

Next, a DC motor rotation control apparatus that controls a rotational operation and a cumulative rotation number of the DC motor according to an eighth embodiment of the present invention is described. The DC motor rotation control apparatus of FIG. 28 has a similar construction to the DC motor rotation control apparatus of FIG. 24 employing a motor control circuit 20A instead of the motor control circuit 20.

The motor control circuit 20A includes a microcomputer (not shown), a pulse interval measuring device 21A, a rotational speed calculating device 22A, a motor control signal generating device 24A, a pulse number counting device 25A, a cumulative rotation number calculating device 26A, a remaining rotation number calculating device 27A, a rotational speed switching/judging device 28A, and a speed/voltage converting device 29A.

Respective functions of the pulse interval measuring device 21A, the rotational speed calculating device 22A, and the motor control signal generating device 24A, are substantially similar to those of the pulse interval measuring device 21, the rotational speed calculating device 22, and the motor control signal generating device 24 of the motor control circuit 20 illustrated in FIG. 24, respectively, and their descriptions are omitted.

The pulse number counting device 25A counts the number of the rotation signal pulses output from the pulse generator 4, and inputs the counted number of pulses to the cumulative rotation number calculating device 26A. The cumulative rotation number calculating device 26A calculates the cumulative rotation number of the DC motor M2 from the rotation start of the DC motor M2, and inputs the cumulative rotation number to the remaining rotation number calculating device 27A. Then, the remaining rotation number calculating device 27A calculates the remaining rotation number until reaching a target cumulative rotation number of the DC motor M2 corresponding to a target position of a member driven by the DC motor M2, and inputs the remaining rotation number to the rotational speed switching/judging device 28A.

The rotational speed switching/judging device 28A switches a target rotational speed of the DC motor M2 when the remaining rotation number reaches a predetermined number, and compares a present rotational speed calculated by the rotational speed calculating device 22A with the target rotational speed.

Based on the target rotational speed switched by the rotational speed switching/judging device 28A and the comparison result of the present rotational speed and the target rotational speed by the rotational speed switching/judging device 28A, the speed/voltage converting device 29A obtains a drive voltage which enables the present rotational speed of the DC motor M2 to reach the target speed, and applies the drive voltage setting signal to the output variable power supply circuit 201.

Figure 28:
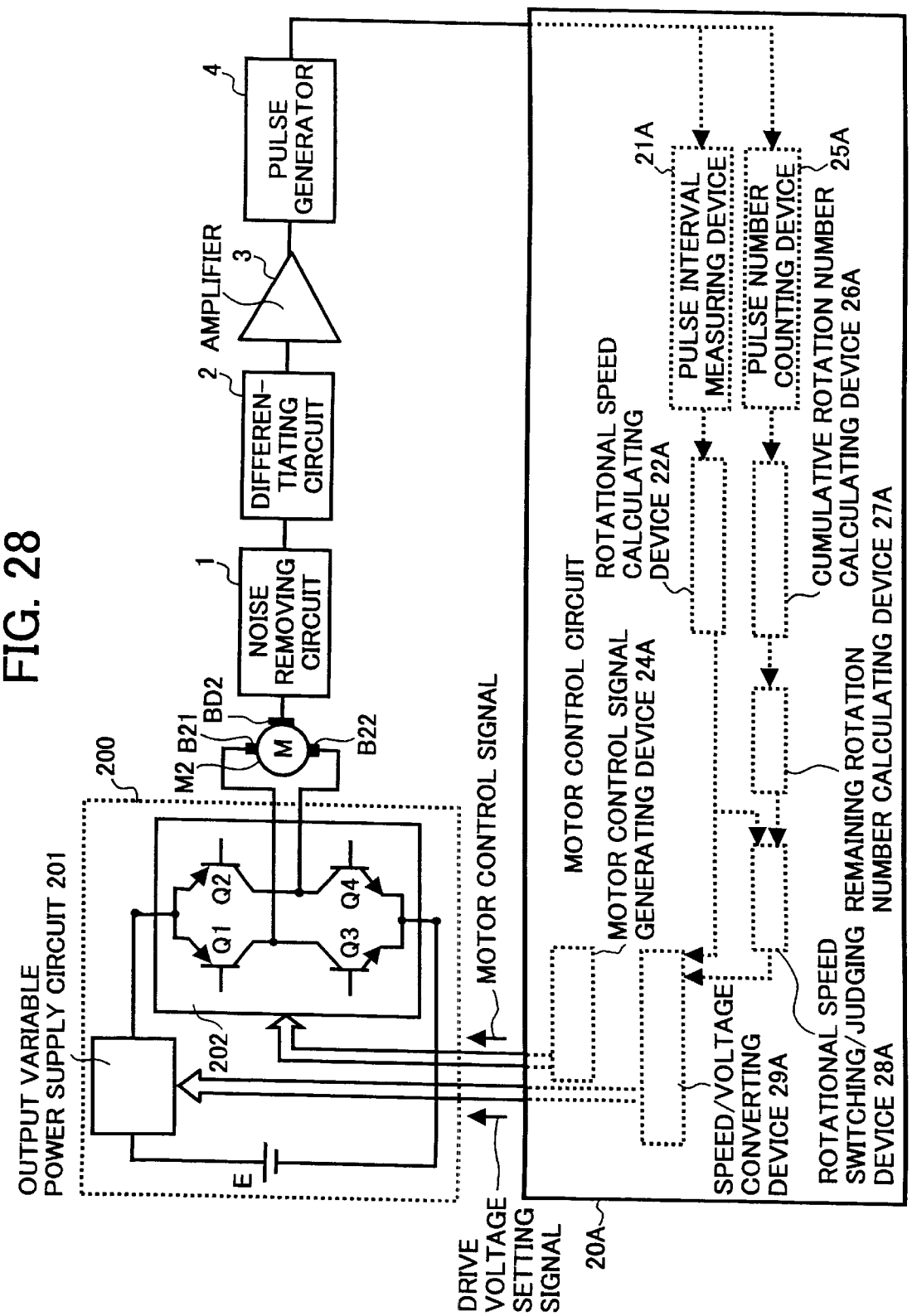
FIG. 28 is a circuit diagram illustrating a configuration of a rotation control apparatus according to an eighth embodiment of the present invention.

The brief flows of the operation of the DC motor rotation control apparatus of FIG. 28 are that the DC motor M2 is driven to rotate at a high speed, for example, with a maximum drive power supply voltage first. In order to improve the stopping position accuracy of the DC motor M2, when the cumulative rotation number of the DC motor M2 from the rotation start thereof reaches a predetermined rotation number (R1), a target rotational speed of the DC motor M2 is switched to be lowered, so that the drive power supply voltage is lowered. During the rotations of the DC motor M2, the rotational speed is controlled by changing the drive power supply voltage. When the cumulative rotation number of the DC motor M2 from the switch of the target rotational speed reaches a predetermined rotation number (R2), the DC motor M2 is stopped.

Figure 29A:
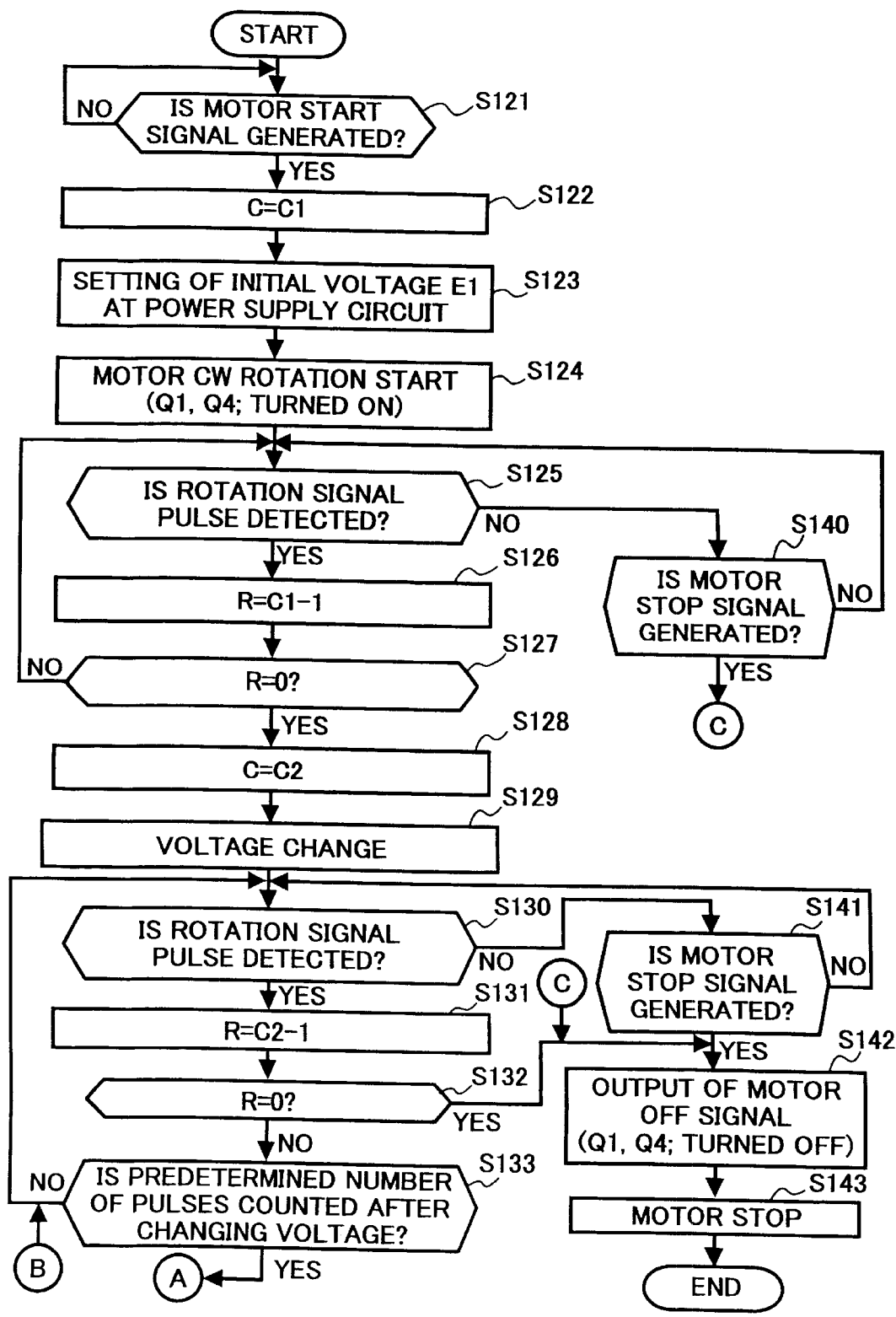
FIGS. 29A and 29B are flowcharts illustrating main steps of the motor rotation control operation of the rotation control apparatus of FIG. 28.
Figure 29B:
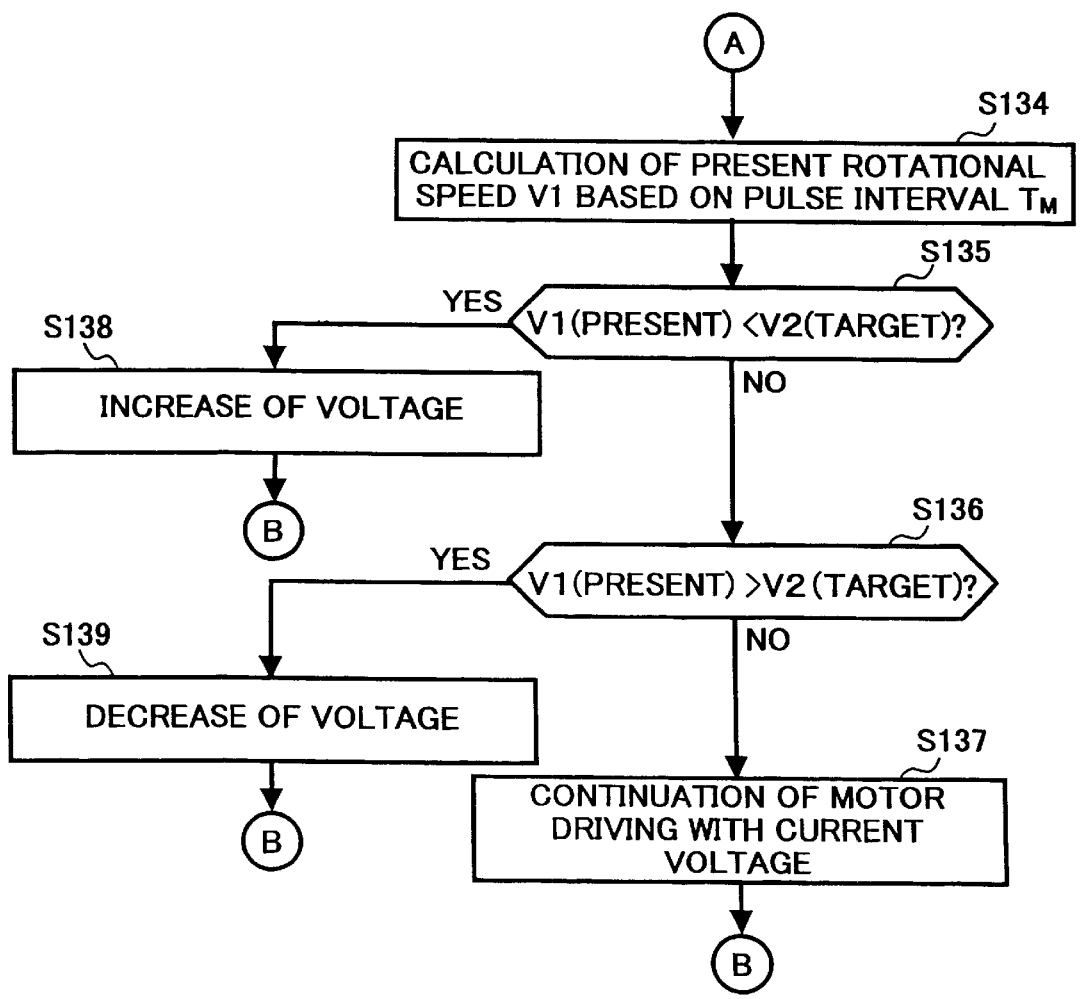

Next, an operation of the DC motor rotation control apparatus of FIG. 28 is described referring to FIGS. 29A and 29B, and FIGS. 30A through 30E. FIGS. 29A and 29B are a flowchart illustrating main steps of the operation of controlling the rotational speed and cumulative rotation number of the DC motor M2 (hereinafter simply referred to as a motor rotation control operation). FIG. 30A is a diagram illustrating the waveform of an output voltage of the power supply circuit 201. FIG. 30B is a diagram illustrating the waveform of an on/off control signal of the transistor Q1. FIG. 30C is a diagram illustrating the waveform of an on/off control signal of the transistor Q4. FIG. 30D is a diagram illustrating the waveform of a signal input to the pulse generator 4 (i.e., an output signal of the rotation detecting brush BD2). FIG. 30E is a diagram illustrating the waveform of an output signal from the pulse generator 4.

In the flowchart of FIGS. 29A and 29B, for the sake of clarity, a cumulative pulse number and a remaining pulse number are used instead of the above-described cumulative rotation number and the remaining rotation number, respectively.

In step S121, the motor control circuit 20A judges if a motor start signal is generated from an external device (not shown) or not. If the answer is YES in step S121, a first target cumulative pulse number "C" is set as a remaining pulse number C1 in the remaining rotation number calculating device 27A in step S122. If the answer is NO in step S121, the motor rotation control operation returns to reexecute step S121. Then, an initial drive power supply voltage E1, for example, a maximum drive power supply voltage, is set at the output variable power supply circuit 201 in accordance with the drive voltage setting signal applied from the speed/voltage converting device 29A in step S123.

Substantially simultaneously, the transistors Q1 and Q4 of the switching section 202 of the motor driving circuit 200 are turned on in accordance with the motor control signal generated from the motor control signal generating device 24A, and a voltage substantially equal to the power supply voltage E1 is applied to the electrode brushes B21 and B22 of the DC motor M2. Thereby, the DC motor M2 starts rotating in the clockwise direction in step S124.

Next, the motor control circuit 20A judges if the rotation signal pulse output from the pulse generator 4 is detected or not in step S125. There are several methods of detecting the rotation signal pulse, such as, for example, detection of the leading edge, detection of the trailing edge, and detection of both the leading edge and the trailing edge. In this embodiment, the leading edge of the rotation signal pulse is detected as illustrated in FIG. 30E, although the trailing edge could instead or additionally be detected.

If the answer is YES in step S125, the remaining rotation number calculating device 27A calculates a remaining pulse number "R" by subtracting one from the remaining pulse number C1 in step S126. Further, the motor control circuit 20A judges if the remaining pulse number "R" is zero or not in step S127. If the answer is NO in step S127, the motor rotation control operation returns to reexecute step S125. If the answer is YES in step S127, a second target cumulative pulse number "C" is set as a remaining pulse number C2 in the remaining rotation number calculating device 27A in step S128.

Substantially simultaneously, the rotational speed switching/judging device 28A switches from a target rotational speed corresponding to the initial drive power supply voltage E1 to a lower target rotational speed. Based on the switched target rotational speed, the speed/voltage converting device 29A obtains a drive voltage which enables the present rotational speed of the DC motor M2 to reach the lower target rotational speed, and applies the drive voltage setting signal to the output variable power supply circuit 201. As a result, the drive power supply voltage of the output variable power supply circuit 201 is changed (i.e., decreased) in step S129.

After decreasing the drive power supply voltage in step S129, the motor control circuit 20A judges if the rotation signal pulse output from the pulse generator 4 is detected or not in step S130. If the answer is YES in step S130, the remaining rotation number calculating device 27A calculates a remaining pulse number "R" by subtracting one from the remaining pulse number C2 in step S131.

Further, the motor control circuit 20A judges if the remaining pulse number "R" is zero or not in step S132. If the answer is NO in step S132, the motor control circuit 20A judges if a predetermined number of rotation signal pulses is counted after changing the drive power supply voltage in step S133. If the answer is NO in step S133, the motor rotation control operation returns to reexecute step S130. If the answer is YES in step S133, the pulse interval measuring device 21A measures the pulse interval $T_M$ based on the rotation signal pulses output from the pulse generator 4, and the rotational speed calculating device 22A calculates a present rotational speed V1 based on the measurement result of the pulse interval $T_M$ in step S134.

Further, the rotational speed switching/judging device 28A compares the present rotational speed V1 calculated by the rotational speed calculating device 22A with a target rotational speed V2, and judges if the present rotational speed V1 is lower than the target rotational speed V2 in step S135.

If the answer is NO in step S135, the rotational speed switching/judging device 28A judges if the present rotational speed V1 exceeds the target rotational speed V2 in step S136. If the answer is NO in step S136, because the present rotational speed V1 equals the target rotational speed V2, the motor control circuit 20A continues to drive the DC motor M2 with the current drive power supply voltage in step S137. After step S137, the motor rotation control operation returns to reexecute step S130.

If the answer is YES in step S135, the speed/voltage converting device 29A outputs the drive voltage setting signal to the output variable power supply circuit 201 such that the drive power supply voltage is increased from the immediately-before drive power supply voltage in step S138.

If the answer is YES in step S136, the speed/voltage converting device 29A outputs the voltage setting signal to the output variable power supply circuit 201 such that the drive power supply voltage is decreased from the immediately-before drive power supply voltage in step S139. After both steps S138 and S139, the motor rotation control operation returns to reexecute step S130.

If the answer is NO in step S130, the motor control circuit 20A judges if a motor stop signal is generated from an external device (not shown) in step S141. If the answer is NO in step S141, the motor rotation control operation returns to reexecute step S130. If the answer is YES in step S141, the motor control signal generating device 24A outputs motor off signals to the switching section 202 of the motor driving circuit 200, and the transistors Q1 and Q4 are turned off in step S142. Then, the DC motor M2 stops rotating in step S143.

If the answer is NO in step S125, the motor control circuit 20A judges if the motor stop signal is generated from the external device (not shown) in step S140. If the answer is NO in step S140, the motor rotation control operation returns to reexecute step S125. If the answer is YES in step S140, the motor rotation control operation proceeds to step S142.

Further, if the answer is YES in step S132, the motor rotation control operation proceeds to step S142.

As described above, in the DC motor rotation control apparatus according to the eighth embodiment of the present invention, the rotational speed of the DC motor M2 is controlled by counting the rotation number of the DC motor M2 and by changing the drive power supply voltage of the output variable power supply circuit 201. Specifically, when the cumulative rotation number of the DC motor M2 reaches a predetermined number, the target rotational speed is controlled to be switched, and the drive power supply voltage of the output variable power supply circuit 201 is changed to one corresponding to the switched target rotational speed. In addition, when the present rotational speed V1 is lower than the target rotational speed V2, the drive power supply voltage is increased so as to increase the rotational speed of the DC motor M2. On the contrary, when the present rotational speed V1 exceeds the target rotational speed V2, the drive power supply voltage is decreased so as to decrease the rotational speed of the DC motor M2.

Owing to the above-described motor rotation control operations, the rotation of the DC motor M2 can reach a required cumulative rotation number quickly at high speed, and then the DC motor M2 can smoothly stop at a low rotational speed when the rotation of the DC motor M2 reaches the required cumulative rotation number. As a result, the stopping position accuracy of the DC motor M2 can be improved. With the above-described control of the cumulative rotation number of the DC motor M2, a position of a member that is driven by the DC motor can be adequately controlled.

In the above-described motor rotation control operations, two values of cumulative rotation number (i.e., C1 and C2) are employed. Alternatively, only one value of cumulative rotation number can be used. In such a case, when the rotation of the DC motor M2 reaches a predetermined cumulative rotation number, the rotational speed switching/judging device 28A may switch from a target rotational speed corresponding to the initial drive power supply voltage E1 to a lower target rotational speed. And then, the drive power supply voltage of the output variable power supply circuit 201 may be decreased.

Further, in the above-described DC motor rotation control apparatus according to the eighth embodiment of the present invention, the rotation number of the DC motor M2 is counted from the rotation start thereof. Alternatively, the rotation number of the DC motor M2 may be counted from a predetermined time point or counted with reference to the signal generated by an external device (not shown) after the rotation start of the DC motor M2.

Next, the arrangement of the rotation detection brush for detecting the rotation of the DC motor according to the embodiments of the present invention is described in detail.

FIGS. 31A through 31E illustrate an example of a DC motor in which a rotation detecting brush BD3 is arranged in a position inclined by 60° relatively to one of electrode brushes B31 and B32, e.g., the electrode brush B32 in FIGS. 31A through 31E. Accordingly, an angle between the electrode brush B31 and the rotation detecting brush BD3 is larger than an angle between the electrode brush B32 and the rotation detecting brush BD3.

FIG. 31A illustrates an initial state of commutator CM3 of the DC motor. FIGS. 31B through 31E respectively illustrate the states of the commutator CM3 rotating clockwise in order by 30°.

Figure 32:
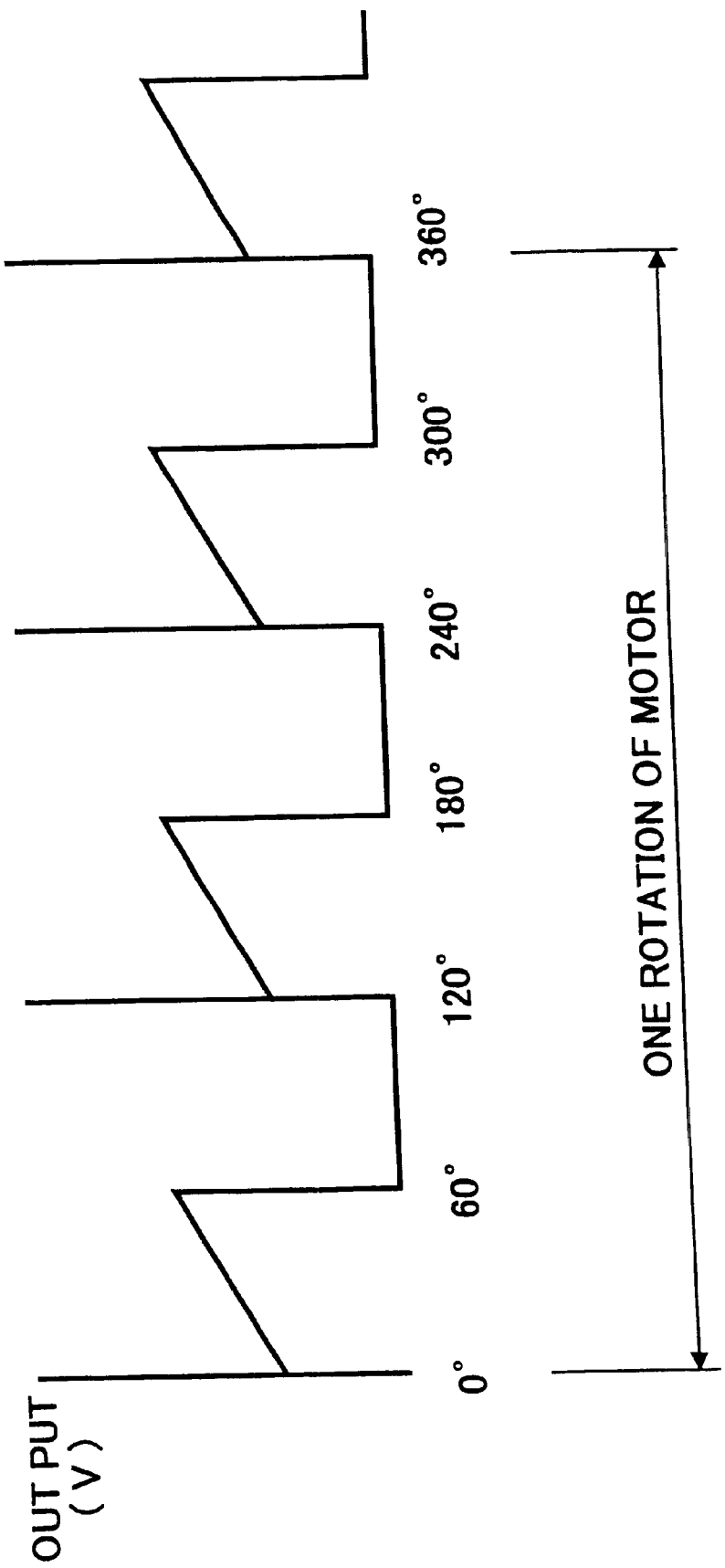
FIG. 32 is a waveform diagram of an output voltage generated from the rotation detecting brush.
Figure 37:
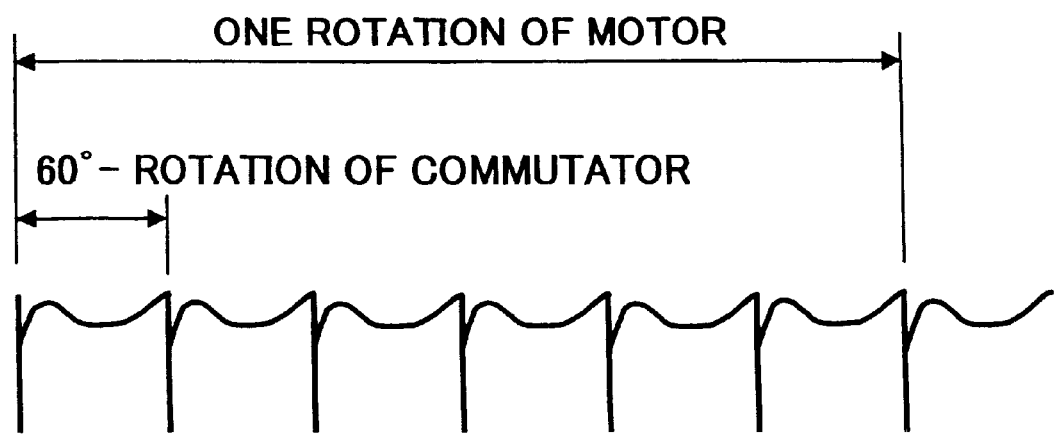
FIG. 37 is a diagram of ripple waveform according to a background art.
Figure 38:
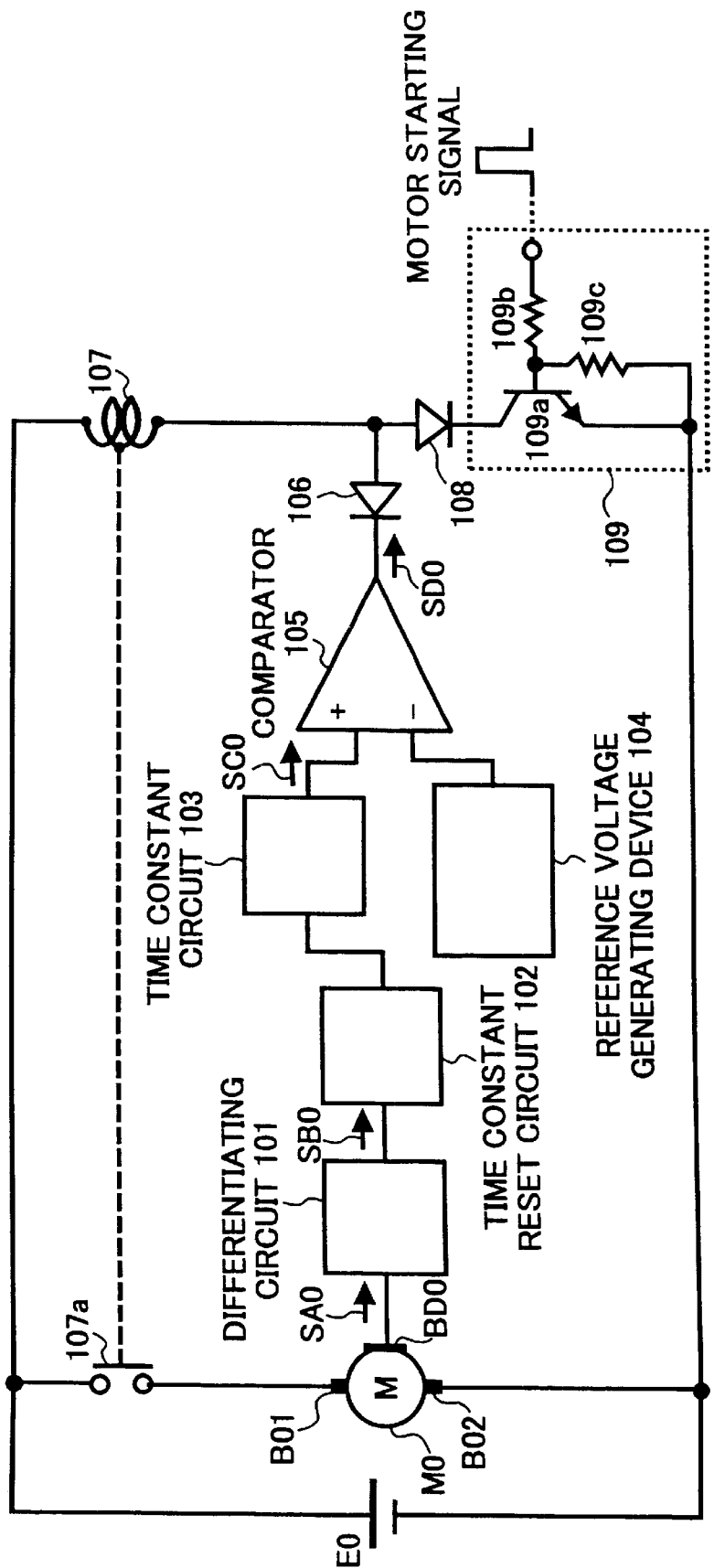
FIG. 38 is a circuit diagram illustrating a background DC motor control circuit.

FIG. 32 illustrates an estimated voltage waveform of an output voltage V generated from the rotation detecting brush BD3 when the commutator CM3 and the rotor are rotated as illustrated in FIGS. 31A through 31E. As is apparent from the fact in comparison with the waveform at the time of detecting a rotation number of the motor from the drive voltage ripple of the motor illustrated in FIG. 37, the waveform of the output voltage V in FIG. 32 largely varies per 60°.

Figure 33C:
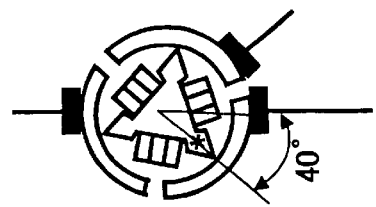
FIGS. 33A through 33G are schematic views illustrating an example of a DC motor wherein a rotation detecting brush is arranged in a position inclined by 40° relatively to the electrode brush, and conditions of the commutator rotating clockwise in order by 20°.
Figure 33B:
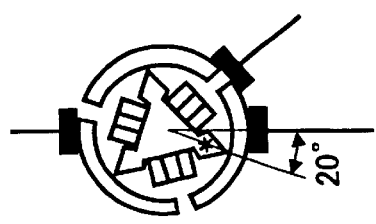
Figure 33A:
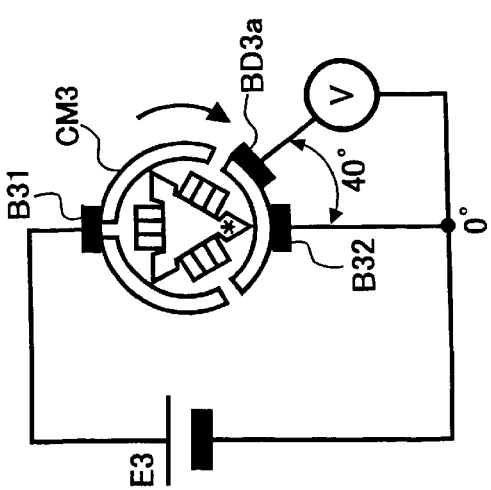
Figure 33G:
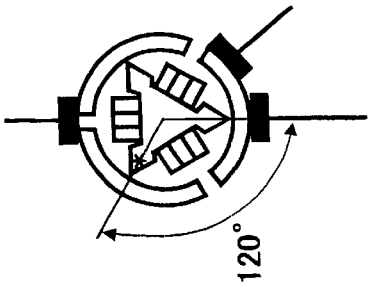
Figure 33F:
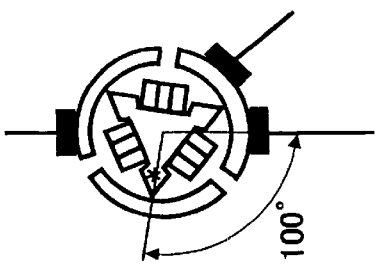
Figure 33E:
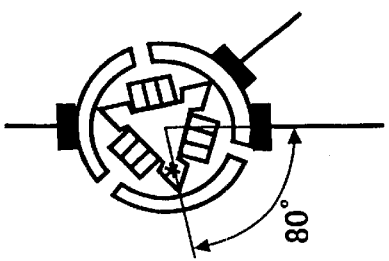
Figure 33D:
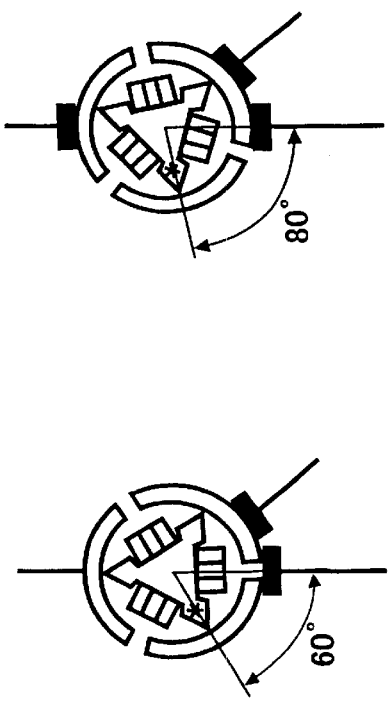

FIGS. 33A through 33G illustrate another example of the DC motor in which a rotation detecting brush BD3a is arranged in a position inclined by 40° relatively to one of the electrode brushes B31 and B32, e.g., the electrode brush B32 in FIGS. 33A through 33G. FIG. 33A illustrates an initial state of the commutator CM3 of the DC motor. FIGS. 33B through 33G respectively illustrate the states of the commutator CM3 rotating clockwise in order by 20°.

Figure 34:
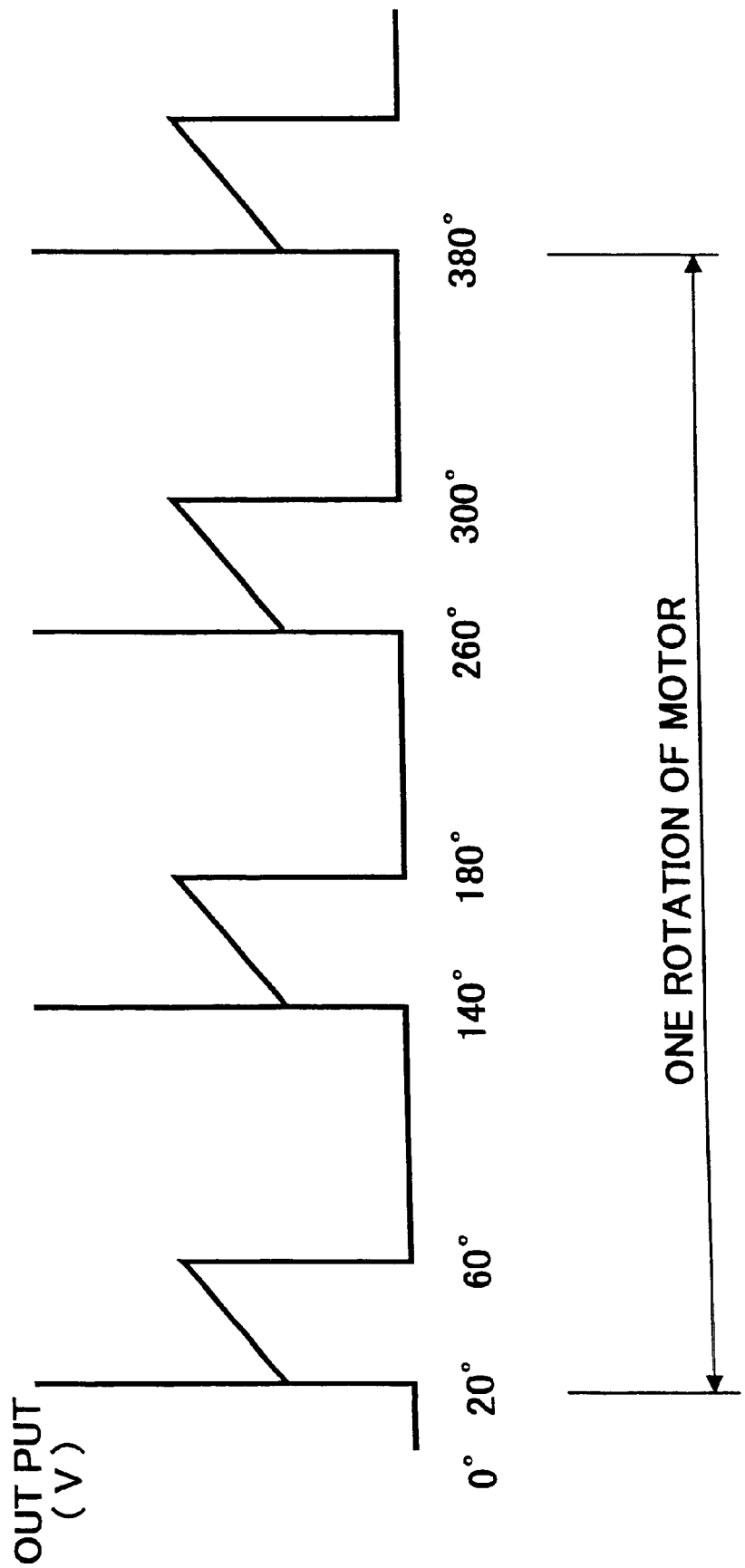
FIG. 34 is a waveform diagram of an output voltage generated from the rotation detecting brush.
Figure 35:
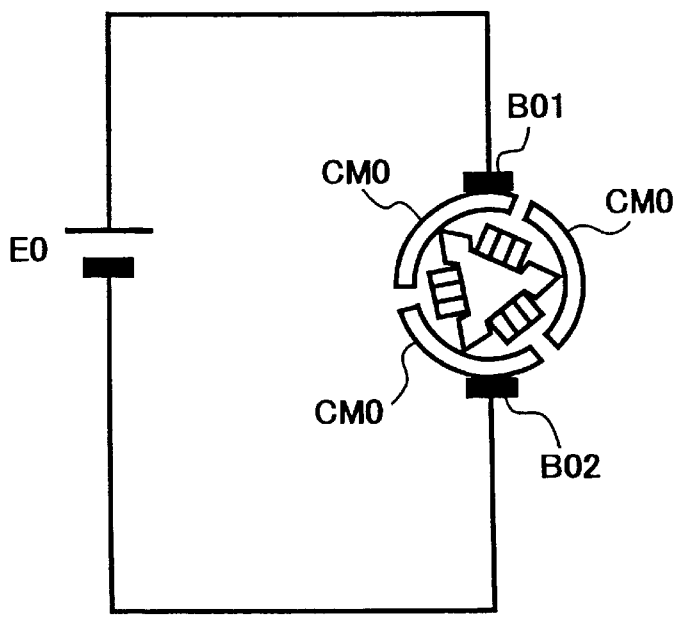
FIG. 35 is a schematic circuit diagram employing a three-pole DC motor according to a background art.
Figure 36:
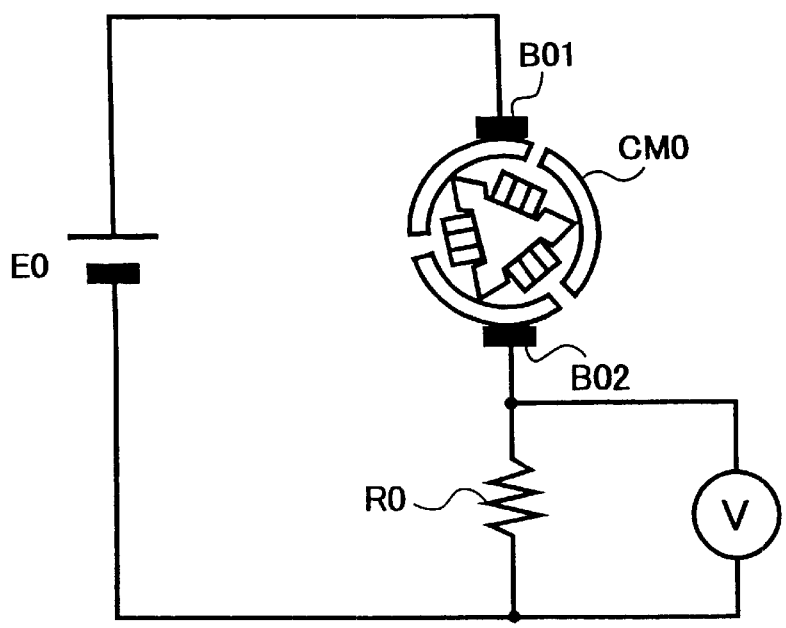
FIG. 36 is another schematic circuit diagram employing a three-pole DC motor according to a background art.

FIG. 34 illustrates an estimated voltage waveform of an output voltage V generated from the rotation detecting brush BD3a when the commutator CM3 and the rotor are rotated as illustrated in FIGS. 33A through 33G. If the voltage waveform is such as illustrated in FIG. 32 or FIG. 34, the information relating to the number of rotations of the DC motor can be detected from the waveform of an output signal from which the high-frequency component, such as the ripple, etc. is removed from the output voltage V by causing the output voltage V to pass through the low-pass filter.

With the above-described configurations of the rotation detecting apparatus and the rotation control apparatus according to the embodiments of the present invention, a suitable rotation control is performed based on effective detection of the rotational operations of a brush-type DC motor. The rotation detecting apparatus and the rotation control apparatus of the present invention detects and controls at least one of the rotational speed, the rotational direction, the rotational position, and the cumulative rotation number of a DC motor with accuracy.

Obviously, numerous modifications and variations of the present invention are possible in light of the above teachings. It is therefore to be understood that within the scope of the appended claims, the present invention may be practiced otherwise than as specifically described herein.

This document claims priority and contains subject matter related to Japanese Patent Application No. 2000-185499 filed in the Japanese Patent Office on Jun. 20, 2000, and Japanese Patent Application No. 2000-185497 filed in the Japanese Patent Office on Jun. 20, 2000, and the entire contents of which are hereby incorporated herein by reference.

What is claimed is:

1. A direct current motor rotation detecting apparatus configured to detect at least one of a rotational direction, a rotational speed, a rotational position, and a cumulative rotation number of a rotor of a direct current motor, comprising:

at least one rotation detecting brush configured to detect a rotation of the rotor;

a differentiating circuit configured to differentiate a voltage obtained through the at least one rotation detecting brush; and a pulse generator configured to be triggered by the differentiating circuit at a time interval proportional to a rotational speed of the direct current motor and to generate pulses each having a predetermined pulse width.

2. The direct current motor rotation detecting apparatus according to claim 1, wherein a pulse width of the pulses generated from the pulse generator satisfies condition (1):

$$tw < (60/nN) \quad (1)$$

where tw is an output pulse width (seconds), n is a number of rotor magnetic poles, and N is a maximum rotational speed (r.p.m) of the direct current motor.

3. A direct current motor rotation detecting apparatus configured to detect at least one of a rotational direction, a rotational speed, a rotational position, and a cumulative rotation number of a rotor of a direct current motor, comprising:

rotation detecting means including a rotation detecting brush for detecting a rotation of the rotor;

differentiating means for differentiating a voltage obtained through the rotation detecting means; and pulse generating means for generating pulses each having a predetermined pulse width at a time interval proportional to a rotational speed of the direct current motor.

4. A method for detecting at least one of a rotational direction, a rotational speed, a rotational position, and a cumulative rotation number of a rotor of a direct current motor, comprising:

detecting a rotation of the rotor using at least one rotation detecting brush;

differentiating a voltage obtained through the at least one rotation detecing brush;

triggering a pulse generator by the differentiated voltage; and generating pulses each having a predetermined pulse width based on the triggering of the pulse generator.

* * * * *